US012752416B2

(12) United States Patent
Nishioka et al.

(10) Patent No.: US 12,752,416 B2
(45) Date of Patent: Oct. 6, 2026

(54) INFORMATION PROCESSING DEVICE, INFORMATION PROCESSING METHOD, AND INFORMATION PROCESSING PROGRAM

(71) Applicant: Sony Group Corporation, Tokyo (JP)

(72) Inventors: Hayato Nishioka, Tokyo (JP); Yuki Ogasawara, Tokyo (JP); Shinichi Furuya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 40 days.

(21) Appl. No.: 18/864,280

(22) PCT Filed: May 26, 2023

(86) PCT No.: PCT/JP2023/019652
§ 371 (c)(1),
(2) Date: Nov. 8, 2024

(87) PCT Pub. No.: WO2023/234197
PCT Pub. Date: Dec. 7, 2023

(65) Prior Publication Data
US 2025/0329270 A1 Oct. 23, 2025

(30) Foreign Application Priority Data
Jun. 2, 2022 (JP) ................................ 2022-090478

(51) Int. Cl.
*B25J 9/00* (2006.01)
*B25J 11/00* (2006.01)
(Continued)

(52) U.S. Cl.
CPC ............. *B25J 9/0006* (2013.01); *B25J 11/00* (2013.01); *G06F 3/014* (2013.01); *G06F 3/016* (2013.01);
(Continued)

(58) Field of Classification Search
CPC ....... A61H 1/0288; B25J 9/0006; B25J 11/00; G06F 3/014; G06F 3/016; G09B 15/00; G09B 15/06; G01G 1/00; G01H 1/00
See application file for complete search history.

(56) References Cited

U.S. PATENT DOCUMENTS 4,986,280 A * 1/1991 Marcus .................... B25J 19/02 600/595
5,912,658 A * 6/1999 Bergamasco .......... B25J 9/0006 600/595
(Continued)

FOREIGN PATENT DOCUMENTS

CN 110695971 A 1/2020
EP 4119308 A1 * 1/2023 ........... G06F 3/0346
(Continued)

OTHER PUBLICATIONS

Sathe et al., Development of Exo-Glove for Measuring 3-axis Forces Acting on the Human Finger without Obstructing Natural Human-Object Interaction, 2020 IEEE/RSJ International Conference on Intelligent Robots and Systems, Oct. 25-29, 2020, pp. 4106-4113, Las Vegas, NV.
(Continued)

*Primary Examiner* — Dale Moyer
(74) *Attorney, Agent, or Firm* — Paratus Law Group, PLLC

(57) ABSTRACT

An information processing device includes: an exoskeleton robot worn on a hand of a user; and a controller that controls the exoskeleton robot, the exoskeleton robot including: a palm module fixed to the hand of the user; a finger joint module detachably attached to the palm module; and a fingertip module detachably attached to the finger joint module and fixed to a finger of the user, in which the finger joint module is configured to have at least one of a function
(Continued)

of driving the fingertip module or a function of sensing the fingertip module.

19 Claims, 36 Drawing Sheets

(51) Int. Cl.

| | |
|---|---|
| ***G06F 3/01*** | (2006.01) |
| ***G09B 15/00*** | (2006.01) |
| ***G09B 15/06*** | (2006.01) |
| ***G10G 1/00*** | (2006.01) |
| ***G10H 1/00*** | (2006.01) |
| *A61H 1/02* | (2006.01) |

(52) U.S. Cl.
CPC ............. *G09B 15/00* (2013.01); *G09B 15/06* (2013.01); *G10G 1/00* (2013.01); *G10H 1/00* (2013.01); *A61H 1/0288* (2013.01)

(56) References Cited

U.S. PATENT DOCUMENTS

| | | | | |
|---|---|---|---|---|
| 2001/0034947 | A1* | 11/2001 | Nagata | G06F 3/014 33/503 |
| 2006/0211964 | A1* | 9/2006 | Farrell | A61F 5/0118 602/5 |
| 2010/0305717 | A1* | 12/2010 | Tong | A63B 21/4019 623/64 |
| 2013/0278500 | A1* | 10/2013 | Kawasaki | B25J 13/02 345/156 |
| 2016/0259417 | A1* | 9/2016 | Gu | G06F 3/014 |
| 2016/0296345 | A1* | 10/2016 | Deshpande | A61F 2/586 |
| 2017/0266075 | A1 | 9/2017 | Becchi | |
| 2018/0335841 | A1* | 11/2018 | Rubin | G06F 3/0233 |
| 2018/0335842 | A1* | 11/2018 | Rubin | G06F 3/0233 |
| 2020/0050269 | A1* | 2/2020 | Gu | B25J 9/0006 |
| 2021/0104213 | A1* | 4/2021 | Furuya | G09B 15/08 |
| 2022/0110815 | A1* | 4/2022 | Li | B33Y 80/00 |
| 2022/0350410 | A1* | 11/2022 | Salada | G06F 3/016 |
| 2023/0075880 | A1* | 3/2023 | Hatazaki | B25J 13/088 |
| 2023/0166391 | A1* | 6/2023 | Chauhan | A61H 1/0288 601/5 |
| 2024/0161438 | A1 | 5/2024 | Nakagawa | |
| 2024/0184360 | A1* | 6/2024 | Drucker | G06F 3/014 |
| 2025/0044872 | A1* | 2/2025 | Hirata | G06F 3/014 |

FOREIGN PATENT DOCUMENTS

| | | | |
|---|---|---|---|
| JP | 2002-182817 | A | 6/2002 |
| JP | 2016-083000 | A | 5/2016 |
| JP | 2021-501645 | A | 1/2021 |
| WO | WO 2016/135857 | A1 | 9/2016 |
| WO | WO 2019/130755 | A1 | 7/2019 |
| WO | WO 2020/100671 | A1 | 5/2020 |
| WO | WO 2021/090817 | A1 | 5/2021 |
| WO | WO 2021/157390 | A1 | 8/2021 |
| WO | WO 2021/172580 | A1 | 9/2021 |
| WO | WO 2021/182264 | A1 | 9/2021 |
| WO | WO 2021/215513 | A1 | 10/2021 |

OTHER PUBLICATIONS

Marconi et al., A novel hand exoskeleton with series elastic actuation for modulated torque transfer, Mechatronics, Jun. 18, 2019, pp. 69-82, vol. 66, International Federation of Automatic Control, International Federation of Automatic Control.

* cited by examiner

START

S1: TERMINAL DEVICE 5 GENERATES CONTROL COMMANDS

S2: CONTROLLER 4 SEPARATES CONTROL COMMAND FOR EACH FINGER JOINT MODULE 20

S3: EACH FINGER JOINT MODULE 20 EXECUTES COMMAND

S4: CONTROLLER 4 COLLECTS RESULTS

S5: TERMINAL DEVICE 5 WRITES RESULTS IN LOG FILE

END

INFORMATION PROCESSING DEVICE, INFORMATION PROCESSING METHOD, AND INFORMATION PROCESSING PROGRAM

CROSS REFERENCE TO PRIOR APPLICATION

This application is a National Stage Patent Application of PCT International Patent Application No. PCT/JP2023/019652 (filed on May 26, 2023) under 35 U.S.C. § 371, which claims priority to Japanese Patent Application No. 2022-090478 (filed on Jun. 2, 2022), which are all hereby incorporated by reference in their entirety.

FIELD

The present disclosure relates to an information processing device, an information processing method, and an information processing program.

BACKGROUND

Exoskeleton robots to be worn on a user's hand for training such as piano performance are proposed (see, for example, Patent Literature 1).

CITATION LIST

Patent Literature

Patent Literature 1: WO 2019/130755 A

SUMMARY

Technical Problem

In order to provide various types of training to various users who may have different hand sizes or others, exoskeleton robots having appropriate configurations corresponding to the application are required.

One aspect of the present disclosure enables provision of training by an exoskeleton robot having an appropriate configuration corresponding to the application.

Solution to Problem

An information processing device according to one aspect of the present disclosure includes: an exoskeleton robot worn on a hand of a user; and a controller that controls the exoskeleton robot, wherein the exoskeleton robot comprises: a palm module fixed to the hand of the user; a finger joint module detachably attached to the palm module; and a fingertip module detachably attached to the finger joint module and fixed to a finger of the user, wherein the finger joint module is configured to have at least one of a function of driving the fingertip module or a function of sensing the fingertip module.

An information processing method according to one aspect of the present disclosure includes controlling an exoskeleton robot worn on a hand of a user, wherein the exoskeleton robot includes: a palm module fixed to the hand of the user; a finger joint module detachably attached to the palm module; and a fingertip module detachably attached to the finger joint module and fixed to a finger of the user, wherein the finger joint module is configured to have at least one of a function of driving the fingertip module or a function of sensing the fingertip module.

An information processing program according to one aspect of the present disclosure causes a computer to execute: processing of controlling an exoskeleton robot worn on a hand of a user, wherein the exoskeleton robot includes: a palm module fixed to the hand of the user; a finger joint module detachably attached to the palm module; and a fingertip module detachably attached to the finger joint module and fixed to a finger of the user, wherein the finger joint module is configured to have at least one of a function of driving the fingertip module or a function of sensing the fingertip module.

DESCRIPTION OF EMBODIMENTS

Hereinafter, embodiments of the present disclosure will be described in detail on the basis of the drawings. Note that in each of the following embodiments, the same elements are denoted by the same symbols, and redundant description will be omitted.

The present disclosure will be described in the following order of items.

0. Introduction
1. Embodiments
1.1. Overall Configuration
1.2. Exoskeleton Robot
1.3. Palm Module
1.4. Finger Joint Module
1.5. Fingertip Module
1.6. Control Command
1.7. UI
1.8. Hardware Configuration Example
2. Modifications
3. Conclusion
4. Further Embodiments
4.1. Finger Joint Module
4.2. Finger Joint Module Corresponding to Thumb
4.3. Fingertip Module Corresponding to Thumb
4.4. Conclusion

0. Introduction

For example, technology related to exoskeleton robot type training apparatuses that can be used for training or learning of a sequence motion of fingers or others is proposed. The exoskeleton robots are of a module type and allow a fingertip module or a finger joint module for driving the fingertip module to be replaced. The modules may have individual IDs and may be instructed in a protocol suitable for performing repetitive motion tasks for long hours. It is made possible to provide an exoskeleton robot suitable for each task by rearranging and using modules depending on the purpose of training.

1. Embodiments

1.1. Overall Configuration

Figure 1:
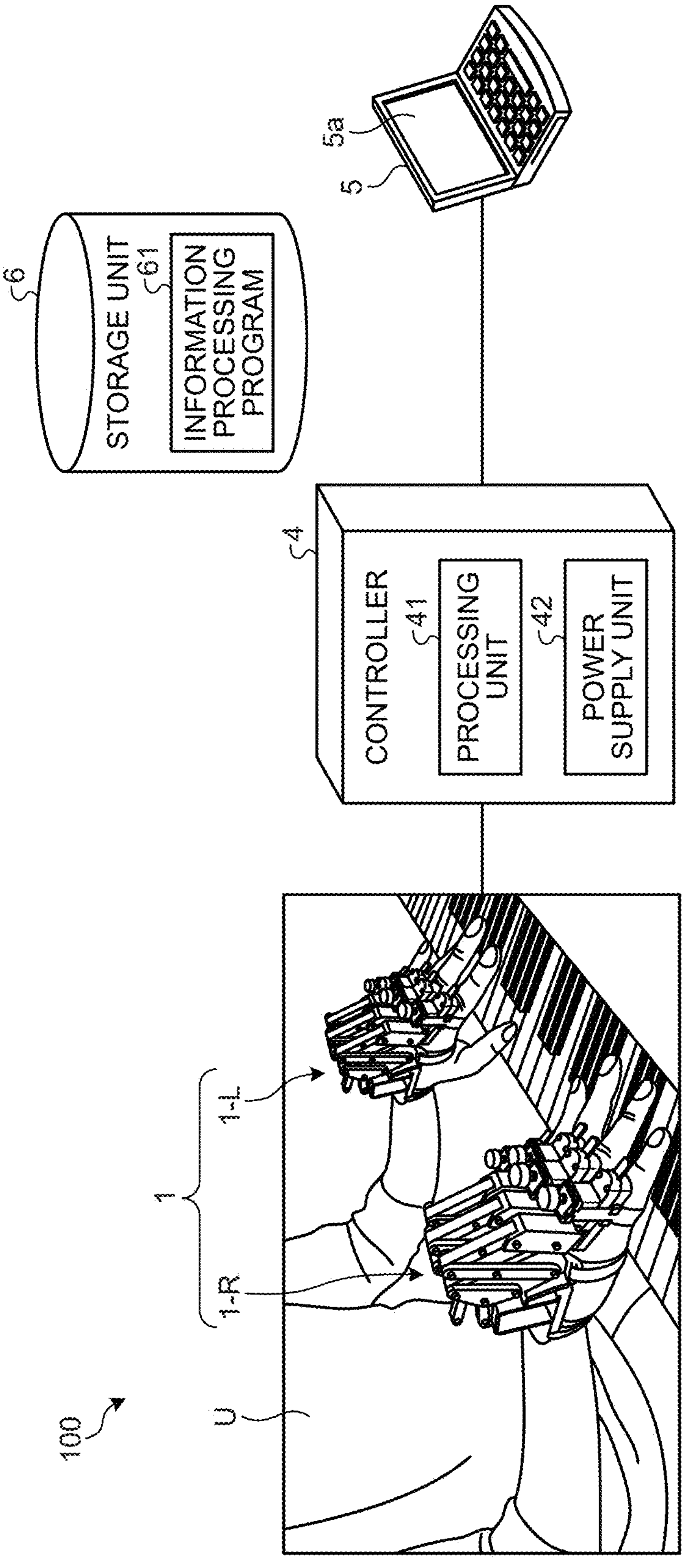
FIG. 1 is a diagram illustrating a schematic configuration example of an information processing device according to an embodiment.

FIG. 1 is a diagram illustrating a schematic configuration example of an information processing device according to an embodiment. A user of an information processing device 100 is referred to as a user U in the drawing. The drawing mainly illustrates the fingers (hands and fingers) and their surroundings in the body of the user U. In this example, the information processing device 100 is used for piano performance training of the user U.

Note that the extending direction of the fingers of the user U is also referred to as a front-rear direction. The tip side of the fingers corresponds to the front direction. The width direction of the fingers of the user U is also referred to as a left-right direction. A direction orthogonal to the front-rear direction and the left-right direction is also referred to as an up-down direction. The back side of the hands of the user U corresponds to the upward direction, and the palm side corresponds to the downward direction.

The information processing device 100 includes an exoskeleton robot 1, a controller 4, a terminal device 5, and a storage unit 6. Describing the storage unit 6 first, the storage unit 6 stores various types of information used in the information processing device 100. Exemplified in FIG. 1 as information stored in the storage unit 6 is an information processing program 61. The information processing program 61 is a program (software) for causing a computer to function as the controller 4 and the terminal device 5, namely, as the information processing device 100. The storage unit 6 may be a component of the controller 4 or a component of the terminal device 5. First, the exoskeleton robot 1 will be described in detail, and then the controller 4 and the terminal device 5 will be described.

The exoskeleton robot 1 is worn on the hands of the user U. In the example illustrated in FIG. 1, the exoskeleton robot 1 includes an exoskeleton robot 1-L and an exoskeleton robot 1-R. The exoskeleton robot 1-L is worn on the left hand of the user U. The exoskeleton robot 1-R is worn on the right hand of the user U. Hereinafter, in a case where the exoskeleton robot 1-L and the exoskeleton robot 1-R are not particularly distinguished from each other, the exoskeleton robot 1-L and the exoskeleton robot 1-R may be simply referred to as an exoskeleton robot 1.

1.2. Exoskeleton Robot

Figure 2:
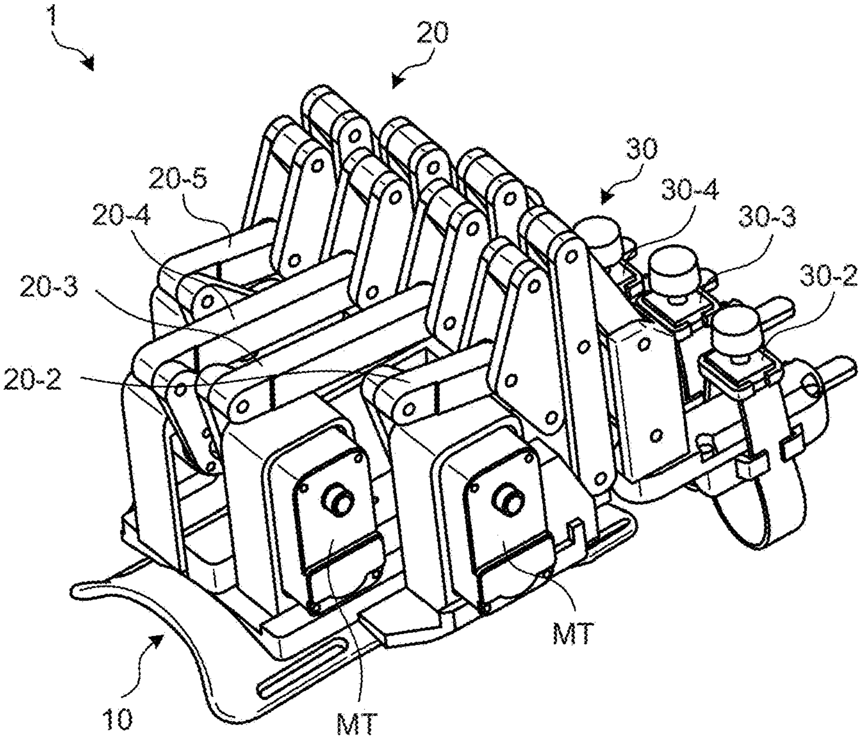
FIG. 2 is a diagram illustrating an example of a schematic configuration of an exoskeleton robot.
Figure 3:
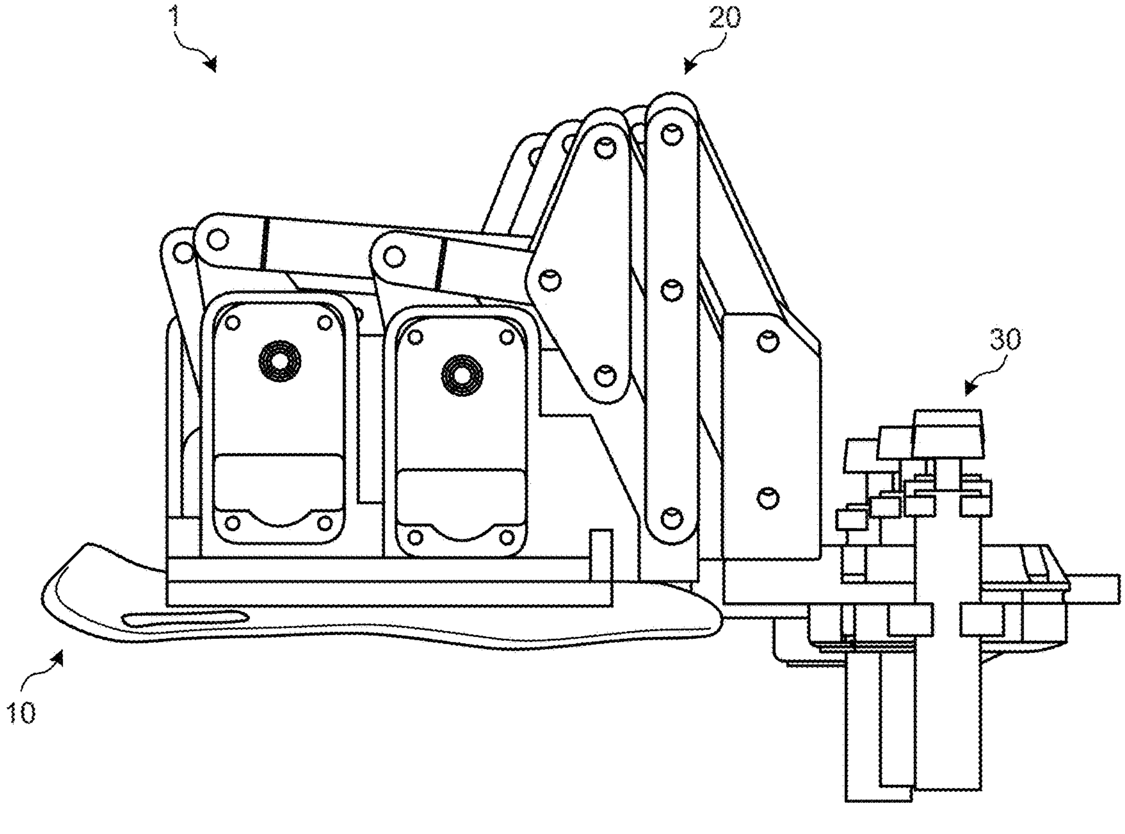
FIG. 3 is a diagram illustrating an example of a schematic structure of the exoskeleton robot.
Figure 4:
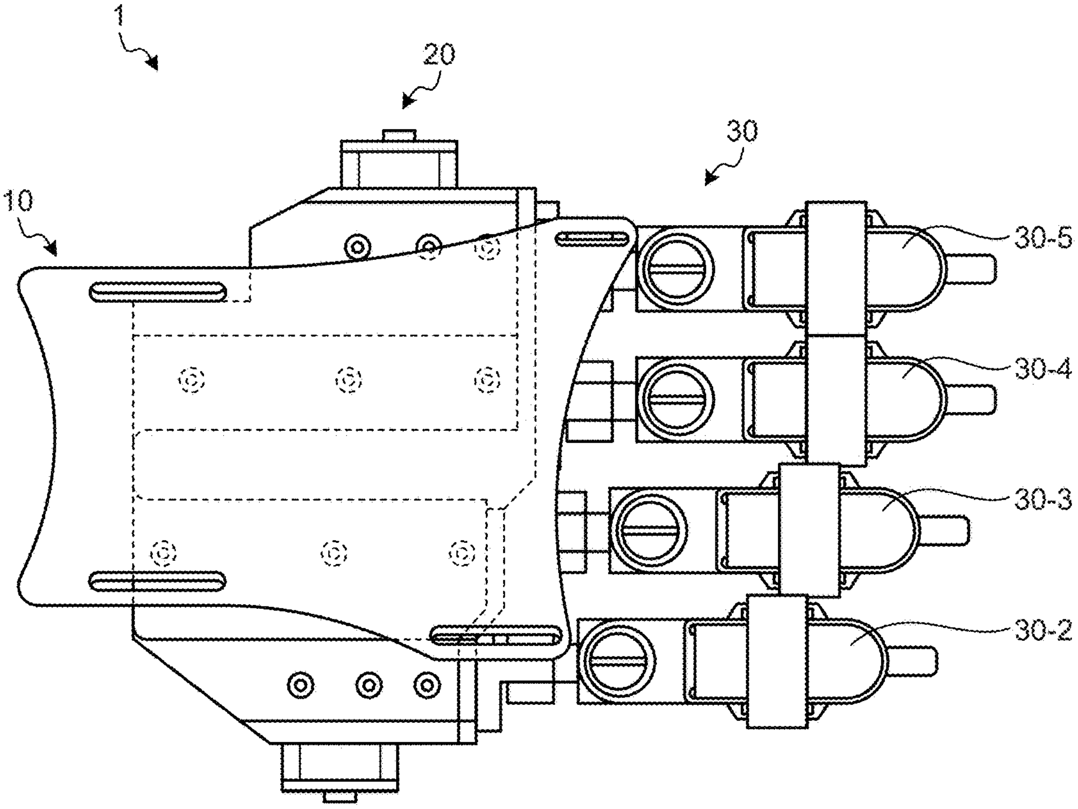
FIG. 4 is a diagram illustrating an example of a schematic structure of the exoskeleton robot.

FIGS. 2 to 4 are diagrams illustrating an example of a schematic configuration of an exoskeleton robot. In this example, the exoskeleton robot 1 is structured to correspond to four fingers of an index finger, a middle finger, a ring finger, and a little finger. The exoskeleton robot 1 includes a palm module 10, a finger joint module 20, and a fingertip module 30.

The palm module 10 is a module for attaching the exoskeleton robot 1 to a hand of the user U. The palm module 10 is fixed to the hand of the user U in such a manner as to fit the back of the hand of the user U. Further details of the palm module 10 will be described later.

The finger joint module 20 is detachably attached to the palm module 10. The means for attachment and detachment is not particularly limited. For example, a screw, a bolt, or the like may be used. The finger joint module 20 has a portion corresponding to each finger. A portion corresponding to the index finger is referred to as a finger joint module 20-2 in the drawing. A portion corresponding to the middle finger is referred to as a finger joint module 20-3 in the drawing. A portion corresponding to the ring finger is referred to as a finger joint module 20-4 in the drawing. A portion corresponding to the little finger is referred to as a finger joint module 20-5 in the drawing. In a case where these modules are not particularly distinguished from each other, they may be simply referred to as finger joint modules 20.

The finger joint modules 20 may have a function (driving function) of driving a fingertip module 30. For driving, for example, an actuator such as a motor is used. Hereinafter, description will be given on the premise that the actuator is a motor. In FIG. 2, motors mounted on the finger joint module 20-2 and the finger joint module 20-3 are denoted by reference numerals as motors MT. In place of or in addition to the driving function, the finger joint modules 20 may have a function (sensing function) of sensing the fingertip module 30. An example of the sensing is detection of movement (movement amount or the like) of the fingertip module 30. The detection may include angle detection. Further details of the finger joint modules 20 will be described later.

The fingertip modules 30 are detachably attached to the finger joint modules 20 and are fixed to the fingers of the user U. The means for attachment and detachment is not particularly limited. For example, a screw, a bolt, or the like may be used. The fingertip module 30 has a portion corresponding to each finger. A portion corresponding to the index finger is referred to as a fingertip module 30-2 in the drawing. A portion corresponding to the middle finger is referred to as a fingertip module 30-3 in the drawing. A portion corresponding to the ring finger is referred to as a fingertip module 30-4 in the drawing. A portion corresponding to the little finger is referred to as a fingertip module 30-5 in the drawing. In a case where these modules are not particularly distinguished, they may be simply referred to as fingertip modules 30.

The fingertip modules 30 are driven or sensed by corresponding finger joint modules 20. Specifically, describing about driving, the fingertip module 30-2 is detachably attached to the finger joint module 20-2 and is driven by the finger joint module 20-2. The fingertip module 30-3 is detachably attached to the fingertip module 30-2 and is driven by the fingertip module 30-2. The fingertip module 30-3 is detachably attached to the finger joint module 20-3 and is driven by the finger joint module 20-3. The fingertip module 30-4 is detachably attached to the finger joint module 20-4 and is driven by the finger joint module 20-4. The fingertip module 30-5 is detachably attached to the finger joint module 20-5 and is driven by the finger joint module 20-5. The same applies to sensing as well. Further details of the fingertip modules 30 will be described later.

Since the palm module 10, the finger joint modules 20, and the fingertip modules 30 are detachable as mentioned above, the exoskeleton robot 1 can be structured (prepared, produced, etc.) by combining any of the palm module 10, the finger joint modules 20, and the fingertip modules 30. Therefore, the exoskeleton robot 1 having an appropriate configuration corresponding to the application can be prepared, and training by the exoskeleton robot 1 can be provided.

Various exoskeleton robots 1 can be provided on the same platform such as exoskeleton robots in which five fingers are moved in five degrees of freedom or two fingers are each moved in two degrees of freedom. By customizing the exoskeleton robot 1 in such a manner as to support only joints and degrees of freedom that should be focused on in training among the three joints and the five degrees of freedom of one finger, it is possible to reduce the size or the weight of the exoskeleton robot 1 as compared with a case of supporting all the joints and degrees of freedom. By increasing the transparency of movement of other fingers, it is also facilitated to apply to such an application as actually moving a hand in the air. Some examples of customization of the exoskeleton robot 1 will be described with reference also to FIGS. 5 and 6.

Figure 5:
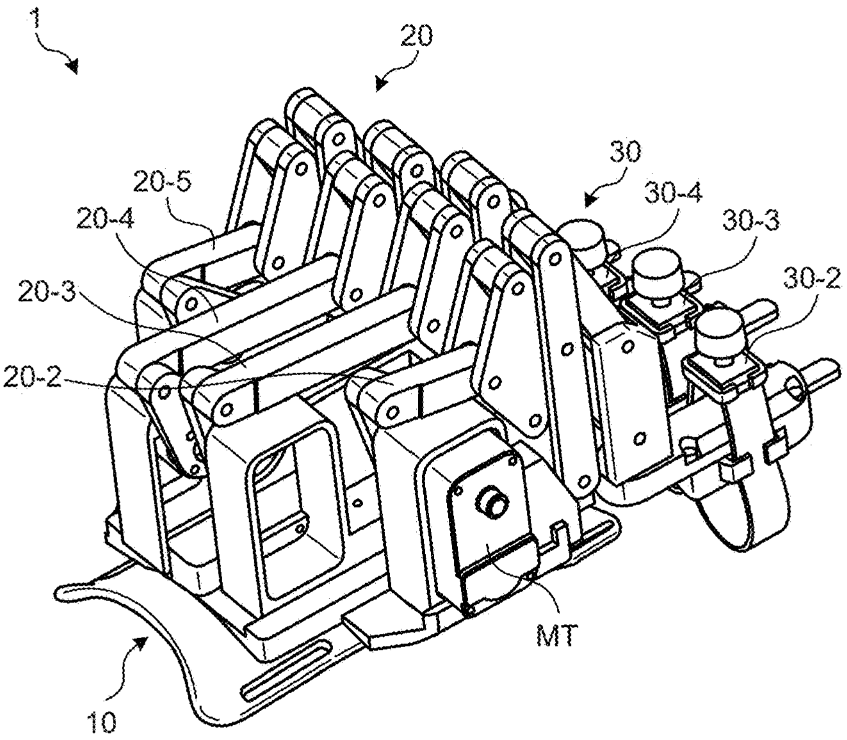
FIG. 5 is a diagram illustrating an example of customization of the exoskeleton robot.
Figure 6:
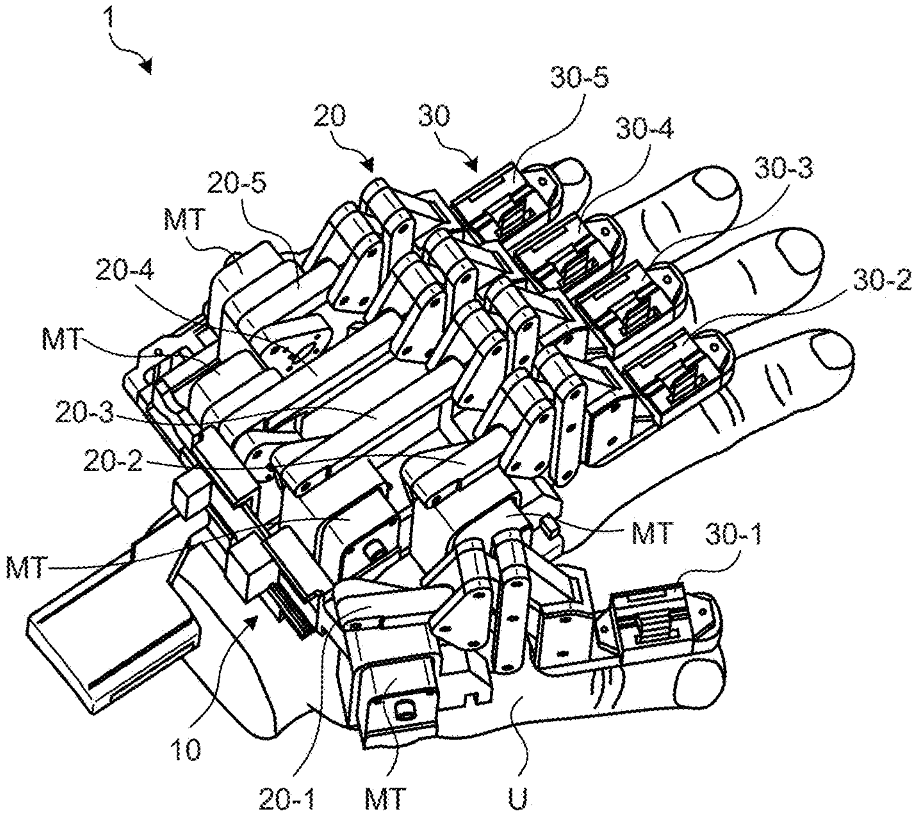
FIG. 6 is a diagram illustrating an example of customization of the exoskeleton robot.

FIGS. 5 and 6 are diagrams illustrating examples of customization of the exoskeleton robot. In the example illustrated in FIG. 5, among the finger joint module 20-2 to the finger joint module 20-5, only the finger joint module 20-2 is configured to have a driving function. The motor MT is mounted only on the finger joint module 20-2 among the finger joint module 20-2 to the finger joint module 20-5.

Although not illustrated in FIG. 5, the finger joint module 20-3 to the finger joint module 20-5 may be configured to have a sensing function. For example, a sensor such as an angle sensor that detects the movement of the fingertip module 30-3 may be mounted on the finger joint module 20-3. The same applies to the fingertip module 30-4 and the finger joint module 20-4.

In the example illustrated in FIG. 6, the exoskeleton robot 1 is configured to correspond support the five fingers of the thumb, the index finger, the middle finger, the ring finger, and the little finger. The finger joint module 20 of the exoskeleton robot 1 also includes a finger joint module 20-1 corresponding to the thumb. The fingertip module 30 also includes the fingertip module 30-1 corresponding to the thumb. The finger joint module 20-1 to the finger joint module 20-5 are each configured to have a driving function. The motor MT is mounted on each of the finger joint module 20-1 to the finger joint module 20-5.

1.3. Palm Module

Figure 7:
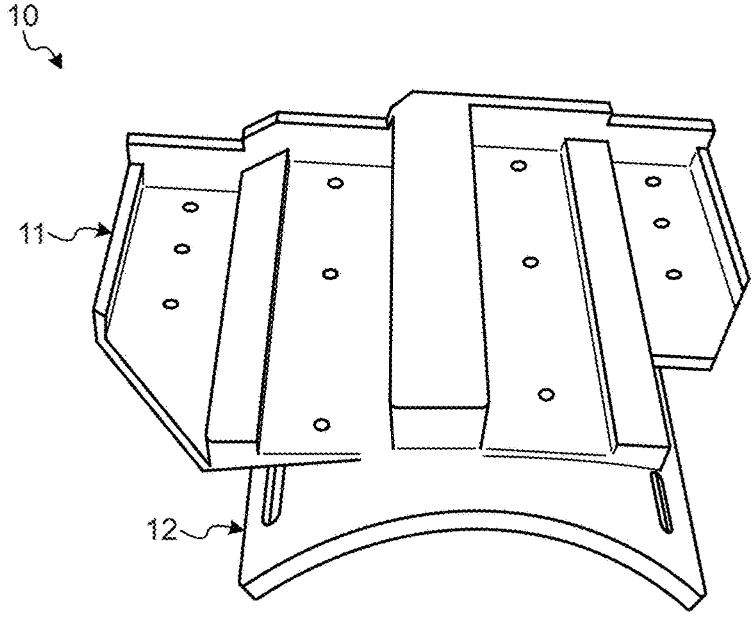
FIG. 7 is a diagram illustrating an example of a schematic configuration of a palm module.

FIG. 7 is a diagram illustrating an example of a schematic configuration of the palm module. The palm module 10 includes a first fixing unit 11 and a second fixing unit 12. The first fixing unit 11 is a portion to which the finger joint module 20 is fixed. The first fixing unit 11 is formed to have a shape suitable for attaching the finger joint module 20, for example. The second fixing unit 12 is a portion for fixing the palm module 10 to the hand of the user U. The second fixing unit 12 extends along the back of the hand of the user U. The second fixing unit 12 is a portion that comes into contact with the back of the hand of the user U and is formed to have a shape that fits the back of the hand of the user U, for example.

Figure 8:
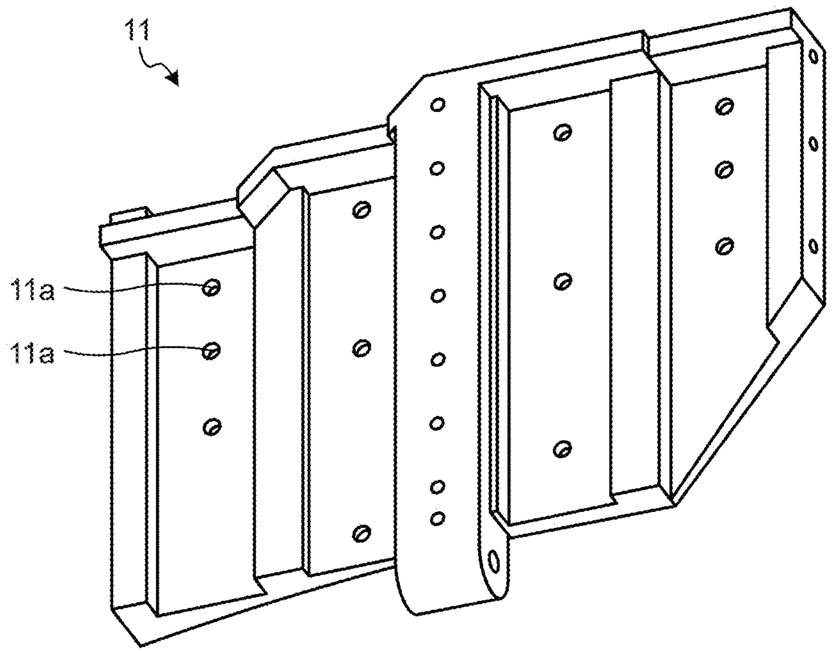
FIG. 8 is a diagram illustrating an example of a schematic configuration of a first fixing unit of the palm module.

FIG. 8 is a diagram illustrating an example of a schematic configuration of the first fixing unit of the palm module. The first fixing unit 11 has faces defined in such a manner as to be in contact with and to support the finger joint modules 20 and has a fixing means for fixing the finger joint modules 20. The fixing means is exemplified by a plurality of holes 11*a*. For example, a fixing bolt is inserted into a hole 11*a*.

Figure 9:
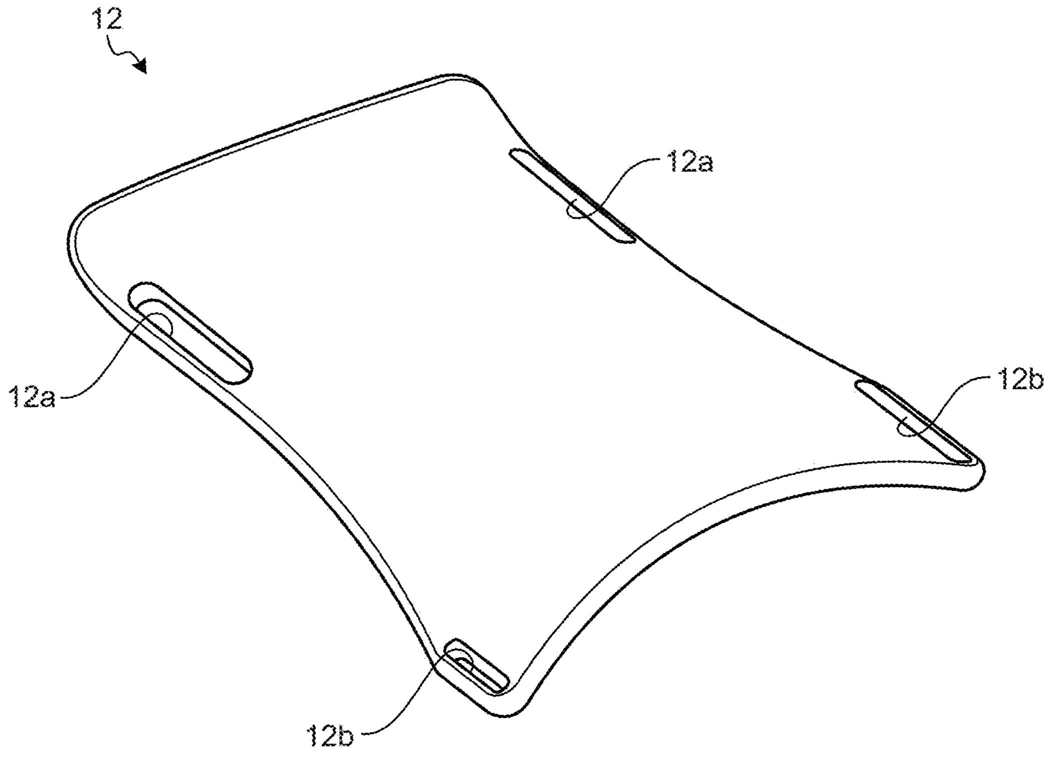
FIG. 9 is a diagram illustrating an example of a schematic configuration of a second fixing unit of the palm module.

FIG. 9 is a diagram illustrating an example of a schematic configuration of the second fixing unit of the palm module. The second fixing unit 12 has a curved surface smoothly defined along the back of the hand of the user U. For example, the second fixing unit 12 has a rounded shape in the vicinity of the wrist such that no excessive pressure is applied to the wrist during dorsiflexion of the wrist.

In the example illustrated in FIG. 9, the second fixing unit 12 has a pair of slit holes 12*a* and 12*a* and a pair of slit holes 12*b* and 12*b*. Bands for fixing the relative position between the palm module 10 and the hand of the user U are attached (inserted or other means) to the slit holes 12*a* and the slit holes 12*b*. Note that, in this example, the width of one slit hole 12*b* of the pair of slit holes 12*b* and 12*b* is smaller than the width of the other slit hole 12*b*.

Figure 10:
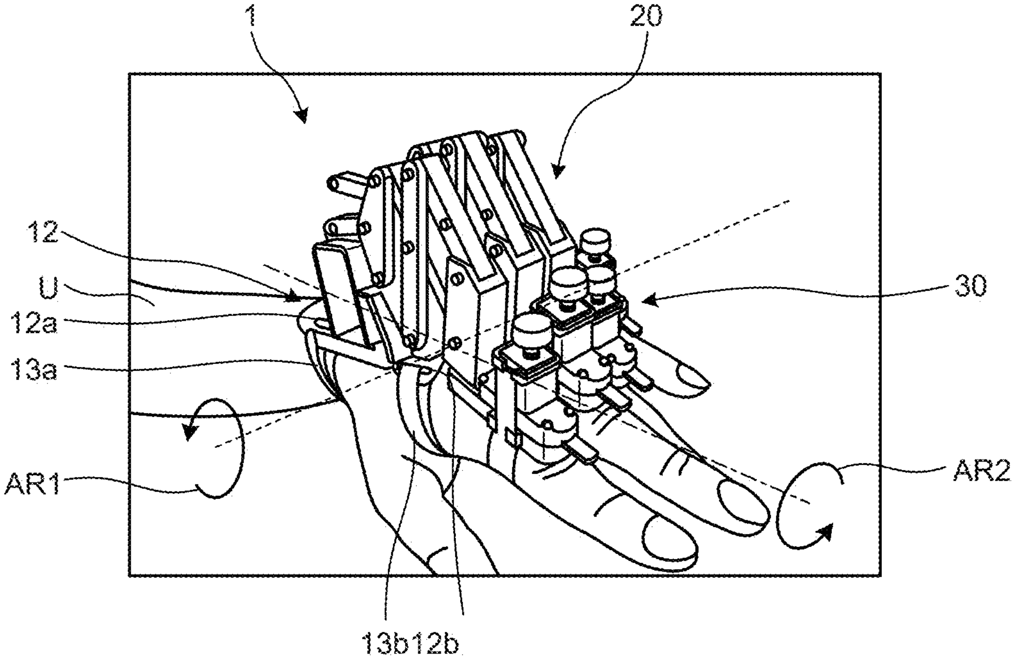
FIG. 10 is a diagram illustrating an example of fixation of the palm module by bands.
Figure 11:
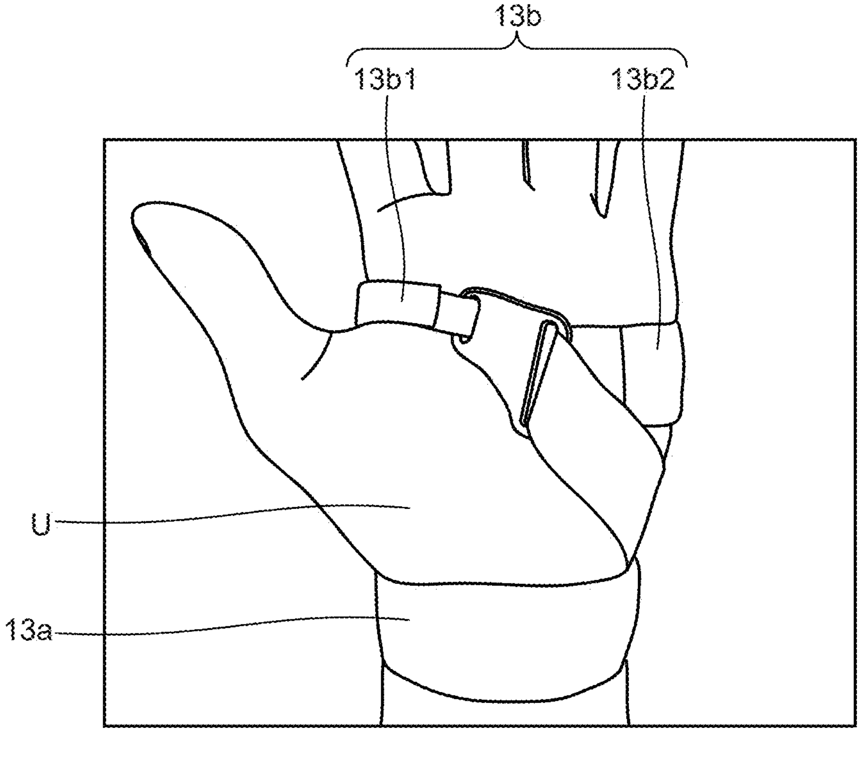
FIG. 11 is a diagram illustrating an example of fixation of the palm module by the bands.

FIGS. 10 and 11 are diagrams illustrating an example of fixing of the palm module by the bands. A band inserted through the slit holes 12*a* of the palm module 10 is referred to as a band 13*a* in the drawing. A band inserted through the slit holes 12*b* is referred to as a band 13*b* in the drawing. A specific example of the band 13*a* and the band 13*b* is a Velcro strap (Velcro is a registered trademark) or the like. The band 13*a* extends from the second fixing unit 12 in such a manner as to surround the wrist of the user U.

The band 13*b* extends from the second fixing unit 12 in such a manner as to cover a portion of the palm of the user U. The part of the palm mentioned here may be a portion of the palm not including the interdigital region and the thenar. In the example illustrated in FIG. 11, the band 13*b* extends immediately below the interdigital region. With the band 13*b* being in contact with the palm in such a manner as to avoid joints and movement or bulging of the skin that deforms at the time of a motion of each joint, it is possible to prevent the band 13*b* from inhibiting motions of the fingers.

As illustrated in FIG. 11, the width of a portion of the band 13*b* passing between the interdigital region and the thenar of the user U may be narrower than the width of other portions. Specifically, the band 13*b* includes a first portion 13*b*1 and a second portion 13*b*2. The first portion 13*b*1 passes between the interdigital region of the index finger and the thenar. The width of the first portion 13*b*1 is narrower than the width of the second portion 13*b*2, whereby the band 13*b* can extend while simultaneously avoiding the interdigital region of the index finger and the thenar. The robustness of the band 13*b* can be enhanced and the safety and the like can be improved as compared with a case where the width of the entire band 13*b* is made narrow like the width of the first portion 13*b*1. Note that the first portion 13*b*1 out of the first portion 13*b*1 and the second portion 13*b*2 is attached to the slit hole 12*b* having the smaller width out of the pair of slit holes 12*b* and 12*b*.

The second fixing unit 12 is fixed to the hand of the user U by the band 13*a* and the band 13*b*. For example, rotation indicated by an arrow AR1 or AR2 in FIG. 10 is suppressed.

The arrow AR1 indicates rotation about a left-right direction axis, indicated by a broken line, as a rotation axis. A force in this rotation direction is mainly generated when the fingers are moved. If the fixation of the palm module 10 is not sufficient, the force and rotation angle required to move the fingers are consumed by rotation of the exoskeleton robot 1, which may lead to a possibility that the force to move the fingers cannot be sufficiently propagated or that the fingers cannot be moved by a sufficient angle. Fixing the palm module 10 securely with the bands 13*a* and 13*b* can address such issues.

An arrow AR2 indicates rotation about a front-rear direction axis, indicated by an alternate long and short dash line, as a rotation axis. In particular, the band 13*b* improves the frictional force with the skin of the hand of the user U, whereby a shift in the rotation direction is suppressed.

For example, as described above, the palm module can be securely fixed to the hand of the user U. Stable wearing of the palm module 10 can contribute to provision of appropriate training. For example, it is possible to cope with an issue that the exoskeleton robot 1 moves around during motions and that the training effect is weakened due to generation of a gap between the palm module and the palm. An issue that fingers interfere with the palm module 10 during training to inhibit motions can also be addressed.

Note that a fixing means other than the above-described band 13*a* and the band 13*b* may be used. Other examples of the fixing means include cloth accessories such as gloves or plasters, dedicated jigs, and the like. A jig will be described with reference to FIG. 12.

Figure 12:
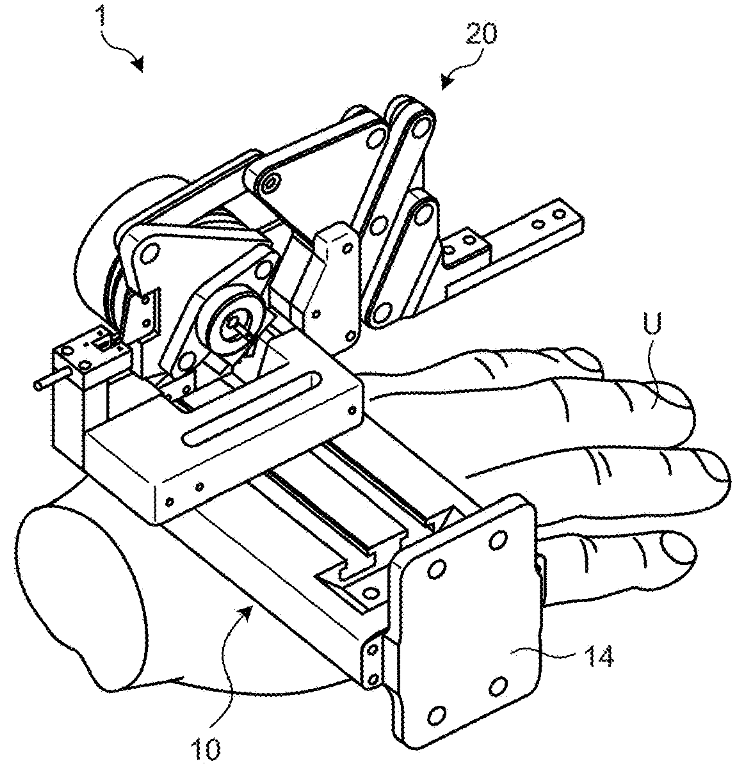
FIG. 12 is a diagram illustrating an example of a jig.

FIG. 12 is a diagram illustrating an example of the jig. The palm module 10 is fixed to a jig 14, whereby the relative position between the palm module 10 and the user U is fixed. A mode of fixing the palm module 10 to the jig 14 is not particularly limited. Thus, for example, the palm module 10 can be spatially fixed to the jig 14.

The first fixing unit 11 and the second fixing unit 12 may be integrally formed or may be separately formed. In a case where the first fixing unit 11 and the second fixing unit 12 are integrally formed, the rigidity, the space, and the like can be easily secured. In a case where the first fixing unit 11 and the second fixing unit 12 are separately formed, it is possible to adjust the relative positions of the first fixing unit and the second fixing unit. This will be described with reference to FIGS. 13 and 14.

Figure 13:
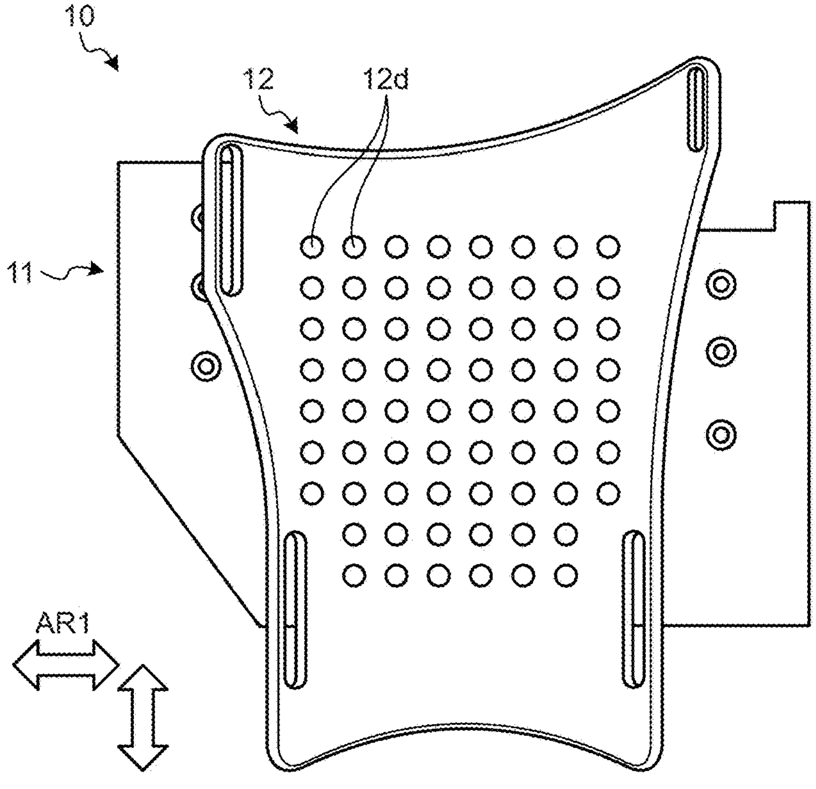
FIG. 13 is a diagram illustrating an example of a schematic configuration of the palm module.
Figure 14:
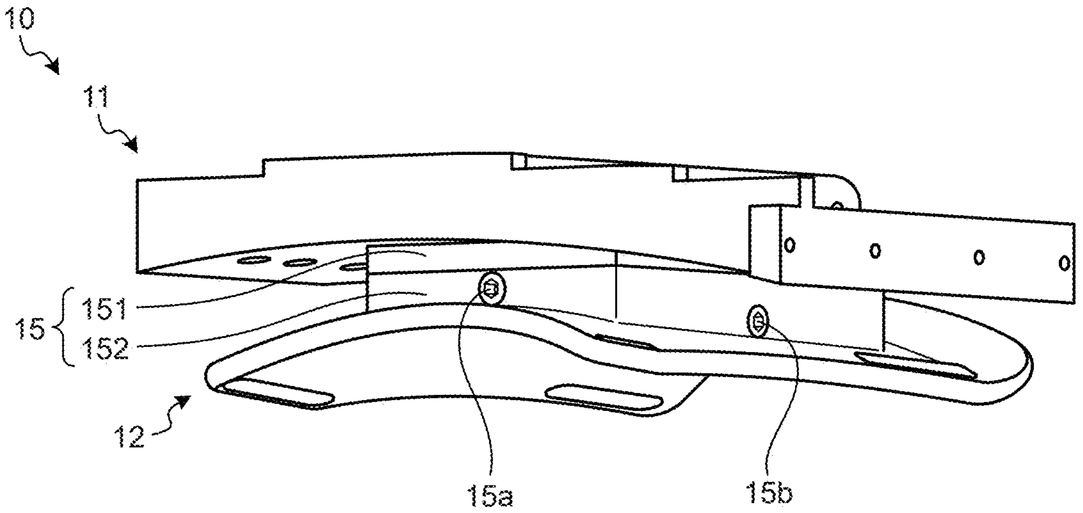
FIG. 14 is a diagram illustrating an example of a schematic configuration of the palm module.

FIGS. 13 and 14 are diagrams illustrating an example of a schematic configuration of the palm module. In this example, the first fixing unit 11 and the second fixing unit 12 of the palm module 10 are separately formed and fixed (coupled, etc.) in such a manner that their relative positions are adjustable.

In the example illustrated in FIG. 13, the second fixing unit 12 has a plurality of connecting holes 12*d* arranged in a lattice pattern. The second fixing unit 12 is screwed to the first fixing unit 11 via any connecting holes 12*d* among the plurality of connecting holes 12*d*. In an arrangement direction of connecting holes 12*d*, the relative position of the first fixing unit 11 and the second fixing unit 12 can be adjusted at arrangement intervals.

In the example illustrated in FIG. 14, an adjustment block 15 for adjusting the relative position of the first fixing unit 11 and the second fixing unit 12 is provided between the first fixing unit 11 and the second fixing unit 12. In this example, the adjustment block 15 includes a first adjustment block 151, a second adjustment block 152, an adjustment screw 15*a*, and an adjustment screw 15*b*.

The first adjustment block 151 is fixed to the bottom surface of the first fixing unit 11. The second adjustment block 152 is fixed to the top surface of the second fixing unit 12. The first adjustment block 151 and the second adjustment block 152 are configured to be connectable in such a manner as to be able to be positioned relative to each other.

Specifically, in the example illustrated in FIG. 14, the relative position of the first adjustment block 151 and the second adjustment block 152 are adjusted by the adjustment screw 15*a* and the adjustment screw 15*b*. For example, the relative position in the front-rear direction is adjusted by rotating the adjustment screw 15*a*. The relative position in the left-right direction is adjusted by rotating the adjustment screw 15*b*.

By making the relative position of the first fixing unit 11 and the second fixing unit 12 adjustable as described above, the palm module 10 can be easily fitted to the shape of the hand of the user U. This increases the possibility of improving the wearability of the exoskeleton robot 1 or improving the operability when the exoskeleton robot 1 is worn.

The first fixing unit 11 and the second fixing unit 12 of various shapes may be combined. For example, a first fixing unit 11 having a shape suitable for the number and the type of modules of the finger joint module 20 may be selected. A second fixing unit 12 having a shape conforming to the size and the shape of the hand that can vary depending on the age (adult, child, etc.), the sex, and others of the user U may be selected.

1.4. Finger Joint Module

FIGS. 15 to 18 are diagrams illustrating an example of a schematic configuration of a finger joint module. A finger joint module 20 includes a mechanism MV. The mechanism MV moves finger joints of the user U, for example, via a corresponding fingertip module 30. Examples of the joint include the DIP joint, the PIP joint, the MP joint, and the CM joint. The mechanism MV illustrated in the drawing is a parallel link mechanism.

In one embodiment, the mechanism MV may be an RCM mechanism configured to have a remote center of motion (RCM) at a finger joint of the user U. As a result, the exoskeleton robot 1 can be attached to the finger without hindering the motion of the finger. A variety of finger joint modules 20 may be selectively employed, and some examples are illustrated in FIGS. 15 through 18.

Figure 15:
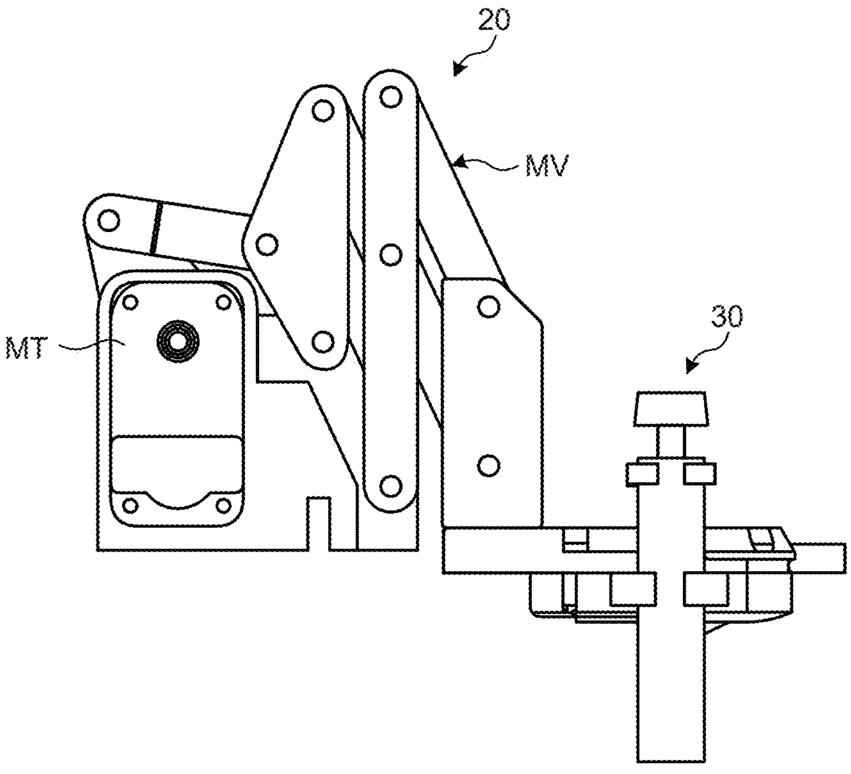
FIG. 15 is a diagram illustrating an example of a schematic configuration of a finger joint module.

In the example illustrated in FIG. 15, the finger joint module 20 has a driving function, and more specifically includes a motor MT so as to have one degree of freedom. The motor MT may be a servo motor, and the finger joint module 20 in this case can also be referred to as a one-degree-of-freedom servo module. The finger joint module 20 moves a corresponding fingertip module 30 in the up-down direction. The finger of the user U can be moved to perform a keystroke operation.

Figure 16:
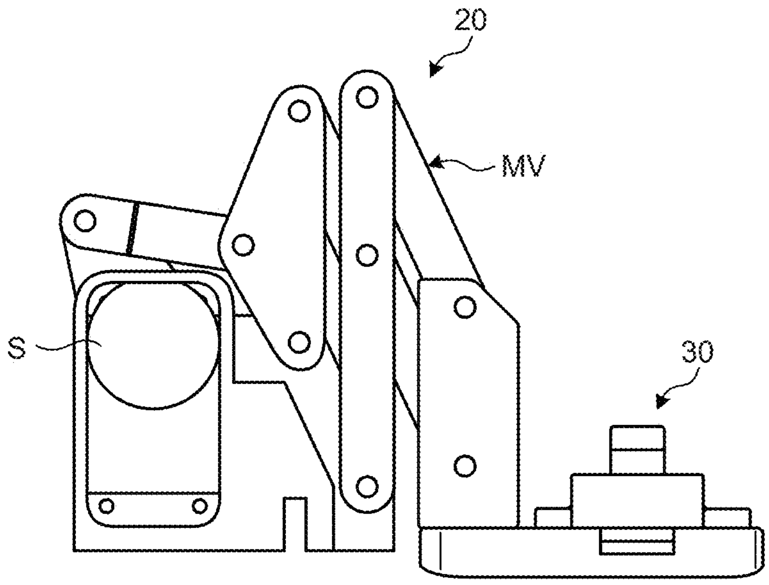
FIG. 16 is a diagram illustrating an example of a schematic configuration of the finger joint module.

In the example illustrated in FIG. 16, the finger joint module 20 includes a sensor such as an angle sensor in such a manner as to have a sensing function. The sensor is referred to as a sensor S in the drawing. The finger joint module 20 may not include the motor MT, and the weight of the finger joint module 20 can be reduced accordingly.

Figure 17:
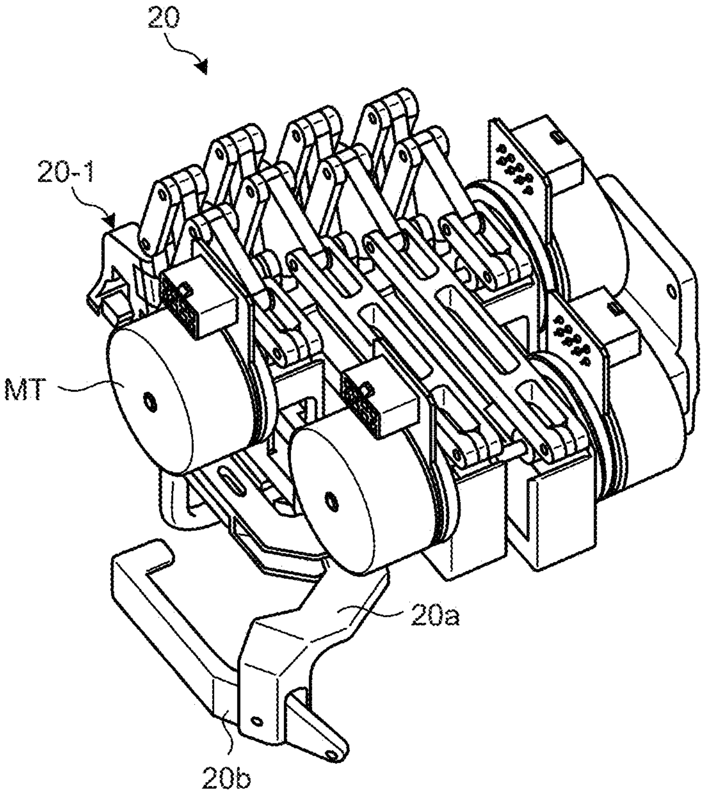
FIG. 17 is a diagram illustrating an example of a schematic configuration of the finger joint module.
Figure 18:
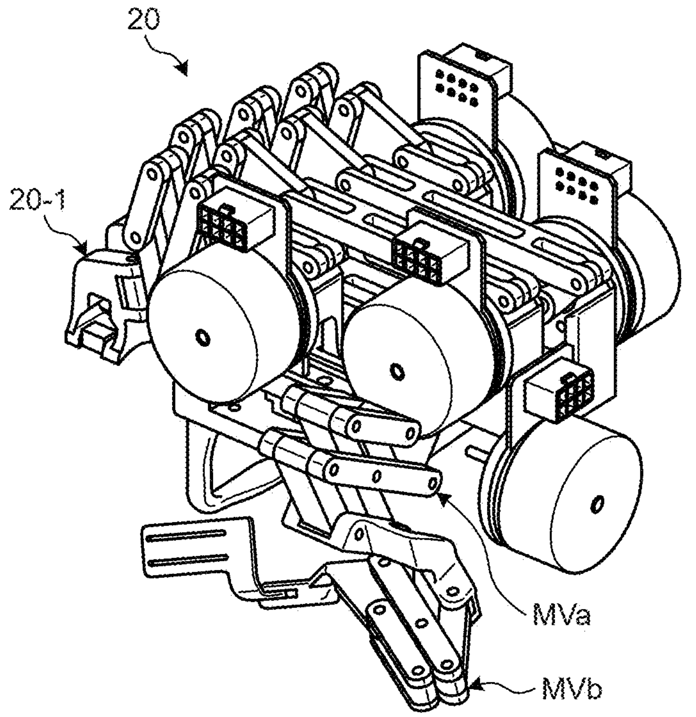
FIG. 18 is a diagram illustrating an example of a schematic configuration of the finger joint module.
Figure 19:
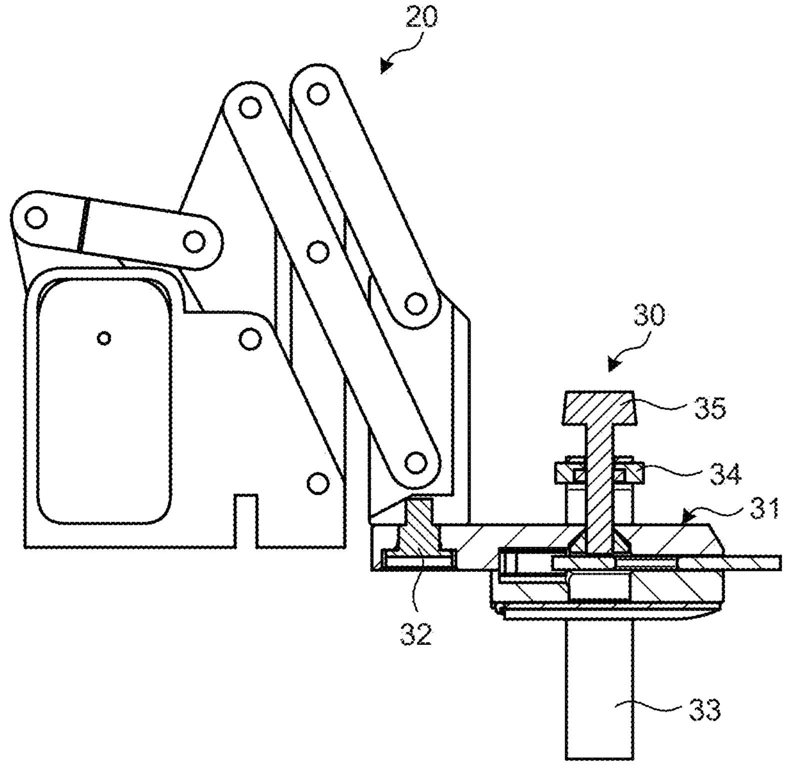
FIG. 19 is a diagram illustrating an example of a schematic configuration of a fingertip module.
Figure 20:
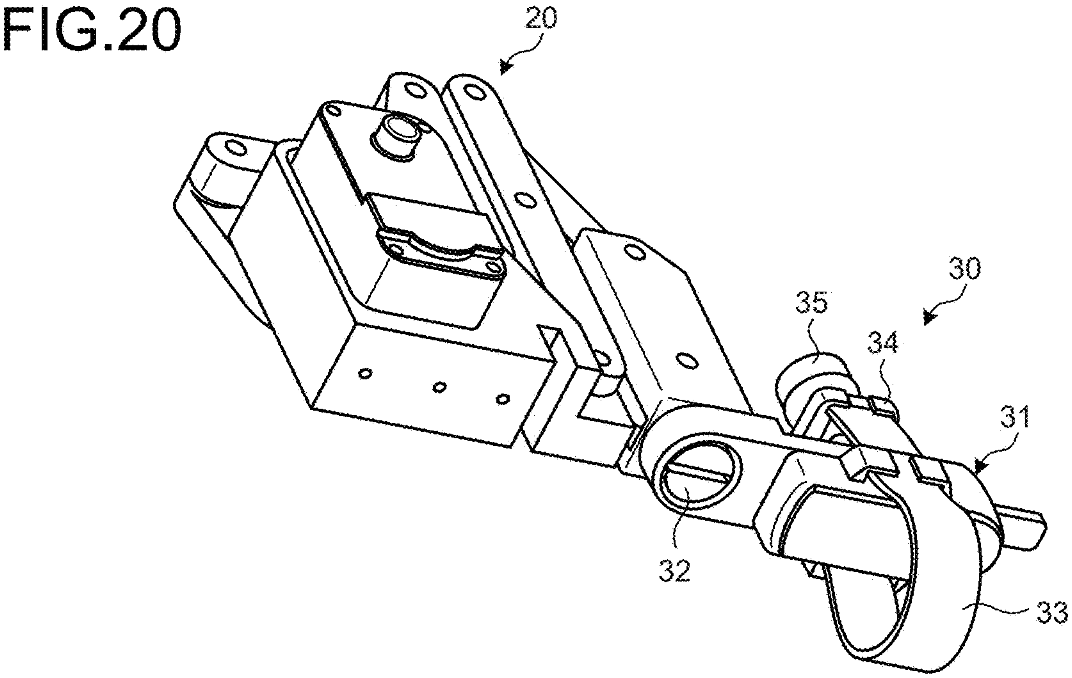
FIG. 20 is a diagram illustrating an example of a schematic configuration of the fingertip module.
Figure 21:
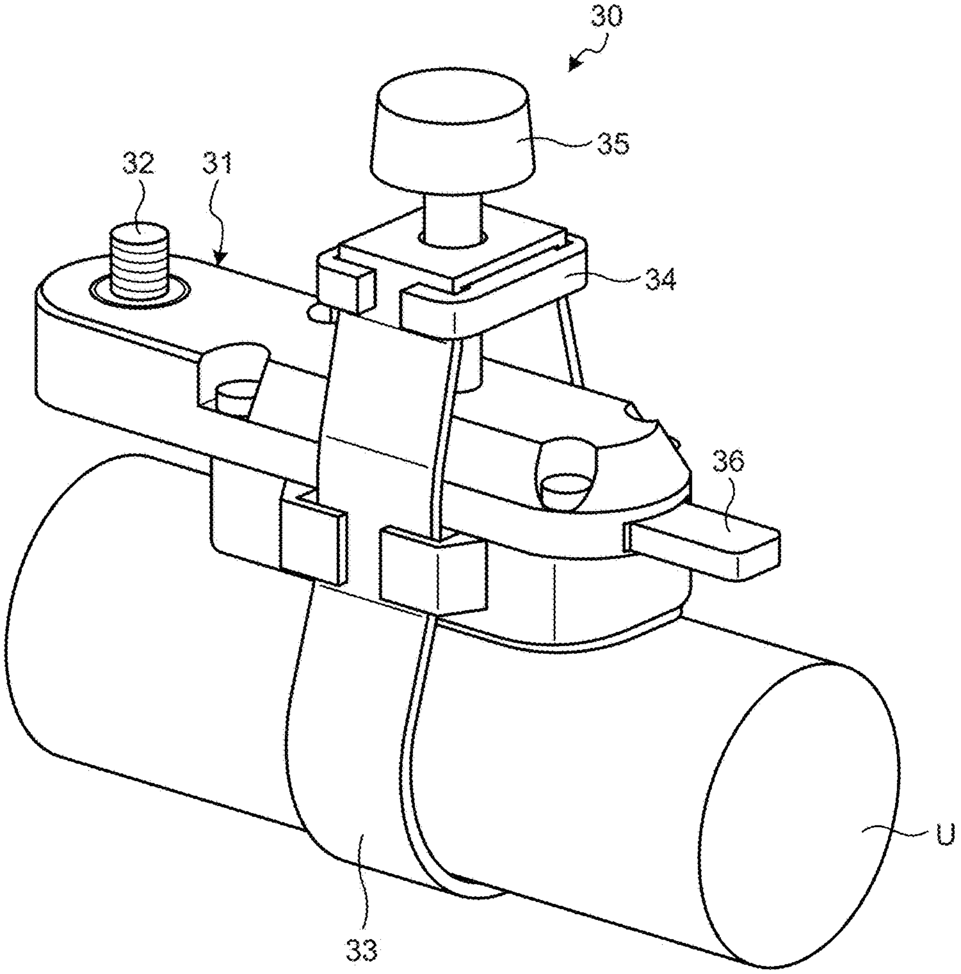
FIG. 21 is a diagram illustrating an example of a schematic configuration of the fingertip module.

In an example illustrated in FIGS. 17 and 18, the finger joint module 20-1 corresponding to the thumb includes a motor MT so as to have two degrees of freedom. For example, two degrees of freedom is provided to support the joint (CM joint) at the base of the thumb. The finger joint module 20-1 moves the fingertip module 30-1 in the up-down direction and the left-right direction. The motor MT may be a servo motor, and the finger joint module 20-1 in this case can also be referred to as a two-degree-of-freedom servo module.

In the example illustrated in FIG. 17, the finger joint module 20-1 includes a shaft 20*a* and a shaft 20*b*, each supporting a different degree of freedom. In this example, the shaft 20*a* and the shaft 20*b* extend in such a manner as to bypass the thumb.

In the example illustrated in FIG. 18, the finger joint module 20-1 includes a mechanism MVa and a mechanism MVb. The mechanism MVa and the mechanism MVb are two RCM mechanisms each having a center of rotation at a joint of the thumb of the user U. With the two mechanisms of the mechanism MVa and the mechanism MVb arranged together, the strength can be enhanced as compared with, for example, a case where only one mechanism is disposed.

Note that the motor MT is not limited to a servo motor. In applications in which touch feeling is emphasized, a configuration capable of direct driving by a brushless motor or the like may be adopted in order to ensure more transparency.

1.5. Fingertip Module

Figure 22:
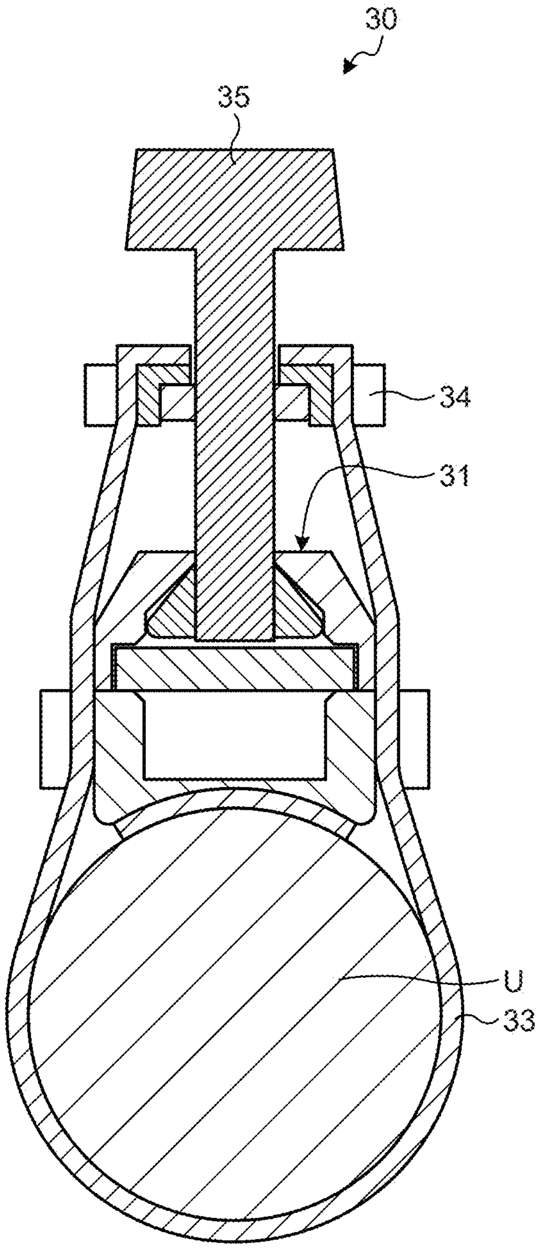
FIG. 22 is a diagram illustrating an example of a schematic configuration of the fingertip module.

FIGS. 19 to 22 are diagrams illustrating an example of a schematic configuration of a fingertip module. Note that FIG. 22 is a cross-sectional view when viewed in the front-rear direction. A fingertip module 30 includes a body 31, an attachment member 32, a band 33, a holder 34, and an adjustment screw 35.

The body 31 extends along the finger of the user U. In this example, the body 31 extends along the proximal portion of the finger. The attachment member 32 detachably attaches the end of the body 31 on a finger joint module 20 side to the finger joint module 20. The body 31 has a rotational degrees of freedom with the up-down direction axis of the attachment member 32 as the rotation axis. This rotation corresponds to motions of the finger in and out. In this example, the attachment member 32 is a stepped screw. Fixation between the finger joint module 20 and the fingertip module 30 as well as shaft fixation that secures a minimum necessary gap for smooth motions are implemented by one simple member. Not to mention that the attachment member 32 may be a normal screw that is not a stepped screw or may be a combination of a screw and a spacer, a combination of a bearing and a screw, or the like. The attachment member 32 may be configured to fix or release the fingertip module 30 to or from the finger joint module 20 by lever operation or the like. For example, a mechanism similar to a tire fixing mechanism of a bicycle or the like may be used. Simply rotating and turning the lever enable easy adjustment of the tightening amount and attachment or detachment, or the like.

The attachment member 32 may be configured to fix or release the fingertip module 30 to or from the finger joint module 20 by sliding operation or the like. For example, by forming a recess and a protrusion with inclination in the finger joint module 20 and the fingertip module 30 and sliding to allow them to be engaged with each other, the finger joint module and the fingertip module 30 can be fixed to each other or released.

The band 33 is held by the holder 34 and extends from the body 31 in such a manner as to cover a part of the finger of the user U, in this example, the proximal portion of the finger. As a result, the fingertip module 30 is fixed to the finger of the user U. The material of the band 33 is not particularly limited. For example, a material having elasticity and capable of providing a high frictional force with the finger of the user U may be used. Examples of such materials include resins such as silicone and rubber.

The holder 34 is provided on the side opposite to the finger of the user U with the body 31 interposed therebetween and holds the band 33. The adjustment screw passes through the holder 34 (including the portion of the band 33 being held) with its tip reaching the body 31 in such a manner as to adjust the distance between the holder 34 and the body 31. The user U can pinch and rotate the adjustment screw 35 with fingers, for example, whereby the tightening force of the band 33 is finely adjusted. For example, when the adjustment screw 35 is rotated such that the distance between the holder 34 and the body 31 increases (such that the holder 34 moves upward), the band 33 tightens up the finger of the user U in such a manner as to push up the finger of the user U towards the body 31. The fixing force for tightening up the fingertip is adjusted depending on the rotation amount of the adjustment screw 35.

The adjustment width of the band 33 depends on the length of the adjustment screw 35. The adjustment screw 35 is only required to have a length enough to move the holder 34 by about 30 mm, for example. It is possible to support sizes of a wide range of users U from children to adults. In addition, since the holder 34 pulls up the band 33 with equal forces on the left and right sides, the fingertip module 30 can be fixed to the finger of the user U without applying a biased force to the left or right to the finger of the user U.

Meanwhile, in order to smoothly perform the operation of fixing and removing the fingertip module 30 to and from the finger of the user U, it is necessary to provide a sufficient gap between the finger and the band 33. That is, it is necessary to sufficiently loosen the band 33. If the adjustment screw 35 has to be rotated many times when the band 33 is loosened, it takes time and effort and lacks convenience. In one embodiment, the fingertip module 30 may include a release mechanism that instantaneously loosens the band 33. This will be described with reference to FIG. 23 to FIG. 30.

Figure 23:
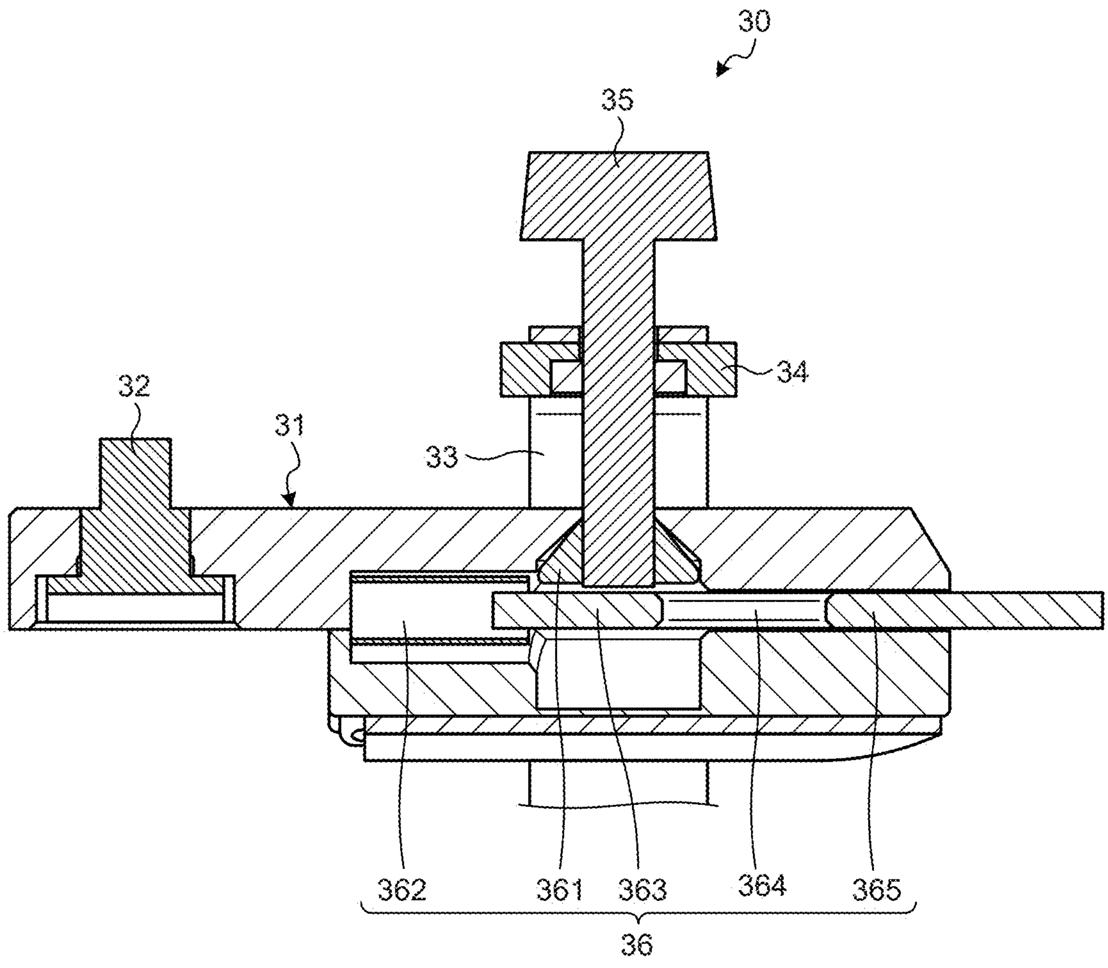
FIG. 23 is a diagram illustrating an example of a release mechanism.

FIG. 23 is a diagram illustrating an example of the release mechanism. The release mechanism included in the fingertip module 30 is referred to as a release mechanism 36 in the drawing. The release mechanism 36 moves the adjustment screw 35 such that the distance between the holder 34 and the body 31 decreases. In this example, the release mechanism 36 includes a cone 361, a spring 362, an abutment unit 363, a gap 364, and a release lever 365.

The cone 361 is fixed to a side surface of a tip portion of the adjustment screw 35. The cone 361 has a tapered shape whose diameter increases as it extends downward. Hereinafter, the adjustment screw 35 to which the cone 361 is fixed may be simply referred to as the adjustment screw 35 including the cone 361.

Below the adjustment screw 35, the spring 362, the abutment unit 363, the gap 364, and the release lever 365 are included in this order towards the front. Among them, the abutment unit 363, the gap 364, and the release lever 365 may be integrally formed. Hereinafter, the abutment unit 363, the gap 364, and the release lever 365 may be collectively referred to as the release lever 365 and the others.

The release lever 365 and the others are movable in a direction intersecting with the traveling direction of the adjustment screw 35. In this example, the traveling direction of the adjustment screw 35 is in the downward direction, and the release lever 365 and the others are movable in the front-rear direction. The spring 362 expands and contracts in the traveling direction of the release lever 365 and the others as the release lever 365 and the others move.

When the spring 362 is in an equilibrium state, the abutment unit 363 is located below (forward in the traveling direction) the adjustment screw 35. At this point, the abutment unit 363 abuts on the tip of the adjustment screw 35. When the spring 362 is in a compressed state, the gap 364 is located below the adjustment screw 35. At this point, the adjustment screw passes through the gap 364. The gap 364 is, for example, a portion that is connected between the abutment unit 363 and the release lever 365 and extends while bypassing the adjustment screw 35.

At least a part of the release lever 365 is exposed to the outside of the body 31. For example, when the user U pushes the release lever 365 towards the inside of the body 31, the state in which the abutment unit 363 is positioned below the adjustment screw 35 is switched to the state in which the gap 364 is positioned below the adjustment screw 35. As a result, the adjustment screw 35 moves forward, and the tightening by the band 33 is loosened (released) at once. This will be specifically described with reference to FIGS. 24 to 30.

Figure 24:
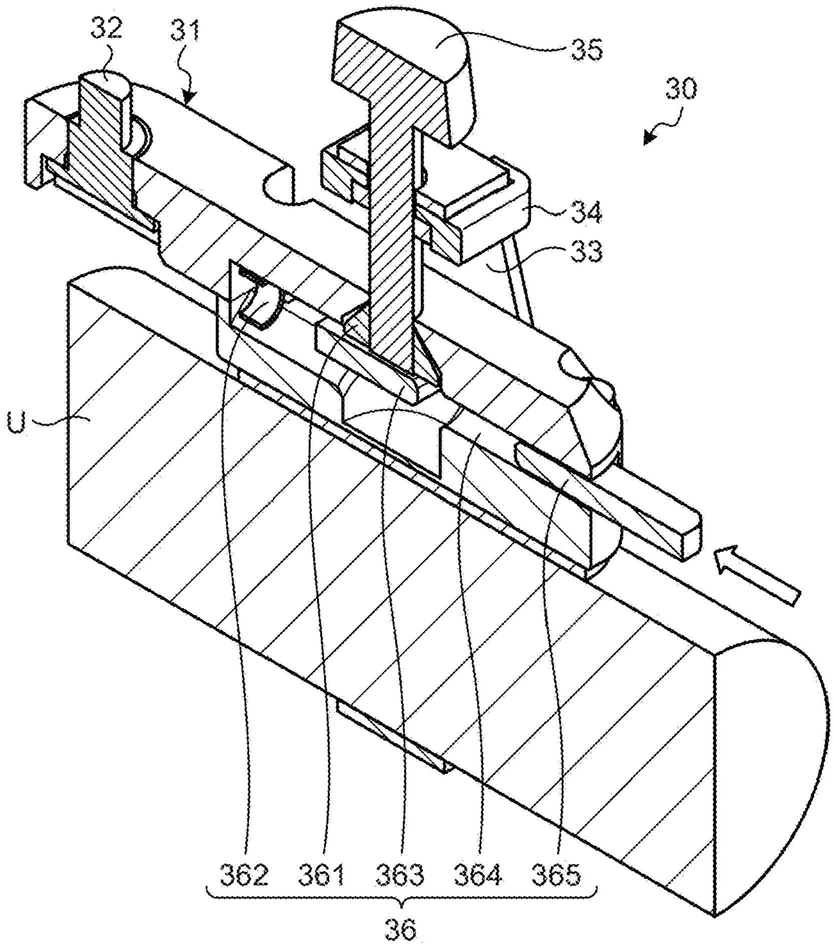
FIG. 24 is a diagram illustrating an example of the operation of the release mechanism.
Figure 25:
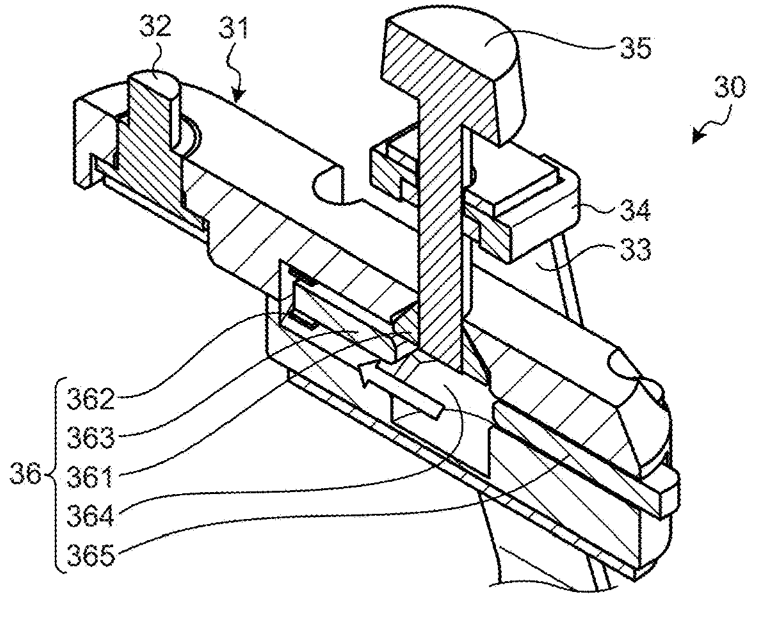
FIG. 25 is a diagram illustrating an example of the operation of the release mechanism.

FIGS. 24 to 30 are diagrams illustrating an example of the operation of the release mechanism. As illustrated in FIG. 24, in a state where the band 33 is tightened, the tip of the adjustment screw 35 abuts on the top surface of the abutment unit 363. When the release lever 365 is pushed in this state, as illustrated in FIG. 25, the spring 362 is compressed, and the release lever 365 and the others move such that the gap 364 is positioned below the adjustment screw 35.

Figure 26:
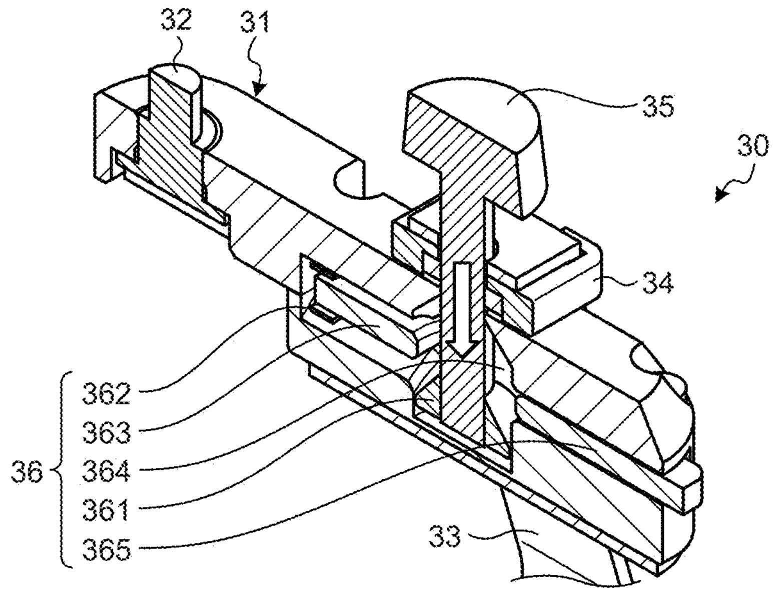
FIG. 26 is a diagram illustrating an example of the operation of the release mechanism.
Figure 27:
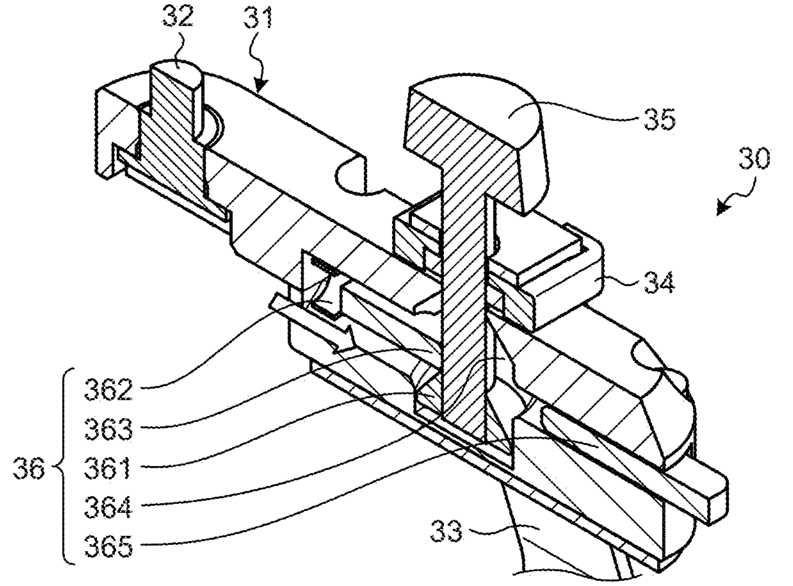
FIG. 27 is a diagram illustrating an example of the operation of the release mechanism.

As illustrated in FIG. 26, the adjustment screw passes through the gap 364 and moves up to the lowermost portion. When the pushing of the release lever 365 is released, as illustrated in FIG. 27, the release lever 365 and the others move forward by the extension (restoring force) of the spring 362, and a side surface of the abutment unit 363 abuts on the side surface of the adjustment screw 35. The movement of the release lever 365 and the others is stopped, and the adjustment screw 35 is half-locked.

Figure 28:
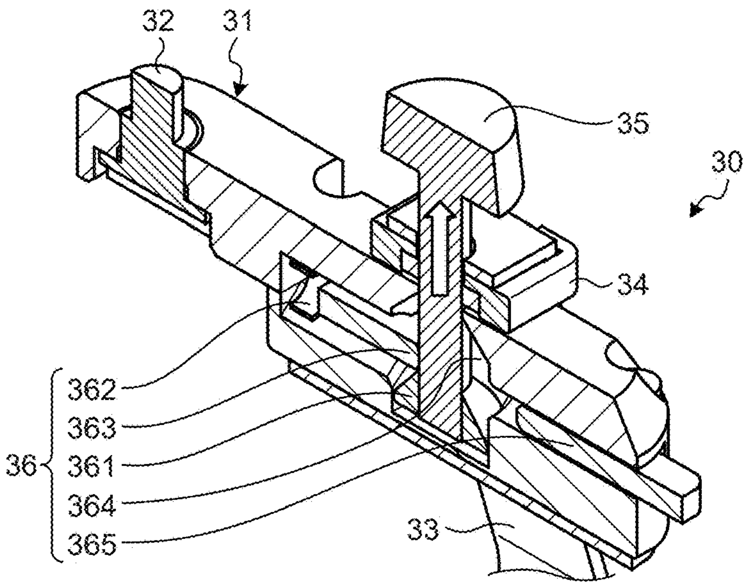
FIG. 28 is a diagram illustrating an example of the operation of the release mechanism.
Figure 29:
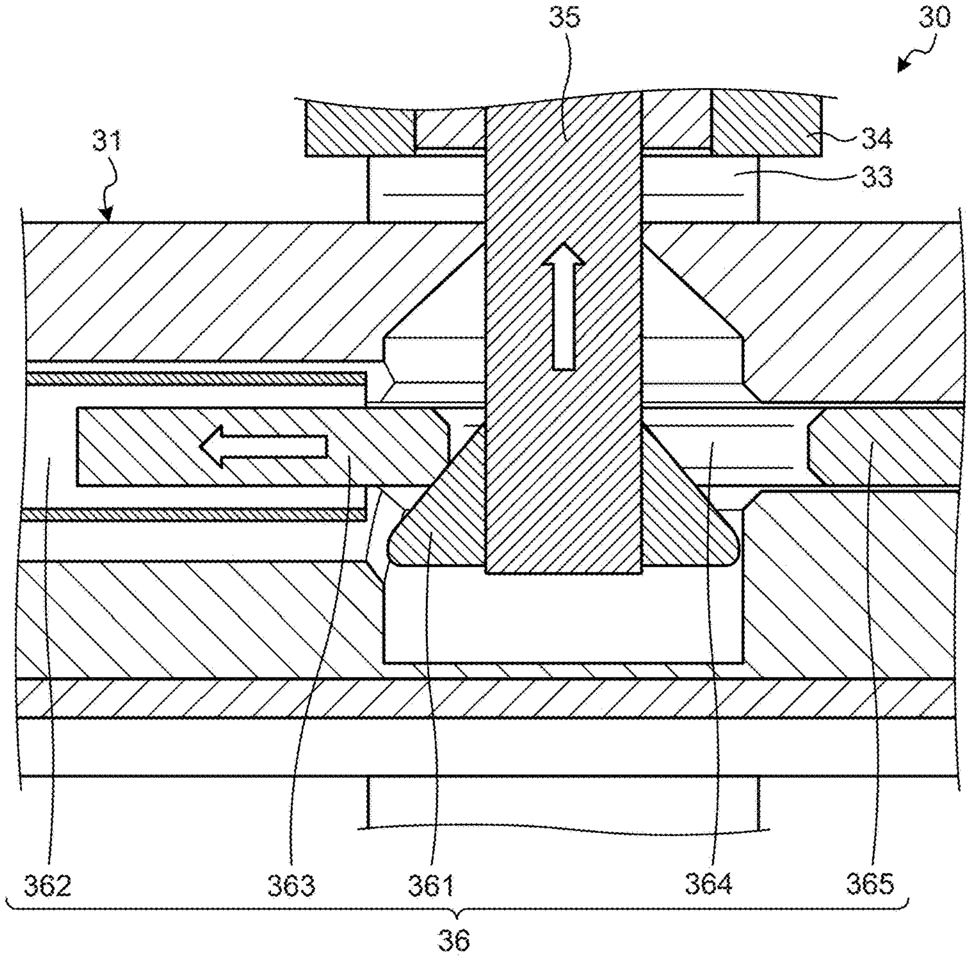
FIG. 29 is a diagram illustrating an example of the operation of the release mechanism.
Figure 30:
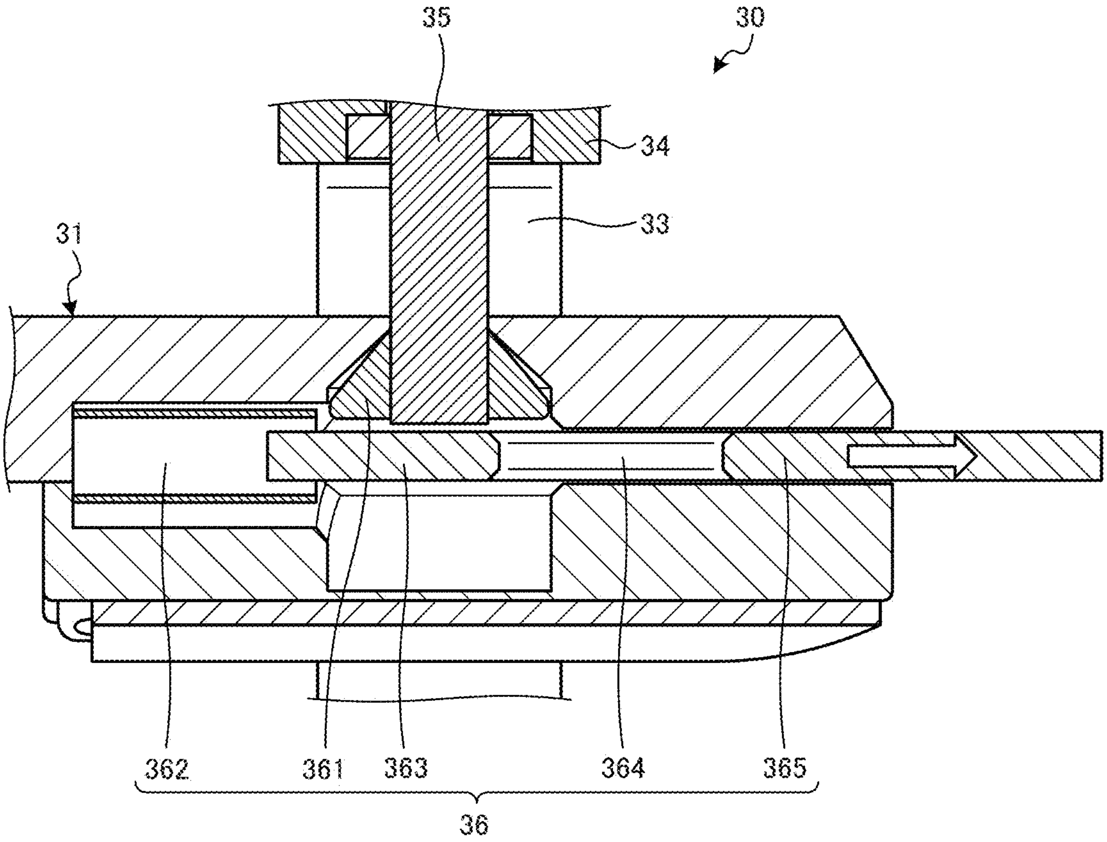
FIG. 30 is a diagram illustrating an example of the operation of the release mechanism.

As illustrated in FIGS. 28 and 29, when the adjustment screw 35 is pulled up, the inclined surface of the cone 361 abuts on the side surface of the abutment unit 363, and the release lever 365 and the others move in such a manner as to compress the spring 362. When the adjustment screw 35 returns to the uppermost portion, the physical contact between the cone 361 and the abutment unit 363 is lost, and as illustrated in FIG. 30, the release lever 365 and the others move (return to the original position) such that the abutment unit 363 is located below the adjustment screw 35 again by the extension of the spring 362. In this state, the adjustment screw 35 does not move downward unless the release lever 365 is pushed from the outside, whereby the adjustment screw 35 can tighten up the band 33.

For example, by using the release mechanism 36 as described above, the band 33 can be instantaneously loosened. This makes it possible to smoothly perform an operation of fixing or removing the palm module 10 to or from the finger of the user U.

Note that, in the above description, the case where the fingertip module 30 is fixed to the proximal portion of the finger of the user U has been described as an example. Note that the fingertip module 30 may be fixed to a portion of the finger other than the proximal portion. This will be described with reference to FIG. 31.

Figure 31:
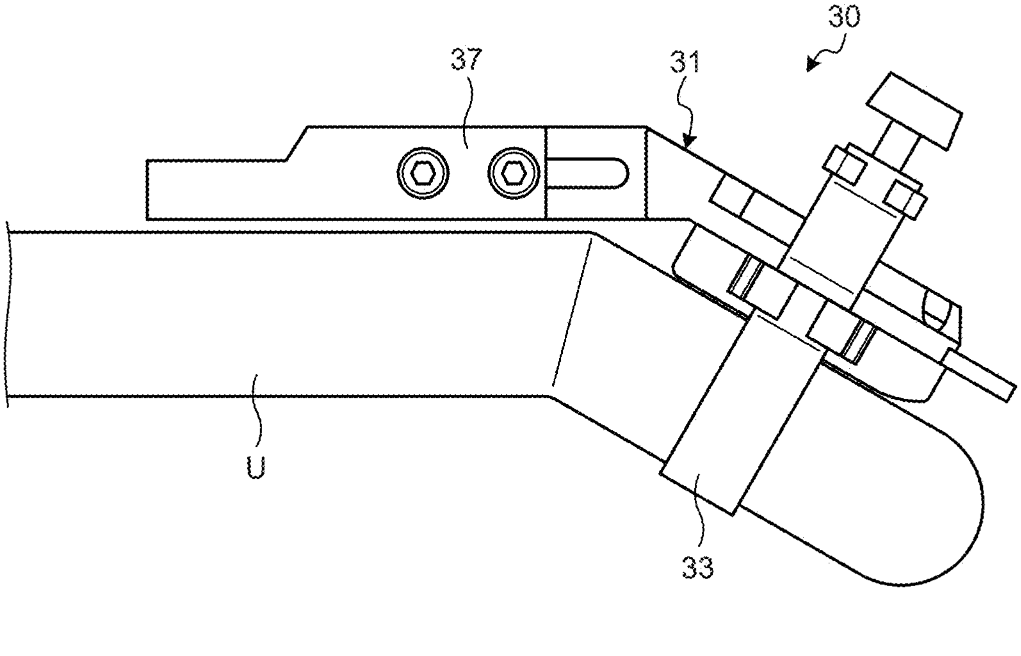
FIG. 31 is a diagram illustrating an example of a schematic configuration of the fingertip module.

FIG. 31 is a diagram illustrating an example of a schematic configuration of the fingertip module. In this example, the fingertip module 30 is fixed to the distal portion of the finger of the user U. Since the fixing by the band 33 is similar to that described above, description thereof will not be repeated. The body 31 of the fingertip module 30 includes a length adjusting mechanism 37. The length adjusting mechanism 37 is connected between a portion (attaching portion) of the body 31 attached to the finger joint module 20 and a portion (fixing portion) fixed to the finger of the user U. The length adjusting mechanism 37 is configured to be deformable. The length adjusting mechanism 37 that is illustrated as an example is a screwing slide mechanism; however, it is not limited thereto, and various known mechanisms capable of changing the length may be used. The distance between the attaching portion and the fixing portion can be adjusted by changing the length of the length adjusting mechanism 37. As a result, for example, it is possible to support fingers of users U having various lengths depending on individual differences.

By fixing the fingertip module 30 to the distal portion, it is possible to directly apply a force to the fingertip and to move the fingertip as compared with, for example, a case where the fingertip module 30 is fixed to the proximal portion. For this reason, the movement of the fingertip can be easily controlled. It can be suitably used for experiment tasks or training focusing on the fingertips.

In an embodiment, a sensor for the fingertip may be provided. This will be described with reference to FIG. 32.

Figures 32, 33:
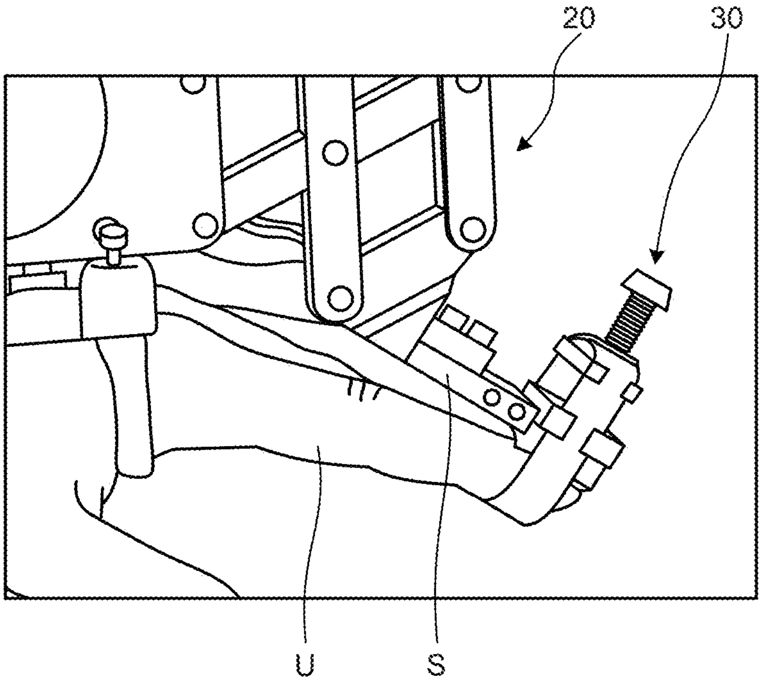
FIG. 32 is a diagram illustrating an example of a sensor provided for a fingertip.
FIG. 33 is a flowchart illustrating an example of processing (information processing method and control method) executed in the information processing device.

FIG. 32 is a diagram illustrating an example of a sensor provided for a fingertip. A sensor S is incorporated in the fingertip module 30. An example of the sensor S is a force sensor or the like. For example, a detection result of the sensor S can be used for feedback of a load applied to the fingertip. By feeding back the force applied to the fingertip in real time, application to force control and the like based on the fingertip force is possible.

Although not illustrated, a vibrator or the like may be provided instead of or together with the sensor S as described above. Tactile stimulation can be given to the fingertip.

1.6. Control Command

Referring back to FIG. 1, the controller 4 and the terminal device 5 of the information processing device 100 will be described. The controller 4 controls the exoskeleton robot 1. The control of the exoskeleton robot 1 by the controller 4 includes control such as driving (movement amount, angle, etc.) of the fingertip module 30 by the finger joint module 20. As will be described later, a control command generated by the terminal device 5 is transmitted from the terminal device 5 to the controller 4, and then from the controller 4 to the exoskeleton robot 1, whereby the exoskeleton robot 1 is controlled.

The controller 4 is configured to be communicable with the exoskeleton robot 1 and the terminal device 5. An example of the communication between the controller 4 and the exoskeleton robot 1 is serial communication or the like and may be performed, for example, for each finger joint module 20 in the exoskeleton robot 1. In FIG. 1, functional blocks of the controller 4 are also illustrated. The controller 4 includes a processing unit 41 and a power supply unit 42.

The processing unit 41 includes a microcontroller and others. Processing by the processing unit 41 includes transmission of a control command from the controller 4 to the exoskeleton robot 1, more specifically, from the controller 4 to each finger joint module 20. A finger joint module 20 drives a fingertip module 30 in accordance with the control command. For example, an ID may be assigned to each of the finger joint modules 20 of the exoskeleton robot 1. The control command is transmitted to a finger joint module 20 of a corresponding ID.

The processing by the processing unit 41 includes generation of an operation log of the exoskeleton robot 1. For example, an operation result of each finger joint module 20 of the exoskeleton robot 1 is transmitted from the finger joint module 20 to the controller 4. An operation log describing the operation results is generated by the processing unit 41 and transmitted from the controller 4 to the terminal device 5.

The power supply unit 42 functions as a power supply of the exoskeleton robot 1. The power supply unit 42 generates, for example, a voltage or a current suitable for the operation of the exoskeleton robot 1, more specifically, the operation of the finger joint module 20, and supplies the voltage or the current to the exoskeleton robot 1.

The terminal device 5 is communicably connected to the controller 4. Examples of communication include universal serial bus (USB) communication, Ethernet (registered trademark) communication, and Bluetooth (registered trademark) communication. The terminal device may be implemented using a general-purpose computer such as a PC. For example, the terminal device 5 generates the above-described control command and transmits the control command to the exoskeleton robot 1 via the controller 4. In addition, the terminal device 5 collects the operation log of the exoskeleton robot 1 via the controller 4.

Control commands for controlling the finger joint modules 20 may be collectively generated on the terminal device 5 and transmitted from the terminal device 5 to the controller 4. The control commands collectively generated here include information of the IDs of the finger joint modules 20. The controller 4 separates the control commands from the terminal device 5 into control commands for respective finger joint modules 20 on the basis of the IDs and transmits the control commands to the corresponding finger joint modules 20.

As described above, the control commands are collectively transmitted from the terminal device 5 to the controller 4, and the controller 4 transmits the control commands to the respective finger joint modules 20, whereby synchronization among the modules can be enhanced. In addition, including an ID in a control command makes it possible, basically, not to perform ID management in the controller 4. This allows the single controller 4 to be used for various exoskeleton robots 1.

In the example illustrated in FIG. 1, one controller 4 controls both an exoskeleton robot 1-L and an exoskeleton robot 1-R. As a result, synchronous operation (synchronous operation of both hands) of the exoskeleton robot 1-L and the exoskeleton robot 1-R is easily performed. Although not illustrated, a plurality of exoskeleton robots 1-L or a plurality of exoskeleton robots 1-R may be controlled by one controller 4.

Not a few types of training repeat the same task. To support this, a control command for specifying the task, the number of repetitions, time, or others can be transmitted. In addition, in a case where two or more exoskeleton robots 1 are connected to the controller 4, it is also possible to perform mirroring control such that one exoskeleton robot 1 operates similarly to another exoskeleton robot 1. This mirroring may be either in an unidirectional or a bidirectional. For example, it is possible to set the current angle of the finger joint module 20 of one exoskeleton robot 1 as a target angle of the finger joint module 20 of the other exoskeleton robot 1.

The two exoskeleton robots 1 may be two exoskeleton robots 1-L or two exoskeleton robots 1-R or may be a combination of one exoskeleton robot 1-L and one exoskeleton robot 1-R. The two exoskeleton robots 1 may be a combination of an exoskeleton robot 1 on which the sensor S is mounted and an exoskeleton robot 1 on which the motor MT is mounted.

FIG. 33 is a flowchart illustrating an example of processing (information processing method and control method) executed in the information processing device.

In Step S1, the terminal device 5 generates control commands. The control commands including IDs of respective finger joint modules 20 are collectively generated on the terminal device 5. The generated control commands are transmitted from the terminal device 5 to the controller 4.

In Step S2, the controller 4 separates a control command for each of the finger joint modules 20. The separated control commands are transmitted from the controller 4 to the corresponding finger joint modules 20.

In Step S3, the finger joint modules 20 execute the commands. The finger joint modules 20, for example, drive the corresponding fingertip modules 30 in accordance with the control commands. The operation results of the respective finger joint modules 20 are transmitted from the finger joint modules 20 to the controller 4.

In Step S4, the controller 4 collects the results. An operation log describing the operation results of the finger joint modules 20 is generated and transmitted from the controller 4 to the terminal device 5.

In Step S5, the terminal device 5 writes the operation results in a log file. The operation log is recorded (stored, accumulated, etc.).

The exoskeleton robot 1 is controlled as described above, for example.

1.7. UI

As described above, the control command is collectively generated on the terminal device 5. A graphical user interface (GUI) suitable for generation may be provided. This will be described with reference to FIGS. 34 and 35.

Figure 34:
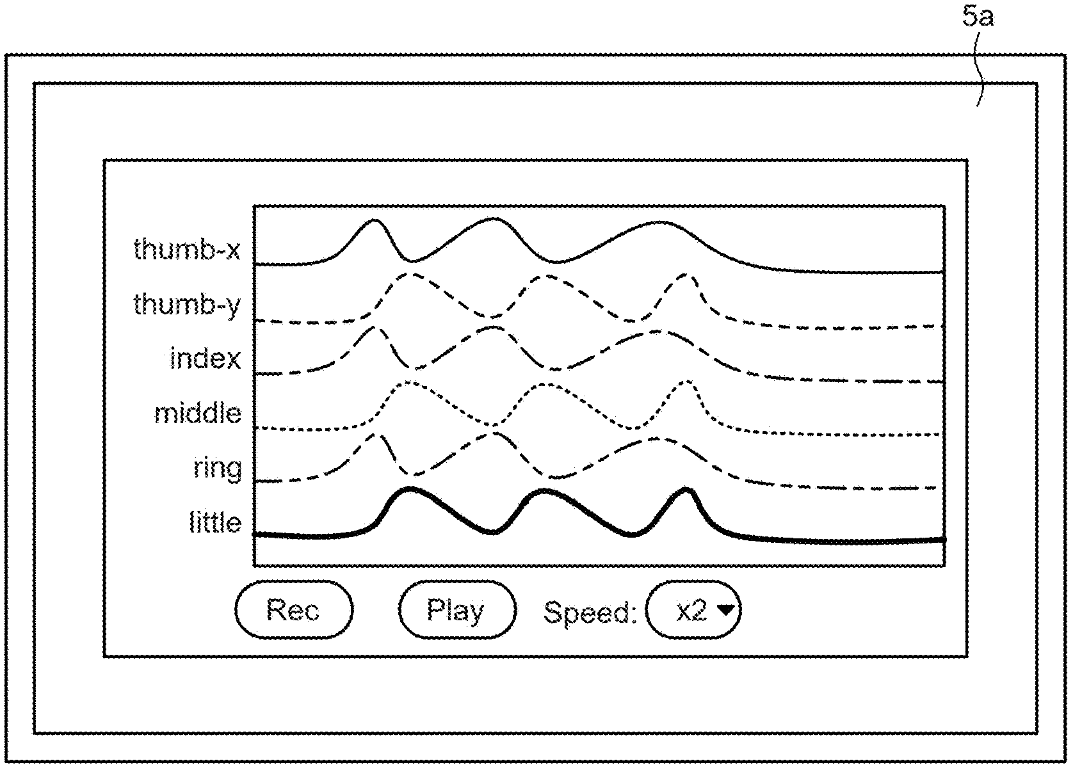
FIG. 34 is a diagram illustrating an example of generation of a control command.
Figure 35:
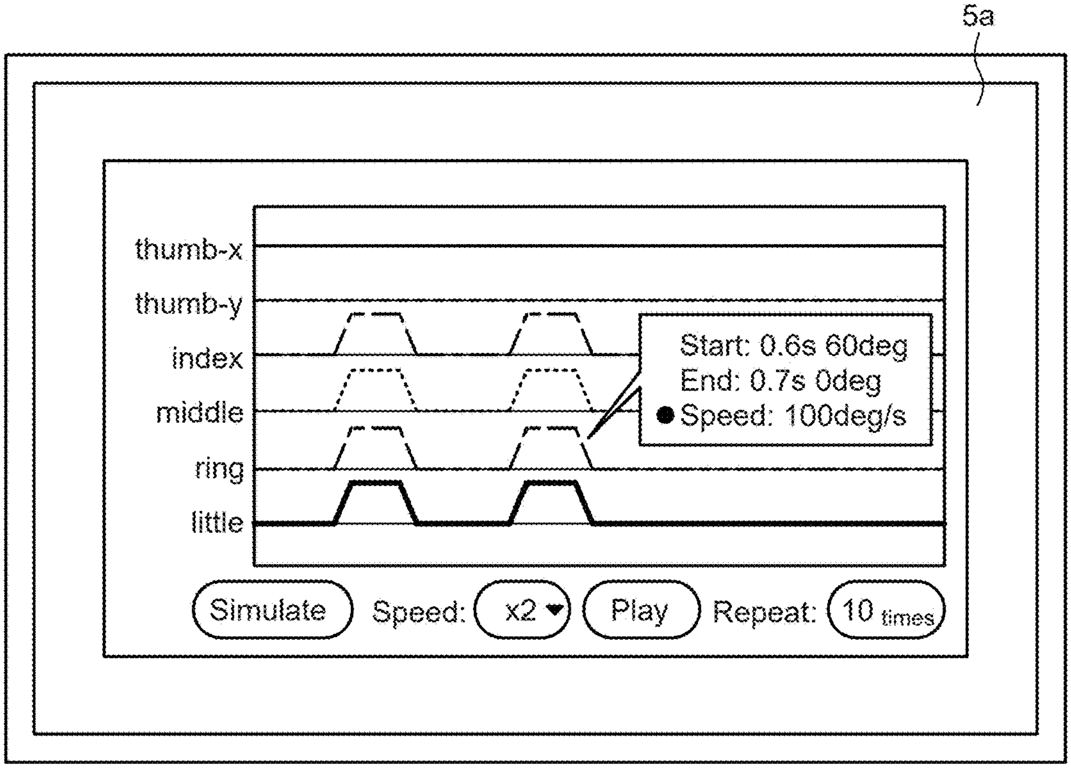
FIG. 35 is a diagram illustrating an example of generation of a control command.

FIGS. 34 and 35 are diagrams illustrating an example of generation of a control command. A screen for generating a control command is displayed on a display unit 5*a* of the terminal device 5. In this example, the control command is illustrated in a graph form and is generated by a user operation. The horizontal axis of the graph indicates time, and the vertical axis indicates the movement amount of the fingers. An item "thumb-x" and "thumb-y" in the vertical axis indicate the movement amount on one axis and the movement amount on the other axis of biaxial movement (up-down movement and horizontal movement) of the thumb, respectively. An item "index" indicates the movement amount of one-axis movement (up-down movement) of the index finger. An item "middle" indicates the movement amount of one-axis movement of the middle finger. An item "ring" indicates the movement amount of one-axis movement of the ring finger. An item "little" indicates the movement amount of one-axis movement of the little finger.

In the example illustrated in FIG. 34, control commands are generated by actively moving the exoskeleton robot 1 and editing the recorded data. For example, a piano player or the like wears the exoskeleton robot 1 or a similar device, on which sensors S for detecting the movement amount of the fingers are mounted, and plays the piano. Selecting "Rec" causes the sensor results at the time of performance, namely, the movement amount of the fingers to be recorded, and control commands for reproducing the movement amounts are generated. Selecting "Play" makes it possible to confirm the content of the performance or to change the speed of the performance. For example, in a case of a complicated performance operation, the control commands may be generated using a GUI as illustrated in FIG. 34.

In the example illustrated in FIG. 35, the control commands are generated from scratch by a user operation. A portion (node) where the movement amount of a finger changes is manually generated. For example, a node is defined by dragging a start position or an end position of a node or specifying a numerical value. As illustrated in FIG. 35, a dialog of a selected node may be displayed, whereby confirmation, setting, and the like of numerical values may be performed. An operation of adding a node by clicking a portion free from nodes may also be performed. Selecting "Simulate" makes it possible to confirm the content of the performance, and specifying a value for Repeat makes it possible to loop the performance or to determine the total performance time. For example, in a case of a simple performance operation, the control commands may be generated using a GUI as illustrated in FIG. 35.

1.8. Hardware Configuration Example

Figure 36:
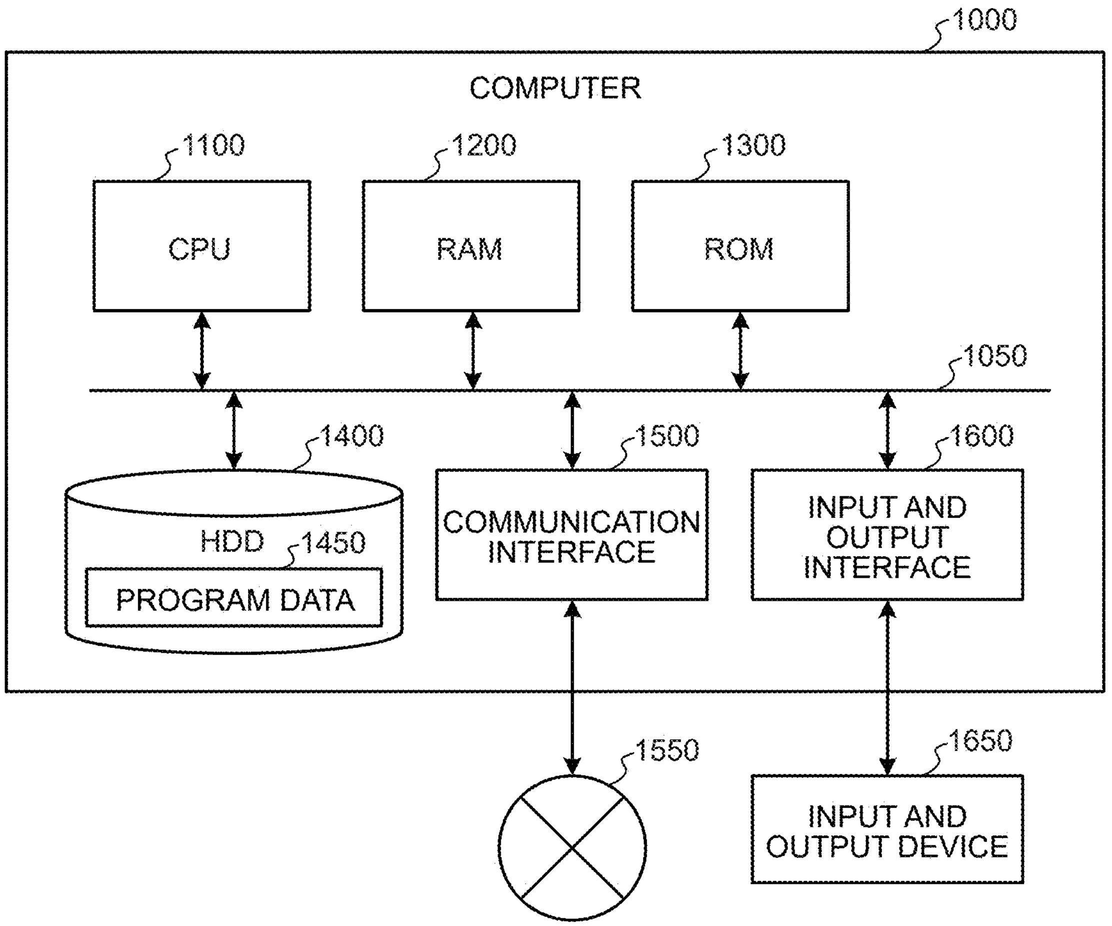
FIG. 36 is a diagram illustrating an example of a hardware configuration.

FIG. 36 is a diagram illustrating an example of the hardware configuration. The information processing device 100 (the controller 4, the terminal device 5, and the like) described above can include a computer 1000 as illustrated in FIG. 36, for example.

The computer 1000 includes a CPU 1100, a RAM 1200, a read only memory (ROM) 1300, a hard disk drive (HDD) 1400, a communication interface 1500, and an input and output interface 1600. The components of the computer 1000 are connected by a bus 1050.

The CPU 1100 operates in accordance with program data 1450 stored in the ROM 1300 or the HDD 1400 and controls each of the components. For example, the CPU 1100 loads the program data 1450 stored in the ROM 1300 or the HDD 1400 in the RAM 1200 and executes processing corresponding to various programs.

The ROM 1300 stores a boot program such as a basic input output system (BIOS) executed by the CPU 1100 when the computer 1000 is activated, a program dependent on the hardware of the computer 1000, and the like.

The HDD 1400 is a computer-readable recording medium that non-transiently records a program to be executed by the CPU 1100, data used by such a program, and the like. Specifically, the HDD 1400 is a recording medium that records the information processing program 61 (FIG. 1) which is an example of the program data 1450.

The communication interface 1500 is an interface for the computer 1000 to be connected with an external network 1550 (for example, the Internet). For example, the CPU 1100 receives data from another device or transmits data generated by the CPU 1100 to another device via the communication interface 1500.

The input and output interface 1600 is an interface for connecting an input and output device 1650 and the computer 1000. For example, the CPU 1100 receives data from an input device such as a keyboard or a mouse via the input and output interface 1600. The CPU 1100 also transmits data to an output device such as a display, a speaker, or a printer via the input and output interface 1600. Furthermore, the input and output interface 1600 may function as a media interface that reads a program or the like recorded in a predetermined recording medium. A medium refers to, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, in a case where the computer 1000 functions as the information processing device 100 described above, the CPU 1100 of the computer 1000 implements the functions of the exoskeleton robot 1, the controller 4, the terminal device 5, or others by executing the information processing program 61 loaded on the RAM 1200. In addition, the HDD1400 stores information of the storage unit 6 such as the information processing program 61. Note that although the CPU 1100 reads the program data 1450 from the HDD 1400 and executes the program, as another example, these programs may be acquired from another device via the external network 1550.

2. Modifications

The technology disclosed is not limited to the above embodiments. For example, in the above embodiment, the case where the information processing device 100 is used for piano performance training has been described as an example. However, without being limited to piano performance, the information processing device 100 may be used also for various applications including moving fingers.

3. Conclusion

The technology described above is specified as follows, for example. One piece of the disclosed technology is the information processing device 100. As described with reference to FIGS. 1 to 6 and others, the information processing device 100 includes the exoskeleton robot 1 worn on the hand of the user and the controller 4 that controls the exoskeleton robot 1. The exoskeleton robot 1 includes the palm module 10 fixed to the hand of the user U, the finger joint module 20 detachably attached to the palm module 10, and the fingertip module 30 detachably attached to the finger joint module 20 and fixed to a finger of the user U. The finger joint module 20 is configured to have at least one of the function of driving the fingertip module 30 or the function of sensing the fingertip module 30.

According to the information processing device 100 described above, the exoskeleton robot 1 worn on the hand of the user U can be configured by combining any of the palm module 10, the finger joint modules 20, and the fingertip modules 30. As a result, training by the exoskeleton robot 1 having an appropriate configuration corresponding to the application can be provided.

As described with reference to FIGS. 7 to 9 and others, the palm module 10 may include the first fixing unit 11 to which the finger joint module 20 is fixed and the second fixing unit 12 that extends along the back of the hand of the user U and fixes the palm module 10 to the hand of the user U. As a result, the palm module 10 can be fixed in such a manner as to fit the hand of the user U.

As described with reference to FIGS. 10 and 11 and others, the palm module 10 includes the band **13*b* extending from the second fixing unit 12 in such a manner as to cover a portion of the palm of the user U, and the part of the palm of the user U may not include the interdigital region or the thenar. This can prevent the band 13*b*** from hindering movement of the fingers.

As described with reference to FIG. 11 and the like, the width of the portion (first portion **13*b*1) of the band 13*b* passing between the interdigital region of the index finger and the thenar of the user U may be narrower than the width of other portions (for example, the second portion 13*b*2). As a result, the robustness of the band 13*b* can be enhanced and the safety and the like can be improved as compared with a case where the width of the entire band 13*b*** is narrowed.

As described with reference to FIGS. 13, 14, and others, the first fixing unit 11 and the second fixing unit 12 may be fixed in such a manner that the relative position thereof can be adjusted. As a result, the palm module 10 can be easily fitted to the shape of the hand of the user U. As a result, this increases the possibility of improving the wearability of the exoskeleton robot 1 or improving the operability when the exoskeleton robot 1 is worn.

As described with reference to FIGS. 15 and 16, the finger joint module 20 having the function of driving the fingertip module 30 may include a motor MT so as to have at least one degree of freedom. The finger joint module 20 may include an RCM mechanism (mechanism MV) having a center of rotation at a joint of the finger of the user U. Furthermore, a finger joint module 20 having the function of sensing a fingertip module 30 may include an angle sensor for detecting the angle of the fingertip module 30. The finger joint module 20-1, to which the fingertip module 30-1 fixed to the thumb among the fingers of the user U is attached, may include a motor MT so as to have at least one degree of freedom (which may be two or more degrees of freedom). The finger joint module 20-1 may include two RCM mechanisms (the mechanism MVa and the mechanism MVb) each having a center of rotation at a joint of the thumb of the user U. The exoskeleton robot 1 can be configured to include various finger joint modules 20 in this manner, for example.

As described with reference to FIGS. 19 to 22 and others, the fingertip module 30 may include the body 31 extending along the finger of the user U and the band 33 extending from the body 31 in such a manner as to cover a portion of the finger of the user U. In this case, the fingertip module 30 may include the holder 34 that holds the band 33 and the adjustment screw 35 that adjusts the distance between the holder 34 and the body 31, the holder 34 and the body 31 arranged on the side opposite to the finger of the user U with the body 31 interposed therebetween. The fingertip module 30 can be appropriately fixed to the finger of the user U in this manner, for example.

As described with reference to FIGS. 23 to 30 and others, the fingertip module 30 may include the release mechanism 36 that moves the adjustment screw 35 such that the distance between the holder 34 and the body 31 decreases, and the release mechanism 36 may include: the abutment unit 363 that is movable in the direction (for example, the front-rear direction) intersecting the traveling direction of the adjustment screw 35 in such a manner as to abut on the tip of the adjustment screw 35 when located ahead of (for example, below) the adjustment screw 35 in the traveling direction;

and the gap 364 that is movable in the direction intersecting the traveling direction of the adjustment screw 35 such that the adjustment screw 35 passes therethrough when located ahead of the adjustment screw 35 in the traveling direction. The release mechanism 36 may include a spring 362 that expands and contracts in the traveling direction of the abutment unit 363 and the gap 364 as the abutment unit 363 and the gap 364 move. When the spring 362 is in an equilibrium state, the tip of the adjustment screw 35 may abut on the abutment unit 363, and when the spring is in a compressed state, the adjustment screw 35 may pass through the gap 364. The release mechanism 36 may include the cone 361 that is fixed to the side surface of the tip of the adjustment screw 35 and has a tapered shape whose diameter increases as it extends in the traveling direction of the adjustment screw 35. For example, by including such a release mechanism 36, the band 33 can be instantaneously loosened, and the operation of fixing or removing the palm module 10 to or from the finger of the user U can be smoothly performed.

As described with reference to FIG. 1 and others, the information processing device 100 may include the plurality of exoskeleton robots 1 (for example, the exoskeleton robot 1-L and the exoskeleton robot 1-R) and one controller 4 that controls the plurality of exoskeleton robots 1. This facilitates synchronous operation of the plurality of exoskeleton robots 1.

As described with reference to FIGS. 1, 34, and and others, the information processing device 100 includes the terminal device 5 that generates control commands for controlling the exoskeleton robot 1, and the controller 4 may transmit the control commands generated by the terminal device 5 to the exoskeleton robot 1. In this case, the finger joint module 20 may include a plurality of finger joint modules 20 (for example, the finger joint module 20-1 to the finger joint module 20-5) corresponding to different fingers, the terminal device 5 may collectively generate control commands for the respective finger joint modules 20, and the controller 4 may separate the control commands collectively generated by the terminal device 5 into control commands for the respective finger joint modules 20 and transmit the control commands to corresponding finger joint modules 20. The exoskeleton robot 1 can be controlled in this manner, for example.

The information processing method described with reference to FIGS. 1 to 6, 33, and others is also one piece of the disclosed technique. The information processing method includes controlling the exoskeleton robot 1 worn on the hand of the user U (for example, Steps S1 to S5). The exoskeleton robot 1 is as described above. Also by such an information processing method, as described above, it is possible to provide training by the exoskeleton robot 1 having an appropriate configuration corresponding to the application.

The information processing program 61 described with reference to FIGS. 1 to 6 and 33 to 36, and others is also one piece of the disclosed technology. The information processing program 61 causes the computer 1000 to execute the processing (for example, Steps S1 to S5) of controlling the exoskeleton robot 1 worn on the hand of the user U. The exoskeleton robot 1 is as described above. Such an information processing program 61 can also provide training by the exoskeleton robot 1 having an appropriate configuration corresponding to the application as described above. Note that a computer-readable recording medium on which the information processing program 61 is recorded is also one piece of the disclosed technology.

Note that the effects described herein are merely examples, and it is not limited to the disclosed content. There may be other effects.

4. Further Embodiments

Further embodiments will be described with reference to FIGS. 37 to 53.

4.1. Finger Joint Module

FIGS. 37 to 41 are diagrams illustrating an example of a schematic configuration of a finger joint module. A finger joint module 20 that is illustrated has an RCM link mechanism as a basic structure as described above. This link mechanism is referred to as a link mechanism 8 in the drawing. The link mechanism 8 includes a plurality of links L (nodes) and joints J (shafts) that connect (couple) the links L. A joint J may be a shaft, a pin, or the like.

Examples of the material of the links L include resin and metal. Examples of the resin include polyacetal. Examples of the metal include aluminum. A link L made of resin is referred to as a resin link $L_R$. A link L made of metal is referred to as a metal link $L_M$. The plurality of links L may include a resin link $L_R$ and a metal link $L_M$.

Figure 37:
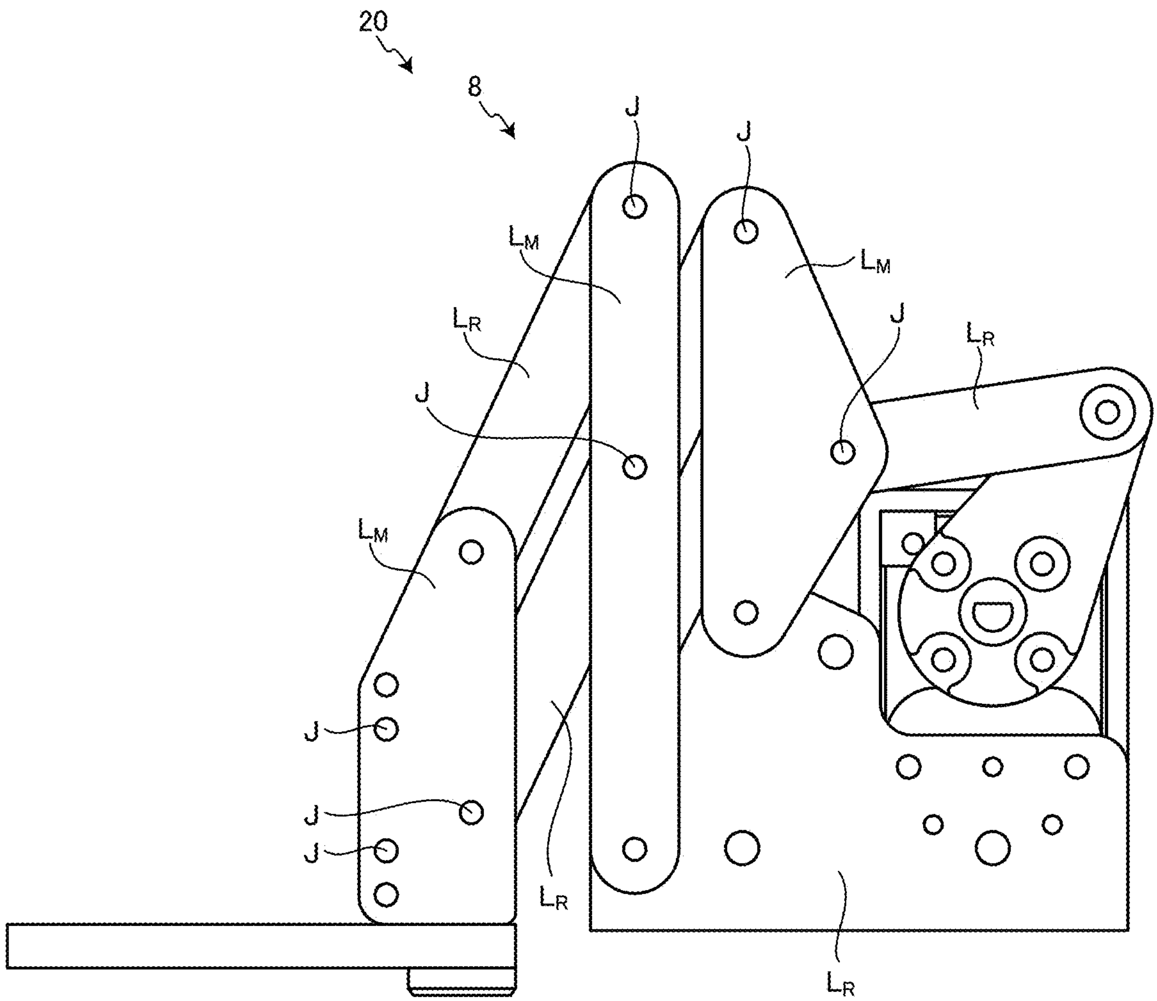
FIG. 37 is a diagram illustrating an example of a schematic configuration of a finger joint module.
Figure 38:
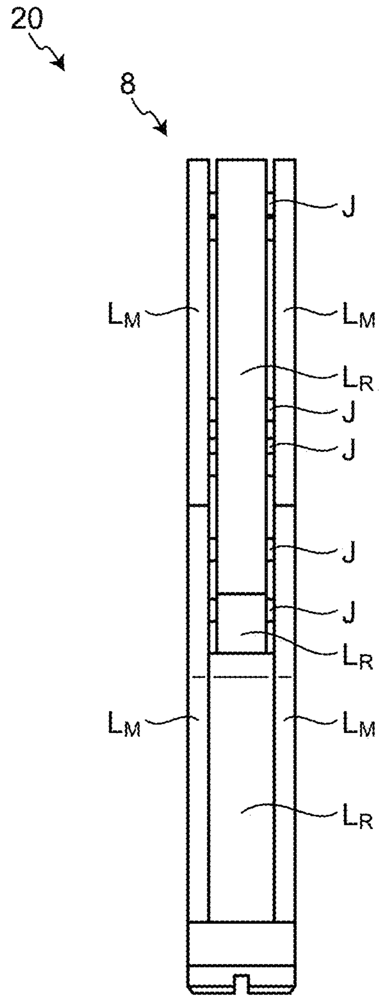
FIG. 38 is a diagram illustrating an example of a schematic configuration of the finger joint module.
Figure 39:
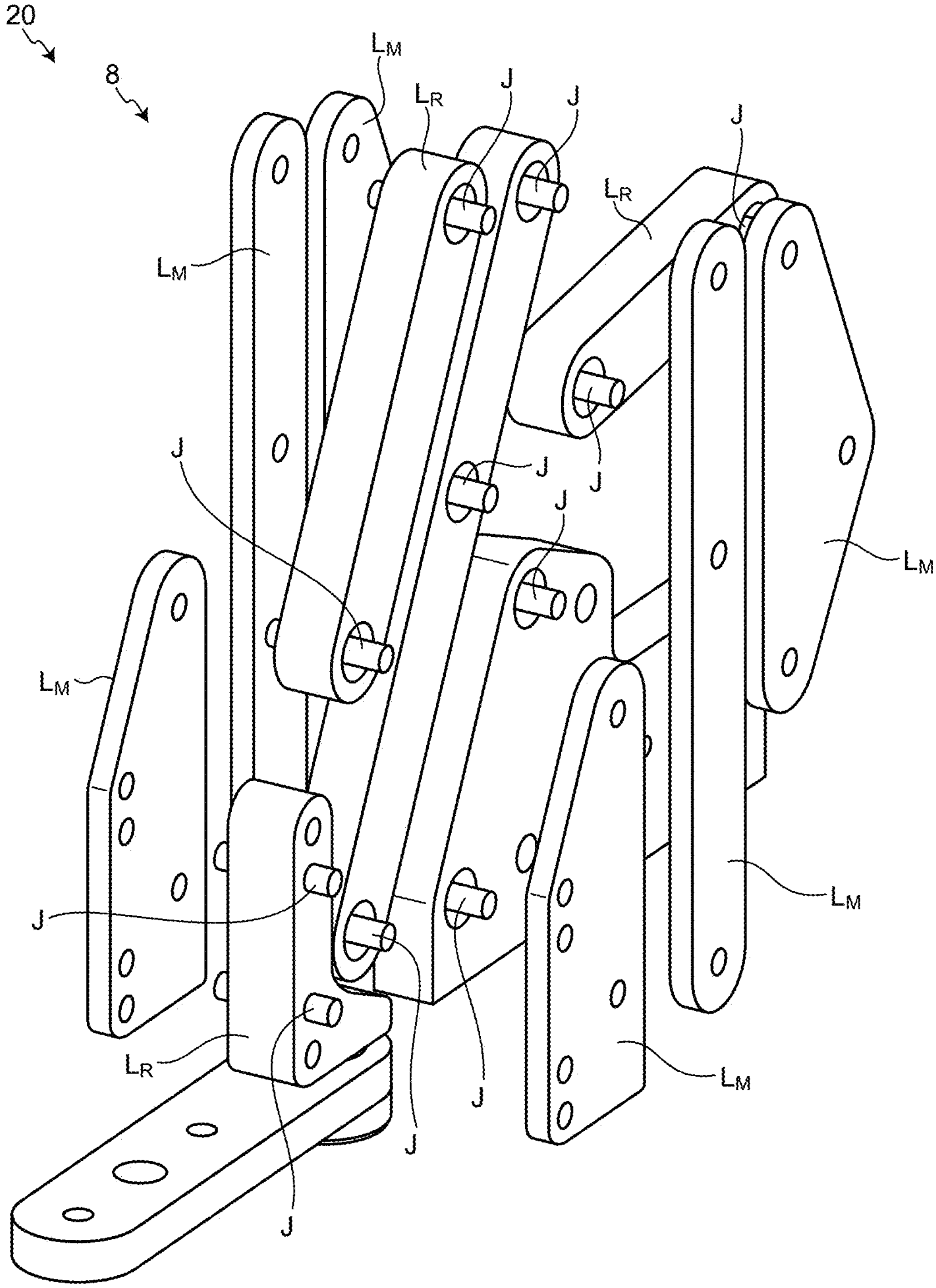
FIG. 39 is a diagram illustrating an example of a schematic configuration of the finger joint module.

In FIGS. 37 to 39, some resin links $L_R$ and metal links $L_M$ are illustrated together with their reference numerals. A pair of metal links $L_M$ is arranged in such a manner as to sandwich a resin link $L_R$. These metal links $L_M$ and the resin link $L_R$ are connected by joints J. The metal links $L_M$ on the outer side and the joints J are press-fitted and fixed such that the joints J do not come off. In addition, in order to smooth the rotational motion of the finger joint module 20, a bearing is inserted between a joint J and a link L.

Note that the plurality of links L may include only the resin links $L_R$ or only the metal links $L_M$. Moreover, the joints J and the links L may not be press-fitted and fixed, and in that case, for example, a hinge pin with a stopper or a combination of a collar and a screw may be used. Furthermore, there is no need to insert a bearing between a joint J and a link L.

Figure 40:
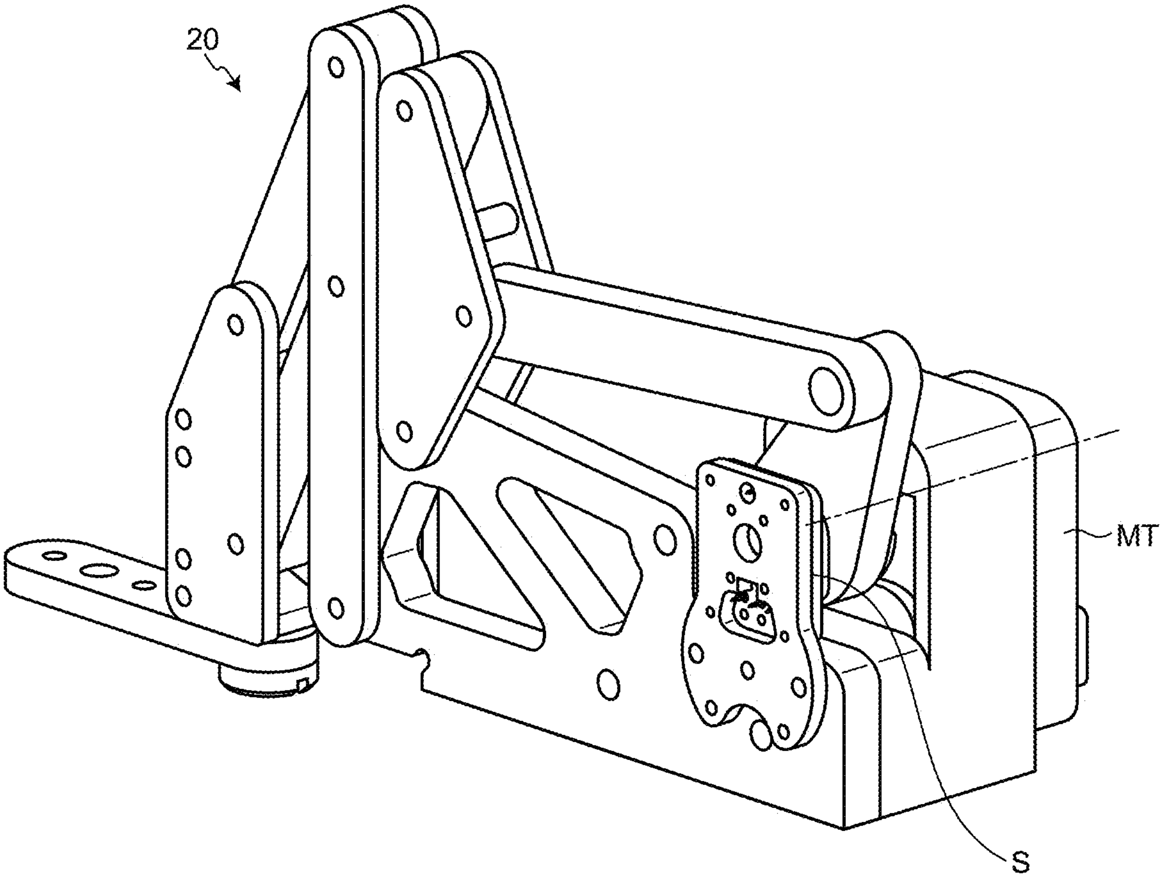
FIG. 40 is a diagram illustrating an example of a schematic configuration of the finger joint module.
Figure 41:
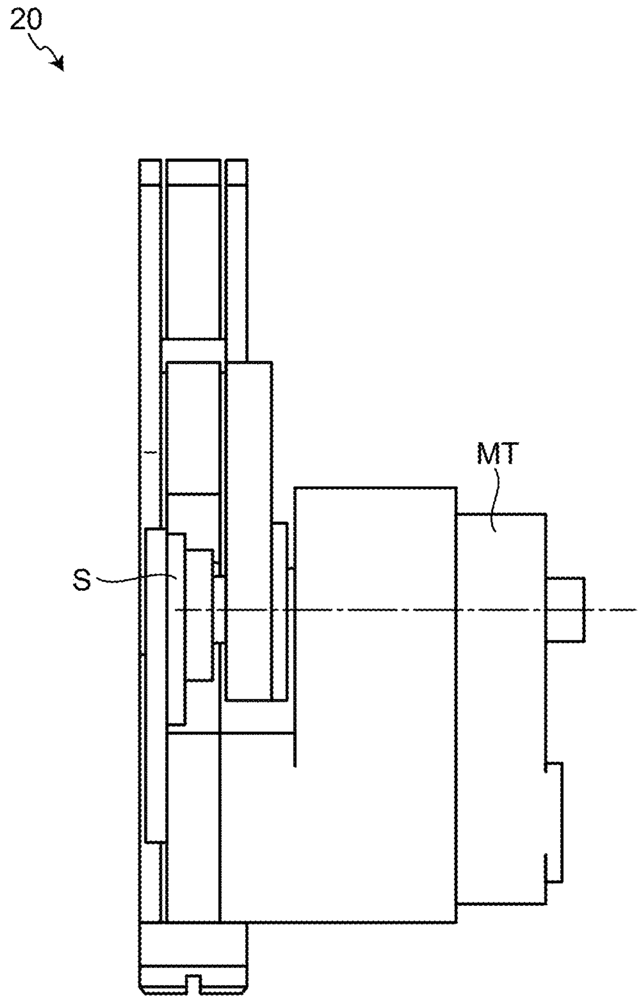
FIG. 41 is a diagram illustrating an example of a schematic configuration of the finger joint module.

In the example illustrated in FIGS. 40 and 41, a finger joint module 20 includes a sensor S so as to have a sensing function. In this example, it is based on the premise that the sensor S is an angle sensor.

The rotation axis of the motor MT (an example of an actuator) described above and an extension line thereof are schematically illustrated by an alternate long and short dash line. In this example, the sensor S is fixed on the rotation axis of the motor MT. For example, the sensor S is disposed and fixed such that the extension line of the rotation axis passes through the central part of the sensor S. This makes it possible to stably and accurately detect (measure) angle information.

Note that the sensor S may be arranged at various positions without being limited to the above position so as to be able to detect the angle of any joint J.

4.2. Finger Joint Module Corresponding to Thumb

The finger joint module 20-1 corresponding to the thumb will be further described. The motion of the thumb includes two types of motions: abduction motion and adduction motion (abduction and adduction motions) starting from the CM joint; and bending motion and extending motion (bending and extending motions) of each of the CM joint and the MP joint. This will be described with reference to FIGS. 42 and 43.

Figure 42:
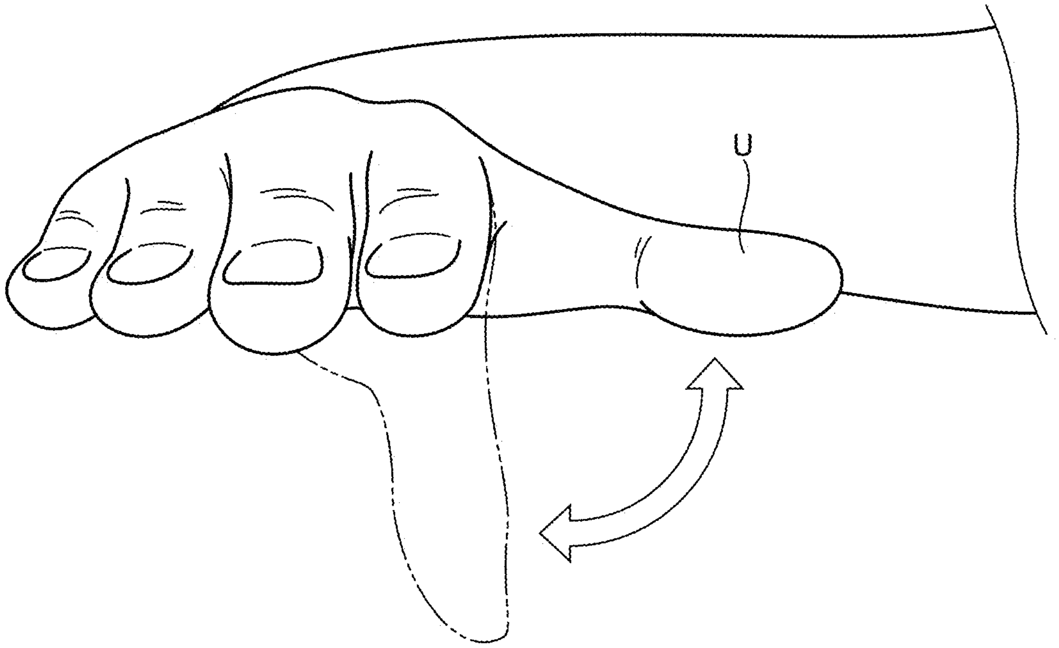
FIG. 42 is a diagram illustrating an example of abduction and adduction motions of the thumb.

FIG. 42 is a diagram illustrating an example of abduction and adduction motions of the thumb. The thumb of the user U rotates (abduction) in such a manner as to be separated from the palm or rotates (adduction) in such a manner as to approach the palm with the CM joint as a starting point. In FIG. 42, the thumb after abduction is drawn by a solid line, and the thumb after adduction is drawn by an alternate long and short dash line.

Figure 43:
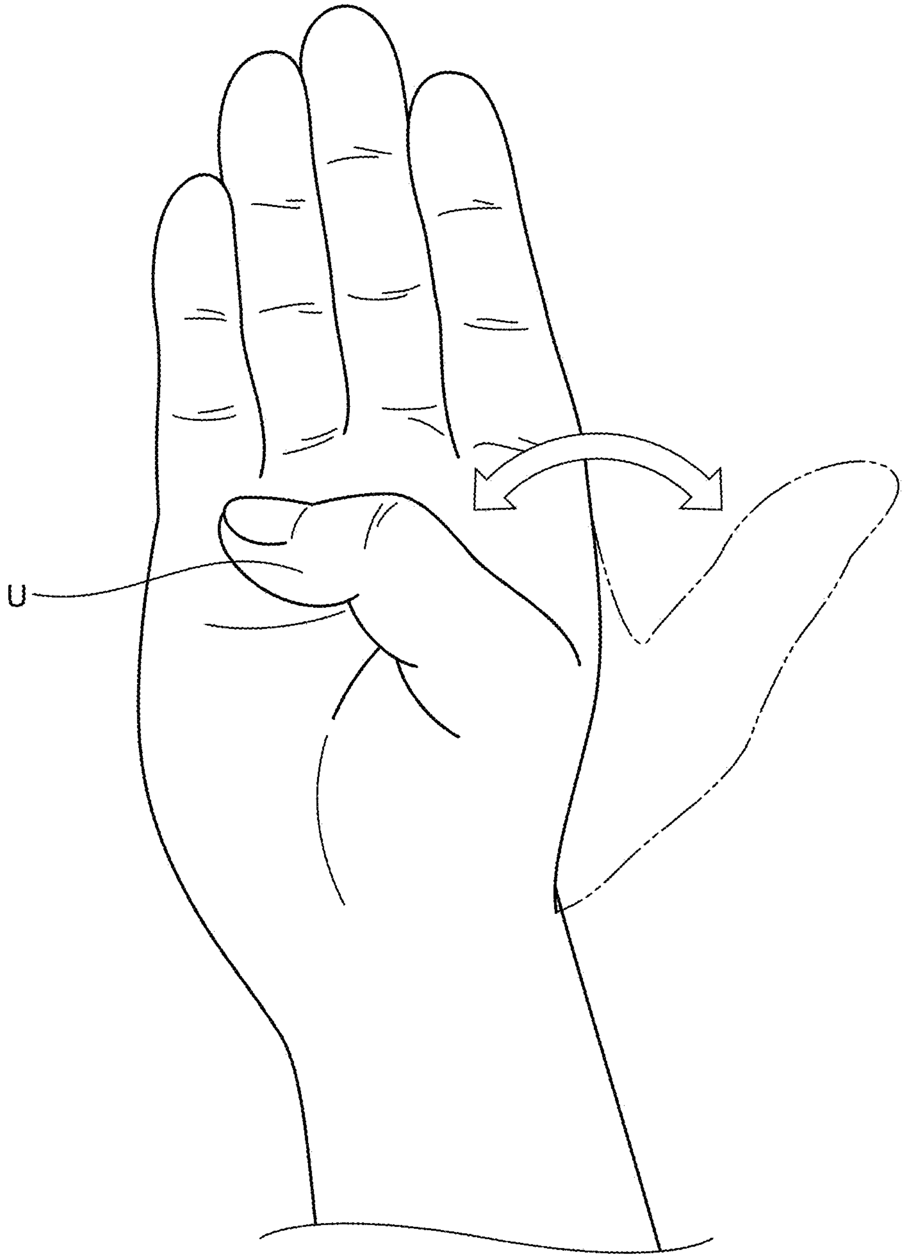
FIG. 43 is a diagram illustrating an example of bending and extending motions of the thumb.

FIG. 43 is a diagram illustrating an example of bending and extending motions of the thumb. In the thumb of the user U, the joints (the CM joint, the MP joint, and the IP joint) bend in such a manner as to approach the palm or extend in such a manner as to be separated from the palm. In FIG. 43, the thumb in which the joints are bent is drawn by a solid line, and the thumb in which the joints are extended is drawn by an alternate long and short dash line.

Figure 44:
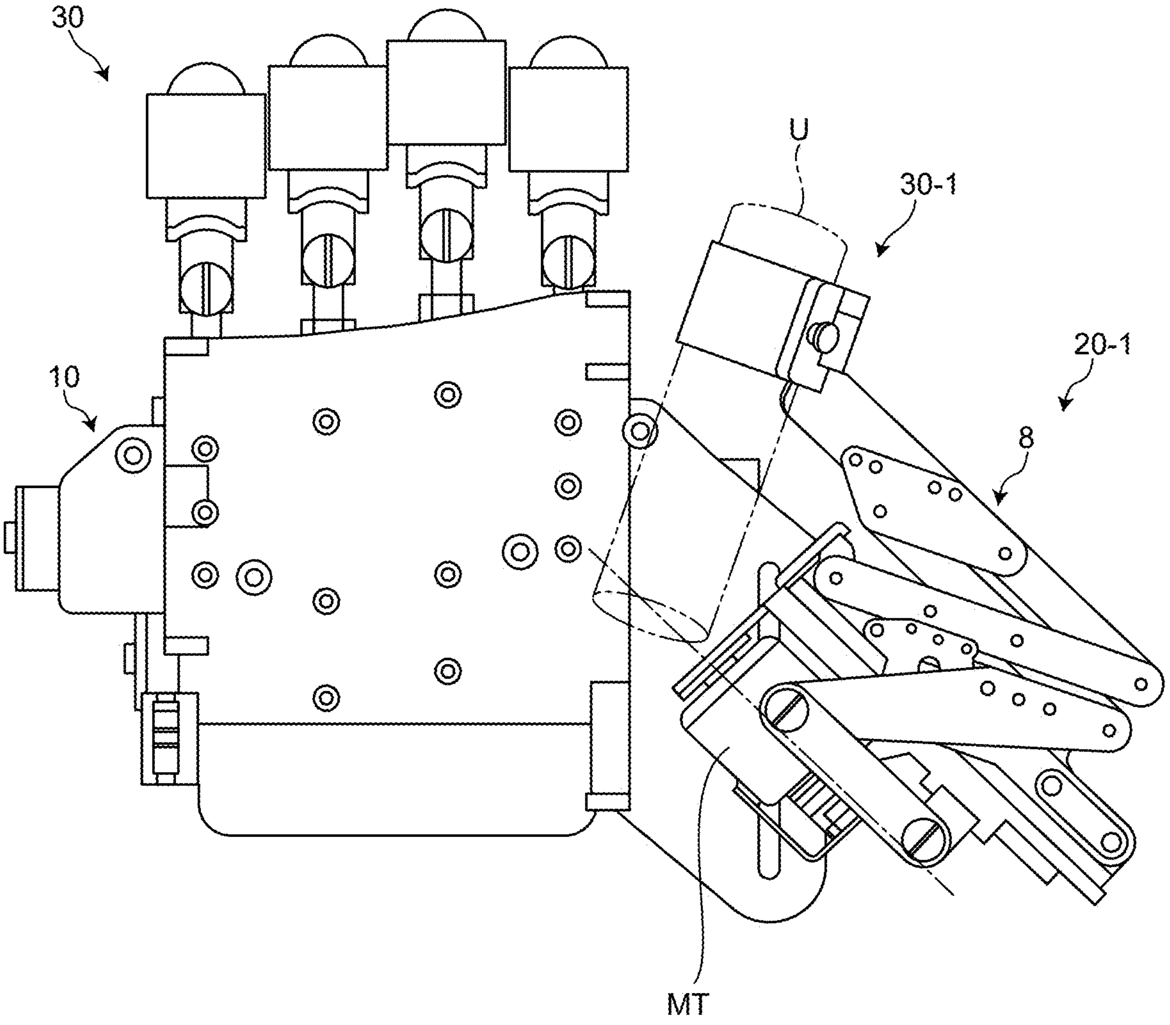
FIG. 44 is a diagram illustrating an example of a schematic configuration of a finger joint module corresponding to a thumb.

FIG. 44 is a diagram illustrating an example of a schematic configuration of the finger joint module corresponding to the thumb. Although details will be described later, the finger joint module 20-1 corresponding to the thumb includes the motor MT and the link mechanism 8 operated by the motor MT so as to have at least three degrees of freedom. The three degrees of freedom give abduction and adduction motions starting from the CM joint of the thumb, bending and extending motions of the MP joint of the thumb, and bending and extending motions of the CM joint of the thumb.

The abduction and adduction motions are given by disposing the motor MT such that the CM joint of the thumb of the user U is located on the extension line (alternate long and short dash line) of the rotation axis of the motor MT (the extension line passes through the CM joint). The thumb is abducted or adducted depending on the rotation of the motor MT.

The bending and extending motions are performed across the CM, MP, and IP joints and at all those joints. Providing a motor MT to each corresponding joint makes the configuration complicated and leads to an increase in the size, the weight, the cost, and others. Therefore, the link mechanism 8 of the finger joint module 20-1 has a structure in which the bending and extending motions of the CM joint and the MP joint are simultaneously cooperatively driven by one motor MT. First, an overview will be described with reference to FIGS. 45 and 46.

Figure 45:
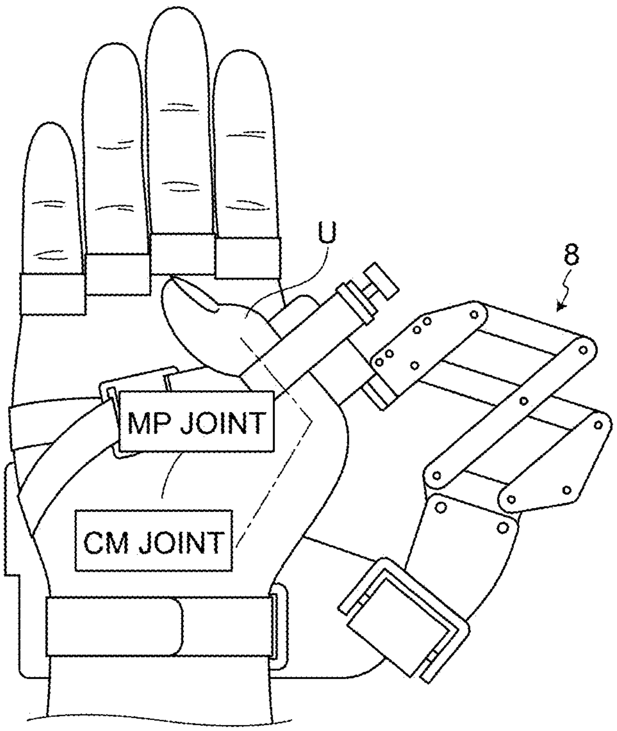
FIG. 45 is a diagram illustrating an example of bending and extending motions by a link mechanism.
Figure 46:
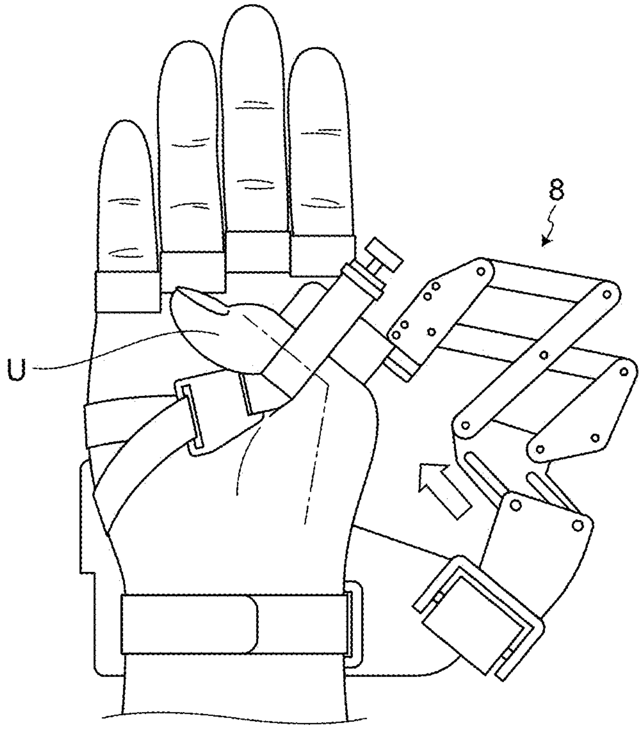
FIG. 46 is a diagram illustrating an example of bending and extending motions by the link mechanism.

FIGS. 45 and 46 are diagrams illustrating an example of the bending and extending motions by the link mechanism. As illustrated in FIG. 45, the link mechanism 8 has a center of rotation at the MP joint of the thumb of the user U. This gives bending and extending motions of the MP joint of the thumb. In addition, the bending and extending motions of the CM joint is regarded as a linear motion. In order to give this motion, the entire link mechanism 8 moves linearly. In the example illustrated in FIG. 46, the link mechanism 8 slides and linearly moves as indicated by a hollow arrow. In this manner, bending and extending motions of both the CM and MP joints are given. This will be further described with reference to FIGS. 47 to 50.

Figure 47:
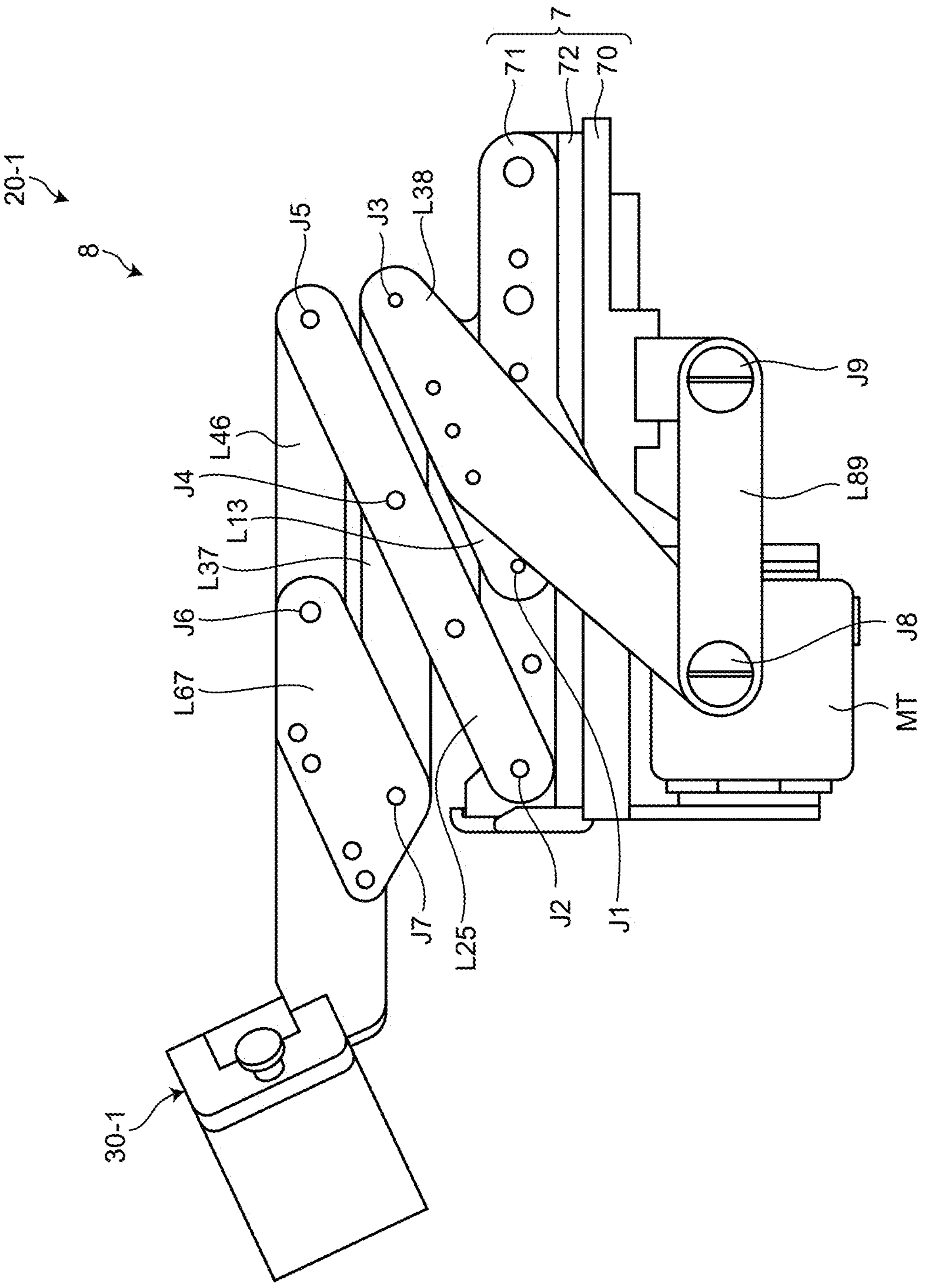
FIG. 47 is a diagram illustrating an example of a schematic configuration of the finger joint module corresponding to the thumb.
Figure 48:
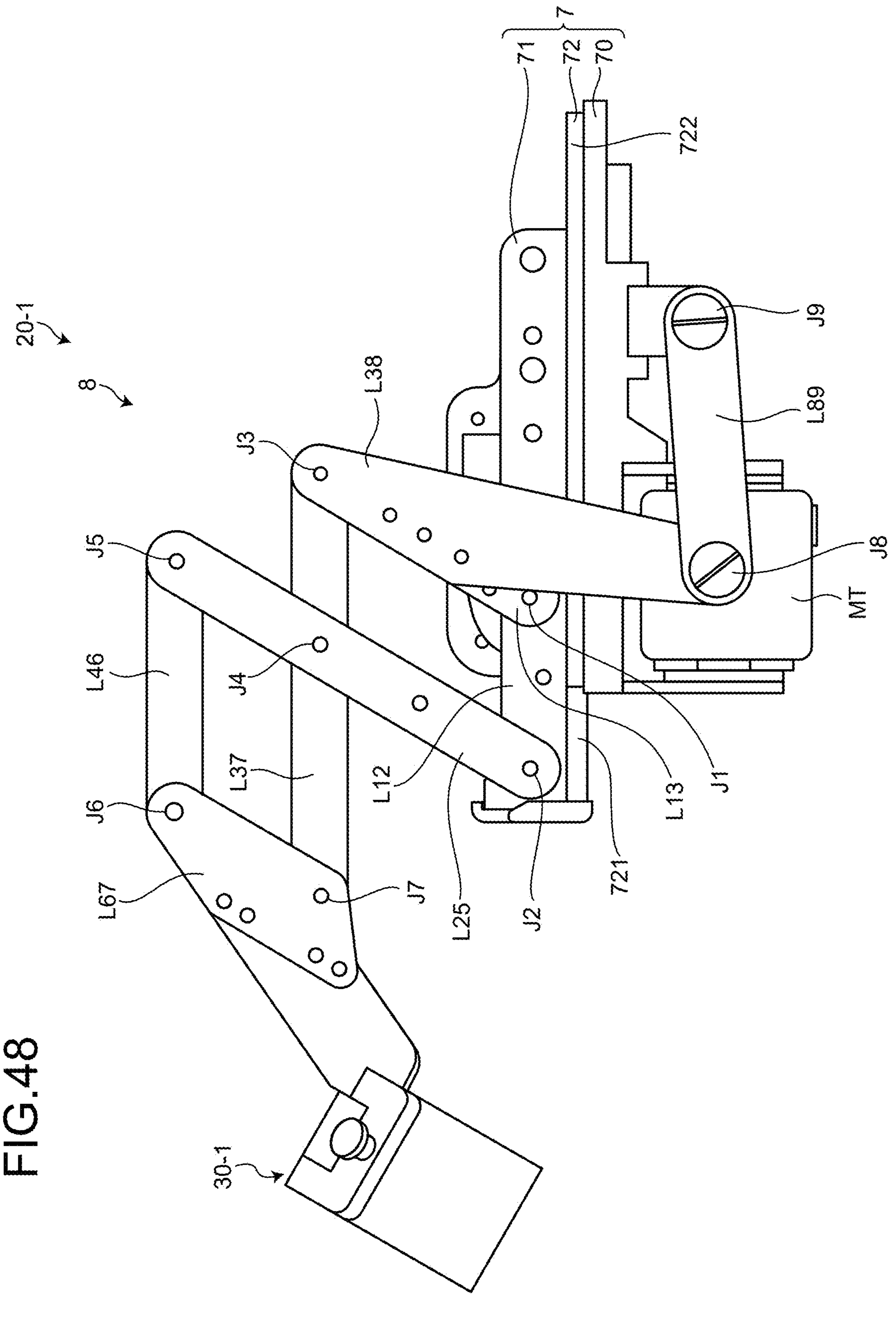
FIG. 48 is a diagram illustrating an example of a schematic configuration of the finger joint module corresponding to the thumb.

FIGS. 47 and 48 are diagrams illustrating an example of the schematic configuration of the finger joint module corresponding to the thumb. The finger joint module 20-1 corresponding to the thumb includes the linear movement mechanism 7, the motor MT, and the link mechanism 8.

The linear movement mechanism 7 supports the link mechanism 8 and linearly moves the link mechanism 8. Specifically, the linear movement mechanism 7 includes a base unit 70, a support unit 71, and a movement unit 72.

The movement unit 72 and the support unit 71 are included in this order on one side of the base unit 70. The motor MT is included (fixed) on the other side of the base unit 70.

The support unit 71 supports the link mechanism 8. A base portion of the link mechanism 8 (portions of a joint J1 and a joint J2 to be described later) is fixed to the support unit 71.

The movement unit 72 moves the support unit 71, more specifically, moves the support unit 71 relatively to the base unit 73. The movement of the support unit 71 corresponds to the linear movement of the link mechanism 8 described above. In this example, the movement unit 72 moves the support unit 71 by sliding the support unit 71.

Specifically, as illustrated in FIG. 48, the movement unit 72 includes a first portion 721 and a second portion 722. The support unit 71 is fixed to the first portion 721. The second portion 722 is fixed to the base unit 73. The first portion 721 is slidable with respect to the second portion 722. Various known slide mechanisms may be used.

With the first portion 721 sliding with respect to the second portion 722, the link mechanism 8 fixed to the support unit 71 moves linearly together with the support unit 71 fixed to the first portion 721.

The link mechanism 8 is included between the linear movement mechanism 7 and the fingertip module 30-1. The proximal end portion of the link mechanism 8 is fixed to the support unit 71 of the linear movement mechanism 7. The fingertip module 30-1 is attached to the distal end of the link mechanism 8.

The link mechanism 8 operates to give bending and extending motions of the MP joint of the thumb of the user U as the motor MT rotates. In addition, the link mechanism 8 operates to give the bending and extending motions of the CM joint of the thumb of the user U as the support unit 71 linearly moves by the movement unit 72 of the linear movement mechanism 7. More specifically, the link mechanism 8 is configured such that the movement unit 72 of the linear movement mechanism 7 linearly moves the support unit 71 as the motor MT rotates. As a result, the bending and extending motions of both the MP joint and the CM joint of the thumb of the user U can be simultaneously given.

Specifically, the link mechanism 8 includes a plurality of joints J and a plurality of links L. As the plurality of joints J, joints J1 to J9 are illustrated as an example with reference signs. Describing some characteristic joints J, the joint J1 and the joint J2 are a first joint and a second joint, respectively, included in the support unit 71 of the linear movement mechanism 7 and rotated by the motor MT. The joint J3 is a third joint to which a second end of a link L13 described later is connected. The joint J8 and the joint J9 are additional joints provided between the joint J3 and the linear movement mechanism 7, and the joint J9 is fixed to the base unit 70 of the linear movement mechanism 7.

As the plurality of links L, a link L13, a link L25, a link L37, a link L46, a link L67, a link L38, and a link L89 are illustrated as an example with reference numerals. The link L13 is a first link having a first end connected to the joint J1, and more specifically, is connected between the joint J1 and the joint J3. The link L25 is a second link having a first end connected to the joint J2, and more specifically, is connected between the joint J2 and the joint J5, and is also connected to the joint J4 at a position therebetween (position in the middle). The link L37 is connected between the joint J3 and the joint J7 and is also connected to the joint J4 at a position therebetween (position in the middle). The link L46 is connected between the joint J5 and the joint J6. The link L67 is connected between the joint J6 and the joint J7. Moreover, the fingertip module 30-1 is connected to the link L67. The link L38 and the link L89 are additional links connected between the joint J3 and the joint J9 (namely, the linear movement mechanism 7). The link L38 out of the two is connected between the joint J3 and the joint J8. The link L89 is connected between the joint J8 and the joint J9.

A person skilled in the art can understand the basic operation of the link mechanism 8, having the above configuration, from the structure thereof. Describing a characteristic point, the link mechanism 8 includes additional links connected between the joint J3 and the base unit 70 of the linear movement mechanism 7. More specifically, the link mechanism 8 includes the link L38 and the link L89. Furthermore, the link mechanism 8 includes the joint J8 that connects the link L38 and the link L89 and the joint J9 that connects the link L89 to the base unit 70 of the linear movement mechanism 7. With such a configuration, the operation of the link mechanism 8 is also transmitted to the linear movement mechanism 7, and they operate in synchronization. That is, the two types of motions of the abduction and adduction motions and the bending and extending motions described above can be synchronized. Two types of motions are given (two degrees of freedom of motion are implemented) only by one motor MT, and these motions can be controlled.

For example, in FIG. 47, it is based on the premise that each link L of the link mechanism 8 and the entire link mechanism 8 are at the initial position. When the motor MT rotates, the joint J1 and the joint J2 are rotationally driven, and each link L of the link mechanism 8 moves as illustrated in FIG. 48. Together with this, the movement unit 72 of the linear movement mechanism 7 slides, and the entire link mechanism 8 moves linearly.

Figure 49:
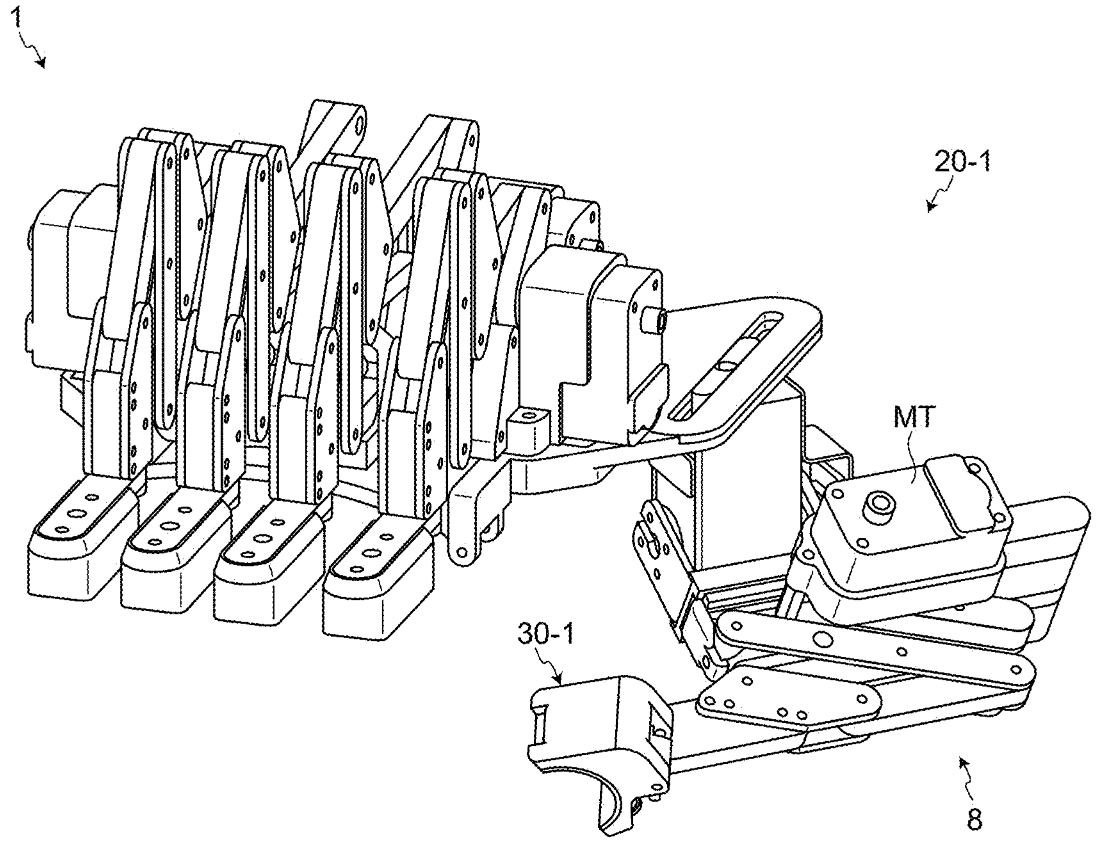
FIG. 49 is a diagram illustrating an example of the operation of the link mechanism.
Figure 50:
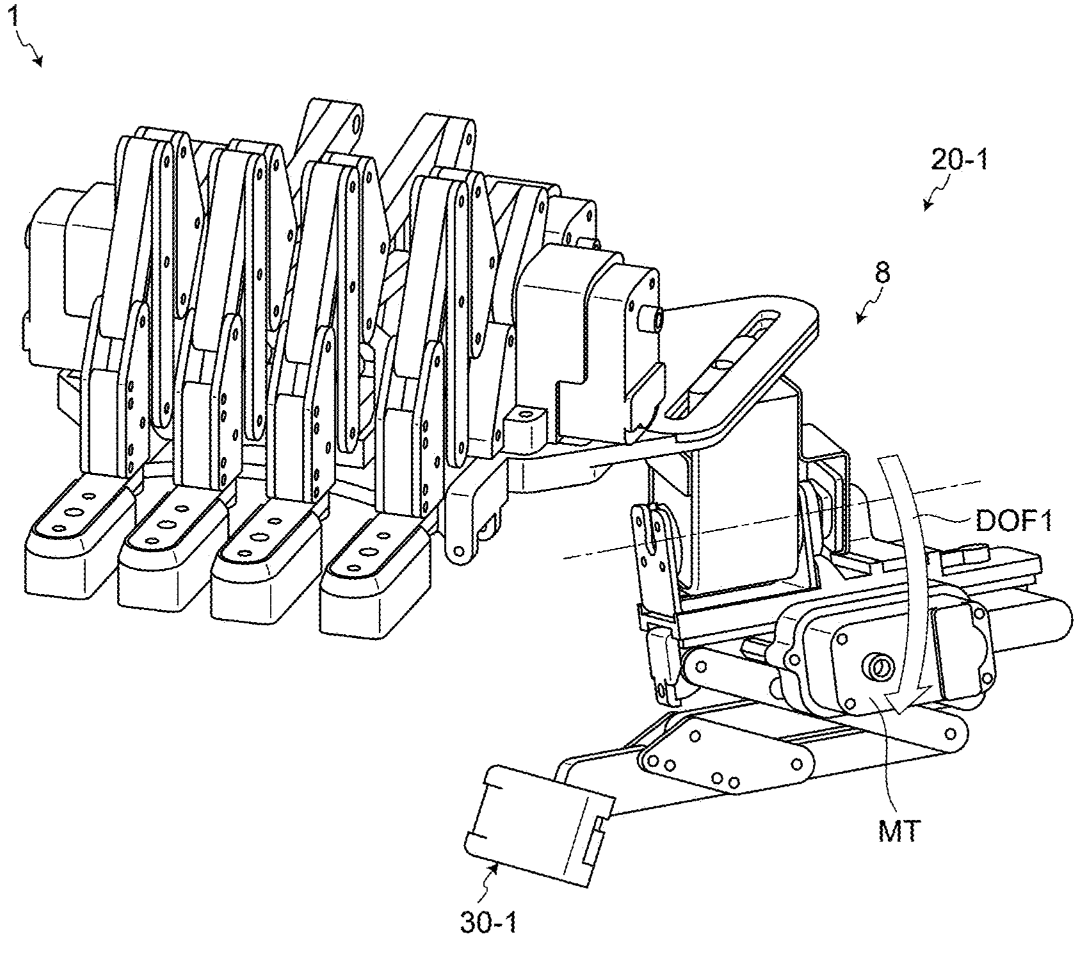
FIG. 50 is a diagram illustrating an example of the operation of the link mechanism.
Figure 51:
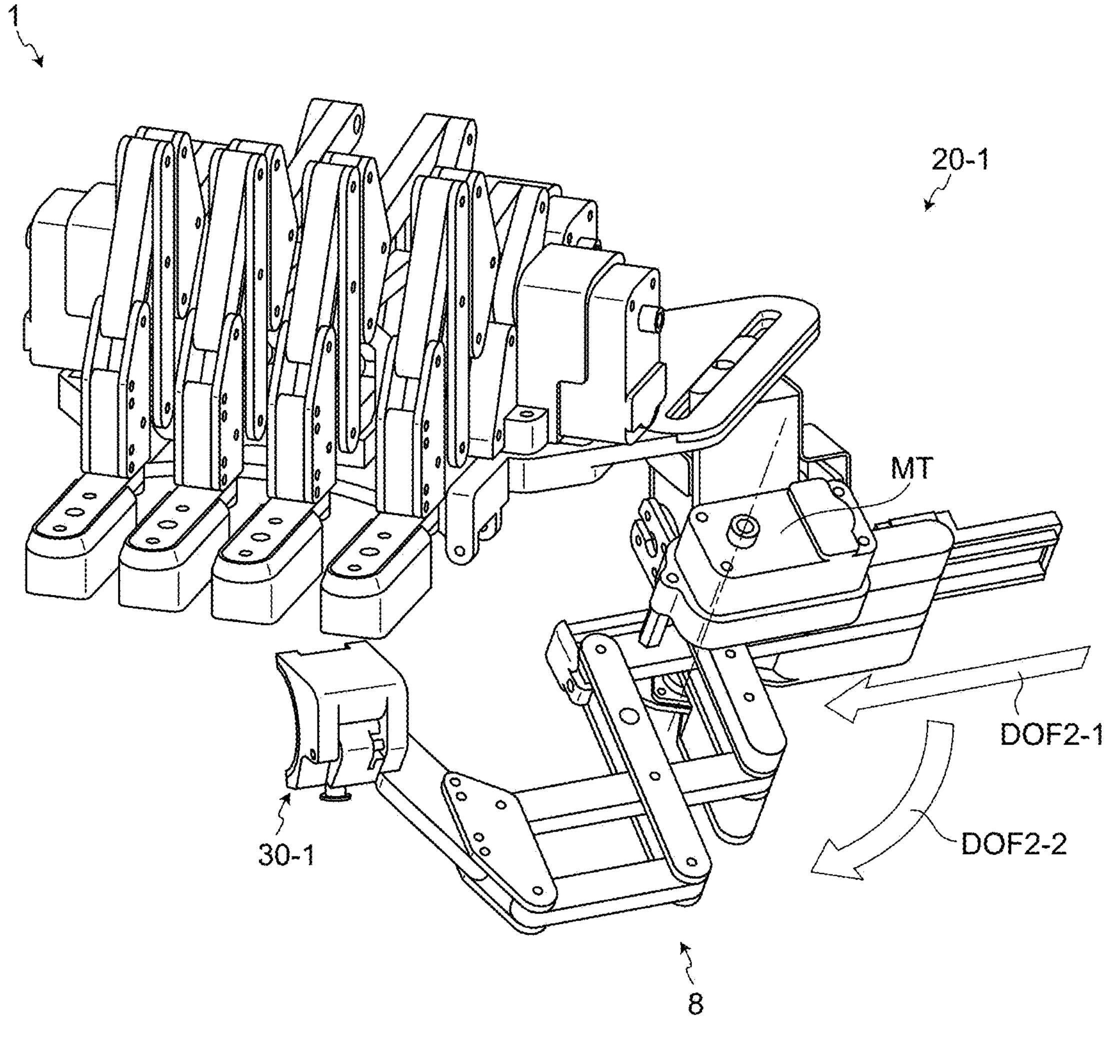
FIG. 51 is a diagram illustrating an example of the operation of the link mechanism.

FIGS. 49 to 51 are diagrams illustrating an example of the operation of the link mechanism. FIG. 49 illustrates the link mechanism 8 at the initial position.

FIGS. 50 and 51 schematically illustrate the three degrees of freedom described above. In FIG. 50, the degree of freedom that gives the abduction and adduction motions of the CM joint is indicated by a hollow arrow as a degree of freedom DOF1. The rotational motion axis is schematically indicated by an alternate long and short dash line. In FIG. 51, the degree of freedom that gives the bending and extending motions of the CM joint is indicated by a hollow arrow as a degree of freedom DOF2-1. Furthermore, the degree of freedom that gives the bending and extending motions of the MP joint is indicated by a hollow arrow as a degree of freedom DOF2-2. With these three degrees of freedom, the finger joint module 20-1 can control the motion of the thumb of the user U over a wide range.

Note that, in the above example, the case where the bending and extending motions of both the MP joint and the CM joint are controlled by one motor MT has been described as an example. However, one motor MT may be assigned to each joint. The degrees of freedom of the MP joint and the CM joint can be obtained independently. For the linear motion, a commercially available linear actuator may be used, or rotational motion of a rotary actuator may be converted into linear motion by a rack and a pinion, a belt, or the like.

4.3. Fingertip Module Corresponding to Thumb

Figure 52:
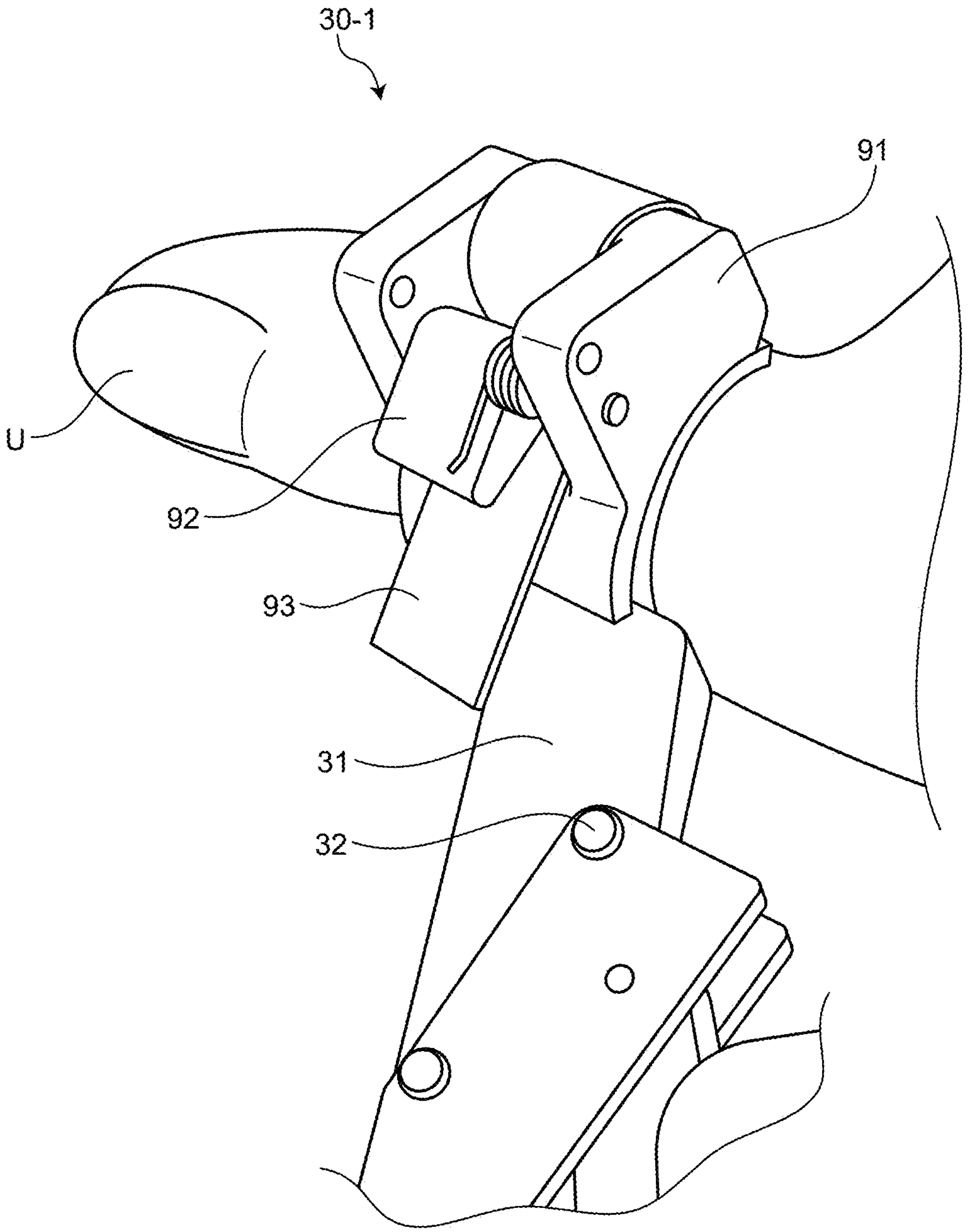
FIG. 52 is a diagram illustrating an example of a schematic configuration of a fingertip module corresponding to a thumb.
Figure 53:
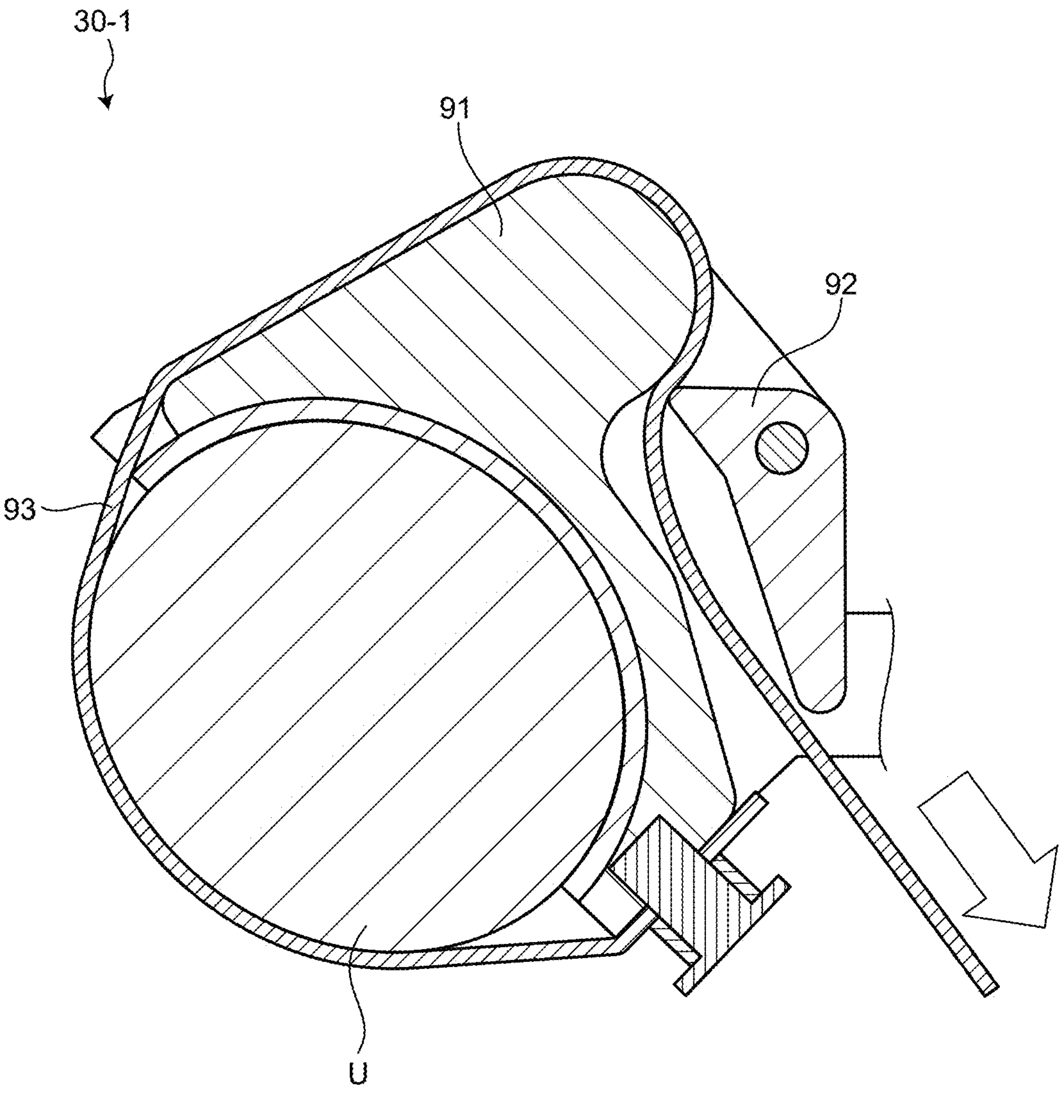
FIG. 53 is a diagram illustrating an example of a schematic configuration of the fingertip module corresponding to the thumb.

FIGS. 52 and 53 are diagrams illustrating an example of a schematic configuration of the fingertip module corresponding to the thumb. In this example, the fingertip module 30-1 includes a base 91, a lever 92, and a band 93 (also referred to as a belt) in addition to the body 31 and the attachment member 32 described above. The operation of fixing or removing the fingertip module 30 to or from the thumb of the user U is smoothly performed by the base 91, the lever 92, and the band 93. The basic principle is similar to that of a lashing belt used for fixing a cargo bed of a vehicle, camping, or others.

The base 91 abuts on a part of the thumb of the user U. In this example, the base 91 abuts on a part of the thumb in such a manner as to cover approximately half of the side surface of the thumb.

The lever 92 rotates in such a manner as to change the distance between the base 91 and the lever 92 on the opposite side of the thumb of the user U across the base 91. In this example, when the lever 92 rotates counterclockwise, the distance (interval) between the base 91 and the lever 92 increases. When the lever 92 rotates clockwise, the distance between the base 91 and the lever 92 decreases.

The band 93 is fixed to the base 91 at a base end portion thereof, extends (wraps around) from there in such a manner as to cover a part of the thumb of the user U and returns to the base 91, and passes between the base 91 and the lever 92. As indicated by a hollow arrow in FIG. 53, when the band 93 is pulled, the lever 92 rotates counterclockwise, and the distance between the base 91 and the lever 92 increases. The band 93 moves smoothly and fastens the thumb of the user U to fix it towards the base 91. When the band 93 moves in the opposite direction, the lever 92 rotates clockwise, thereby reducing the distance between the base 91 and the lever 92. The band 93 is fixed (locked) by pressure and does not move any further. The state in which the thumb of the user U is fixed to the base 91 is maintained.

For example, when the user U touches the lever 92 and rotates the lever 92 counterclockwise, the distance between the base 91 and the lever 92 increases, and the band 93 can move freely. Similarly to the band 33 (FIG. 23 and others) described above, the band 93 can be instantaneously loosened (released).

According to the fingertip module 30-1 having the above configuration, the thumb of the user U can be fixed only by pulling the band 93 and can be released only by turning the lever 92, and thus simple and quick attachment and detachment can be performed.

4.4. Conclusion

The technology described in the above further embodiments is specified as follows, for example. As described with reference to FIGS. 42 to 51 and others, the finger joint module 20-1 to which the fingertip module 30-1 fixed to the thumb, among the fingers of the user U, is attached has at least three degrees of freedom, and the three degrees of freedom may give the abduction motion and the adduction motion starting from the CM joint of the thumb, the bending motion and the extending motion of the MP joint of the thumb, and the bending motion and the extending motion of the CM joint of the thumb. As a result, the motion of the thumb of the user U can be controlled over a wide range.

As described with reference to FIGS. 47 to 51 and others, the finger joint module 20-1 includes the motor MT and the link mechanism 8 operated by the rotation of the motor MT so as to have three degrees of freedom, the motor MT is disposed such that the CM joint of the thumb is located on the extension line of the rotation axis in order to give the abduction motion and the adduction motion starting from the CM joint of the thumb, the link mechanism 8 has the center of rotation at the MP joint of the thumb in order to give the bending motion and the extending motion of the MP joint of the thumb, and the link mechanism 8 may entirely move linearly in order to give the bending motion and the extending motion of the CM joint of the thumb. The three degrees of freedom can be obtained in this manner, for example.

As described with reference to FIGS. 47 to 51 and others, the finger joint module 20-1 may include the linear movement mechanism 7, the linear movement mechanism 7 may include the base unit 70 including the motor MT, the support unit 71 that supports the link mechanism 8, and the movement unit 72 that linearly moves the support unit 71 relatively to the base unit 70, the link mechanism 8 may operate to give the bending motion and the extending motion of the MP joint of the thumb as the motor MT rotates, and the link mechanism 8 may linearly move to give the bending motion and the extending motion of the CM joint of the thumb as the support unit 81 linearly moves by the movement unit 72. As a result, two types of motions can be given by only one motor MT, and these motions can be controlled.

As described with reference to FIGS. 47 and 48 and others, the link mechanism 8 may include, in order for the movement unit 72 of the linear movement mechanism 7 linearly moves the support unit 71 as the motor MT rotates, the joint J1 (first joint) and the joint J2 (second joint) rotationally driven by the motor MT, the joint J1 and the joint J2 included in the support unit 71 of the linear movement mechanism 7, the link L13 (first link) having the first end connected to the joint J1, the link L25 (second link) having the first end connected to the joint J2, the joint J3 (third joint) to which a second end of the link L13 is connected, and the additional links (the link L38 and the link L89) connected between the joint J3 (third joint) and the base unit 70 of the linear movement mechanism 7. For example, by using the linear movement mechanism 7 and the link mechanism 8 as described above, it is possible to synchronize two types of motions of the abduction and adduction motions and the bending and extending motions.

As described with reference to FIGS. 52 and 53 and others, the fingertip module 30-1 fixed to the thumb, among the fingers of the user U, may include the base 91 that abuts on a part of the thumb, the lever 92 that rotates in such a manner as to change the distance to the base 91 on the side opposite to the thumb across the base 91, and the band 93 that extends from the base 91 in such a manner as to cover a part of the thumb and passes between the base 91 and the lever 92. This enables easy and quick attachment and detachment of the fingertip module 30-1.

Although the embodiments of the disclosure have been described above, the technical scope of the disclosure is not limited to the above embodiments as they are, and various modifications can be made without departing from the gist of the disclosure. Moreover, components of different embodiments and modifications may be combined as appropriate.

Note that the present technology can also have the following configurations.

(1) An information processing device, comprising:
an exoskeleton robot worn on a hand of a user; and
a controller that controls the exoskeleton robot,
wherein the exoskeleton robot comprises:
a palm module fixed to the hand of the user;
a finger joint module detachably attached to the palm module; and
a fingertip module detachably attached to the finger joint module and fixed to a finger of the user,
wherein the finger joint module is configured to have at least one of a function of driving the fingertip module or a function of sensing the fingertip module.

(2) The information processing device according to (1), wherein the palm module comprises:
a first fixing unit to which the finger joint module is fixed; and
a second fixing unit extending along a back of the hand of the user, the second fixing unit fixing the palm module to the hand of the user.

(3) The information processing device according to (2), wherein the palm module comprises a band extending from the second fixing unit in such a manner as to cover a portion of a palm of the user, and
the portion of the palm of the user does not include an interdigital region nor a thenar.

(4) The information processing device according to (3), in which a width of a portion of the band passing between an interdigital region of an index finger and a thenar of the user is narrower than a width of the other portion.

(5) The information processing device according to any one of (2) to (4),
wherein the first fixing unit and the second fixing unit are fixed in such a manner that a relative position of the first fixing unit and the second fixing unit is adjustable.

(6) The information processing device according to any one of (1) to (5),
wherein the finger joint module having the function of driving the fingertip module comprises a motor so as to have at least one degree of freedom.

(7) The information processing device according to (6), wherein the finger joint module having the function of driving the fingertip module comprises an RCM mechanism having a rotation center at a joint of the finger of the user.

(8) The information processing device according to any one of (1) to (7),
wherein the finger joint module having the function of sensing the fingertip module comprises an angle sensor that detects an angle of the fingertip module.

(9) The information processing device according to any one of (1) to (8),
wherein the finger joint module to which the fingertip module fixed to a thumb among fingers of the user is attached comprises a motor so as to have at least one degree of freedom.

(10) The information processing device according to (9), in which the finger joint module to which the fingertip module fixed to the thumb, among fingers of the user, is attached includes two RCM mechanisms each having a center of rotation at a joint of the thumb of the user.

(11) The information processing device according to any one of (1) to (9),
wherein the finger joint module to which a fingertip module is attached has at least three degrees of freedom, the fingertip module fixed to a thumb among fingers of the user, and
the three degrees of freedom give:
an abduction motion and an adduction motion starting from a CM joint of the thumb;
a bending motion and an extending motion of an MP joint of the thumb; and
a bending motion and an extending motion of a CM joint of the thumb.

(12) The information processing device according to (11), wherein the finger joint module comprises a motor and a link mechanism operated by rotation of the motor so as to have the three degrees of freedom,
the motor is disposed such that the CM joint of the thumb is located on an extension line of a rotation axis in order to give the abduction motion and the adduction motion starting from the CM joint of the thumb,
the link mechanism has a center of rotation at the MP joint of the thumb in order to give the bending motion and the extending motion of the MP joint of the thumb, and
the link mechanism entirely moves linearly in order to give the bending motion and the extending motion of the CM joint of the thumb.

(13) The information processing device according to (12), wherein the finger joint module comprises a linear movement mechanism,
the linear movement mechanism comprises;
a base unit including a motor;
a support unit that supports the link mechanism; and
a movement unit that linearly moves the support unit relatively to the base unit,
the link mechanism operates to give the bending motion and the extending motion of the MP joint of the thumb as the motor rotates, and
the link mechanism linearly moves to give the bending motion and the extending motion of the CM joint of the thumb as the support unit linearly moves by the movement unit.

(14) The information processing device according to (13), wherein the link mechanism comprises, in order for the movement unit of the linear movement mechanism linearly moves the support unit as the motor rotates:
a first joint and a second joint included in the support unit of the linear movement mechanism, the first joint and the second joint rotationally driven by the motor;
a first link having a first end connected to the first joint;
a second link having a first end connected to the second joint;
a third joint to which a second end of the first link is connected; and
an additional link connected between the third joint and the base unit of the linear movement mechanism.

(15) The information processing device according to any one of (1) to (14),
wherein the fingertip module comprises:
a body extending along the finger of the user; and
a band extending from the body in such a manner as to cover a part of the finger of the user.

(16) The information processing device according to (15), wherein the fingertip module comprises:
a holder that holds the band, the holder disposed on a side opposite to the finger of the user across the body; and
an adjustment screw that adjusts a distance between the holder and the body.

(17) The information processing device according to (16), wherein the fingertip module comprises a release mechanism that moves the adjustment screw such that the distance between the holder and the body decreases, and
the release mechanism comprises:
an abutment unit that is movable in a direction intersecting a traveling direction of the adjustment screw in such a manner as to abut on a tip of the adjustment screw when located ahead of the adjustment screw in the traveling direction; and
a gap that is movable in a direction intersecting the traveling direction of the adjustment screw such that the adjustment screw passes when located ahead of the adjustment screw in the traveling direction.

(18) The information processing device according to (17), wherein the release mechanism comprises a spring that expands and contracts in a traveling direction of the abutment unit and the gap as the abutment unit and the gap move,
the tip of the adjustment screw abuts on the abutment unit when the spring is in an equilibrium state, and
the adjustment screw passes through the gap when the spring is in a compressed state.

(19) The information processing device according to (18), in which the release mechanism includes a cone fixed to a side surface of a tip of the adjustment screw, the cone having a tapered shape whose diameter increases as the cone extends in the traveling direction of the adjustment screw.

(20) The information processing device according to any one of (1) to (14),
in which the fingertip module fixed to the thumb among the fingers of the user includes:
a base that abuts on a part of the thumb;
a lever that rotates in such a manner as to change a distance from the base on a side opposite to the thumb across the base; and
a band extending from the base in such a manner as to cover a part of the thumb and passing between the base and the lever.

(21) The information processing device according to any one of (1) to (19), further comprising:
a plurality of the exoskeleton robots; and
the controller that controls the plurality of the exoskeleton robots.

(22) The information processing device according to any one of (1) to (21), further comprising:
a terminal device that generates a control command for controlling the exoskeleton robot,
wherein the controller transmits the control command generated by the terminal device to the exoskeleton robot.

(23) The information processing device according to (22), in which the finger joint module includes a plurality of finger joint modules corresponding to different fingers,
the terminal device collectively generates control commands each corresponding to one of the plurality of finger joint modules, and
the controller separates the control commands collectively generated by the terminal device into control commands each corresponding to one of the plurality of finger joint modules and transmits the control commands to the respective finger joint modules.

(24) An information processing method comprising controlling an exoskeleton robot worn on a hand of a user, wherein the exoskeleton robot comprises:
a palm module fixed to the hand of the user;
a finger joint module detachably attached to the palm module; and
a fingertip module detachably attached to the finger joint module and fixed to a finger of the user, wherein the finger joint module is configured to have at least one of a function of driving the fingertip module or a function of sensing the fingertip module.

(25) An information processing program for causing a computer to execute:

processing of controlling an exoskeleton robot worn on a hand of a user, wherein the exoskeleton robot comprises:

a palm module fixed to the hand of the user;

a finger joint module detachably attached to the palm module; and a fingertip module detachably attached to the finger joint module and fixed to a finger of the user, wherein the finger joint module is configured to have at least one of a function of driving the fingertip module or a function of sensing the fingertip module.

(26) An exoskeleton robot worn on a hand of a user, wherein the exoskeleton robot includes:

a palm module fixed to the hand of the user;

a finger joint module detachably attached to the palm module; and a fingertip module detachably attached to the finger joint module and fixed to a finger of the user, in which the finger joint module is configured to have at least one of a function of driving the fingertip module or a function of sensing the fingertip module.

REFERENCE SIGNS LIST

100 INFORMATION PROCESSING DEVICE
1 EXOSKELETON ROBOT
1-L EXOSKELETON ROBOT
1-R EXOSKELETON ROBOT
PALM MODULE
11 FIRST FIXING UNIT
12 SECOND FIXING UNIT
13*a* BAND
13*b* BAND
13*b*1 FIRST PORTION
13*b*2 SECOND PORTION
14 JIG
ADJUSTMENT BLOCK
151 FIRST ADJUSTMENT BLOCK
152 SECOND ADJUSTMENT BLOCK
15*a* ADJUSTMENT SCREW
15*b* ADJUSTMENT SCREW
20 FINGER JOINT MODULE
20-1 FINGER JOINT MODULE
20-2 FINGER JOINT MODULE
20-3 FINGER JOINT MODULE
20-4 FINGER JOINT MODULE
20-5 FINGER JOINT MODULE
20*a* SHAFT
20*b* SHAFT
30 FINGERTIP MODULE
30-1 FINGERTIP MODULE
30-2 FINGERTIP MODULE
30-3 FINGERTIP MODULE
30-4 FINGERTIP MODULE
30-5 FINGERTIP MODULE
31 BODY
32 ATTACHMENT MEMBER
33 BAND
34 HOLDER
35 ADJUSTMENT SCREW
36 RELEASE MECHANISM
37 LENGTH ADJUSTING MECHANISM
4 CONTROLLER
41 PROCESSING UNIT
42 POWER SUPPLY UNIT
5 TERMINAL DEVICE
5*a* DISPLAY UNIT
6 STORAGE UNIT
61 INFORMATION PROCESSING PROGRAM
AR1 ARROW
AR2 ARROW
MT MOTOR
MV MECHANISM
MVa MECHANISM
MVb MECHANISM
S SENSOR
U USER
1000 COMPUTER
1050 BUS
1100 CPU
1200 RAM
1300 ROM
1400 HDD
1500 COMMUNICATION INTERFACE
1600 INPUT AND OUTPUT INTERFACE
1650 INPUT AND OUTPUT DEVICE
7 LINEAR MOVEMENT MECHANISM
70 BASE UNIT
71 SUPPORT UNIT
72 MOVEMENT UNIT
721 FIRST PORTION
722 SECOND PORTION
8 LINK MECHANISM
J JOINT
J1 JOINT
J2 JOINT
J3 JOINT
J4 JOINT
J5 JOINT
J6 JOINT
J7 JOINT
J8 JOINT
L LINK
$L_R$ RESIN LINK
$L_M$ METAL LINK
L13 LINK
L25 LINK
L37 LINK
L38 LINK
L46 LINK
L67 LINK
L89 LINK
91 BASE
92 LEVER
93 BAND

The invention claimed is:

1. An information processing device, comprising:

an exoskeleton robot configured to be worn on a hand of a user; and a controller including circuitry configured to control the exoskeleton robot, wherein the exoskeleton robot includes a palm module configured to be fixed to the hand of the user, a finger joint module configured to be detachably attached to the palm module, and a fingertip module configured to be detachably attached to the finger joint module and fixed to a finger of the user, wherein the finger joint module is configured to have at least one of a function of driving the fingertip module or a function of sensing the fingertip module, and wherein the fingertip module includes a body configured to extend along the finger of the user, a band configured to extend from the body in such a manner as to cover a part of the finger of the user, and a holder configured to hold the band, the holder being disposed on a side opposite to the finger of the user across the body.

2. The information processing device according to claim 1, wherein the palm module includes a first fixing unit to which the finger joint module is configured to be fixed; and a second fixing unit configured to extend along a back of the hand of the user to fix the palm module to the hand of the user.

3. The information processing device according to claim 2, wherein the palm module includes a band configured to extend from the second fixing unit in such a manner as to cover a portion of a palm of the user, and wherein the portion of the palm of the user does not include an interdigital region nor a thenar.

4. The information processing device according to claim 2, wherein the first fixing unit and the second fixing unit are configured to be fixed in such a manner that a relative position of the first fixing unit and the second fixing unit is adjustable.

5. The information processing device according to claim 1, wherein the finger joint module is further configured to drive the fingertip module, which includes a motor so as to have at least one degree of freedom.

6. The information processing device according to claim 5, wherein the finger joint module is further configured to drive the fingertip module, which includes an RCM mechanism having a rotation center at a joint of the finger of the user.

7. The information processing device according to claim 1, wherein the finger joint module having the function of sensing is further configured to sense the fingertip module, which includes an angle sensor configured to detect an angle of the fingertip module.

8. The information processing device according to claim 1, wherein the finger joint module to which the fingertip module configured to be fixed to a thumb among fingers of the user includes a motor so as to have at least one degree of freedom.

9. The information processing device according to claim 1, wherein the finger joint module to which a fingertip module is configured to be attached has at least three degrees of freedom, the fingertip module being fixed to a thumb among fingers of the user, and wherein the three degrees of freedom are configured to give an abduction motion and an adduction motion starting from a CM joint of the thumb, a bending motion and an extending motion of an MP joint of the thumb, and a bending motion and an extending motion of a CM joint of the thumb.

10. The information processing device according to claim 9, wherein the finger joint module includes a motor and a link mechanism configured to be operated by rotation of the motor so as to have the three degrees of freedom, wherein the motor is disposed such that the CM joint of the thumb is configured to be located on an extension line of a rotation axis in order to give the abduction motion and the adduction motion starting from the CM joint of the thumb, wherein the link mechanism is configured to have a center of rotation at the MP joint of the thumb in order to give the bending motion and the extending motion of the MP joint of the thumb, and wherein the link mechanism is configured to entirely move linearly in order to give the bending motion and the extending motion of the CM joint of the thumb.

11. The information processing device according to claim 10, wherein the finger joint module includes a linear movement mechanism, wherein the linear movement mechanism includes a base unit including a motor, a support unit configured to support the link mechanism, and a movement unit configured to linearly move the support unit relatively to the base unit, wherein the link mechanism operates to give the bending motion and the extending motion of the MP joint of the thumb as the motor rotates, and wherein the link mechanism linearly moves to give the bending motion and the extending motion of the CM joint of the thumb as the support unit linearly moves by the movement unit.

12. The information processing device according to claim 11, wherein the link mechanism comprises, in order for the movement unit of the linear movement mechanism to linearly move the support unit as the motor rotates a first joint and a second joint included in the support unit of the linear movement mechanism, the first joint and the second joint being configured to be rotationally driven by the motor;

a first link having a first end connected to the first joint;

a second link having a first end connected to the second joint;

a third joint to which a second end of the first link is connected; and an additional link connected between the third joint and the base unit of the linear movement mechanism.

13. The information processing device according to claim 1, wherein the fingertip module further includes an adjustment screw configured to adjust a distance between the holder and the body.

14. The information processing device according to claim 13, wherein the fingertip module includes a release mechanism configured to move the adjustment screw such that the distance between the holder and the body decreases, and wherein the release mechanism includes an abutment unit configured to move in a direction intersecting a traveling direction of the adjustment screw in such a manner as to abut on a tip of the adjustment screw when located ahead of the adjustment screw in the traveling direction, and a gap configured to move in a direction intersecting the traveling direction of the adjustment screw such that the adjustment screw passes when located ahead of the adjustment screw in the traveling direction.

15. The information processing device according to claim 14, wherein the release mechanism includes a spring configured to expand and contract in a traveling direction of the abutment unit and the gap as the abutment unit and the gap move, wherein the tip of the adjustment screw abuts on the abutment unit when the spring is in an equilibrium state, and wherein the adjustment screw passes through the gap when the spring is in a compressed state.

16. The information processing device according to claim 1, further comprising:

a plurality of exoskeleton robots, wherein the circuitry of the controller controls the plurality of exoskeleton robots.

17. The information processing device according to claim 1, further comprising:

a terminal device including circuitry configured to generate a control command for controlling the exoskeleton robot, wherein the circuitry of the controller is further configured to transmit the control command generated by the circuitry of the terminal device to the exoskeleton robot.

18. An information processing method comprising:

controlling an exoskeleton robot worn on a hand of a user, wherein the exoskeleton robot includes a palm module configured to be fixed to the hand of the user, a finger joint module configured to be detachably attached to the palm module, and a fingertip module configured to be detachably attached to the finger joint module and fixed to a finger of the user, wherein the finger joint module is further configured to have at least one of a function of driving the fingertip module or a function of sensing the fingertip module, and wherein the fingertip module includes a body configured to extend along the finger of the user, a band configured to extend from the body in such a manner as to cover a part of the finger of the user, and a holder configured to hold the band, the holder being disposed on a side opposite to the finger of the user across the body.

19. A non-transitory computer-readable storage medium having embodied thereon an information processing program, which when executed by a computer causes the computer to execute a method, the method comprising:

controlling an exoskeleton robot worn on a hand of a user, wherein the exoskeleton robot includes a palm module configured to be fixed to the hand of the user, a finger joint module configured to be detachably attached to the palm module, and a fingertip module configured to be detachably attached to the finger joint module and fixed to a finger of the user, wherein the finger joint module is configured to have at least one of a function of driving the fingertip module or a function of sensing the fingertip module, and wherein the fingertip module includes a body configured to extend along the finger of the user, a band configured to extend from the body in such a manner as to cover a part of the finger of the user, and a holder configured to hold the band, the holder being disposed on a side opposite to the finger of the user across the body.

* * * * *